US012659622B2

(12) United States Patent
Mori et al.

(10) Patent No.: US 12,659,622 B2
(45) Date of Patent: Jun. 16, 2026

(54) SOLID-STATE IMAGING DEVICE, METHOD FOR DRIVING SOLID-STATE IMAGING DEVICE, AND ELECTRONIC APPARATUS HAVING LATERAL OVERFLOW STORAGE CAPACITANCE CONFIGURATION

(71) Applicant: Brillnics Singapore Pte. Ltd., Singapore (SG)

(72) Inventors: Kazuya Mori, Tokyo (JP); Ken Miyauchi, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 89 days.

(21) Appl. No.: 18/641,206

(22) Filed: Apr. 19, 2024

(65) Prior Publication Data

US 2024/0357255 A1 Oct. 24, 2024

(30) Foreign Application Priority Data

Apr. 21, 2023 (JP) ................................. 2023-070410

(51) Int. Cl.
*H04N 25/771* (2023.01)
*H04N 25/59* (2023.01)
(Continued)

(52) U.S. Cl.
CPC ........... *H04N 25/771* (2023.01); *H04N 25/59* (2023.01); *H04N 25/65* (2023.01); *H04N 25/772* (2023.01)

(58) Field of Classification Search
CPC ...... H04N 25/771; H04N 25/59; H04N 25/65; H04N 25/772
See application file for complete search history.

(56) References Cited

U.S. PATENT DOCUMENTS

| 7,164,114 B2 | 1/2007 | Lai et al. |
| 12,058,460 B2 * | 8/2024 | Choi .................. H10F 39/8037 |

(Continued)

FOREIGN PATENT DOCUMENTS

| JP | 2005-278135 A | 10/2005 |
| JP | 2005-295346 A | 10/2005 |

(Continued)

OTHER PUBLICATIONS

Aoki et al., "A Rolling-Shutter Distortion-Free 3D Stacked Image Sensor with -160dB Parasitic Light Sensitivity in-Pixel Storage Node", IEEE International Solid-State Circuits Conference, Feb. 20, 2013, pp. 1-3.

*Primary Examiner* — Nicholas G Giles
(74) *Attorney, Agent, or Firm* — Pillsbury Winthrop Shaw Pittman, LLP

(57) ABSTRACT

Provided are a solid-state imaging device, a method for driving a solid-state imaging device and an electronic apparatus. A reading part controls an output node, a first storage node and a second storage node such that the output node, the first storage node and the second storage node are coupled with each other to perform reading of an overflow charge signal, and controls the output node and the second storage node such that the output node and the second storage node are separated from each other to perform reading of a stored charge signal. A sequence of operations to read the pixel signal is performed such that the reading of the overflow charge signal takes place prior to the reading of the stored charge signal without charge mixing at the output node.

17 Claims, 43 Drawing Sheets

10

Reading Part

(51) Int. Cl.
    *H04N 25/65*        (2023.01)
    *H04N 25/772*     (2023.01)

(56)            References Cited

U.S. PATENT DOCUMENTS

| | | |
|---|---|---|
| 2005/0195304 A1 | 9/2005 | Nitta et al. |
| 2007/0058062 A1 | 3/2007 | Ohta |
| 2007/0131991 A1 | 6/2007 | Sugawa |
| 2008/0266434 A1 | 10/2008 | Sugawa et al. |
| 2010/0181464 A1 | 7/2010 | Veeder |
| 2013/0049082 A1 | 2/2013 | Kato et al. |
| 2021/0289154 A1* | 9/2021 | Johnson ............... H04N 25/587 |
| 2023/0421921 A1* | 12/2023 | Choi ................... H04N 25/771 |

FOREIGN PATENT DOCUMENTS

| | | |
|---|---|---|
| JP | 2005-328493 A | 11/2005 |
| JP | 2007-081033 A | 3/2007 |
| JP | 2013-062789 A | 4/2013 |
| WO | 2005/083790 A1 | 9/2005 |

* cited by examiner

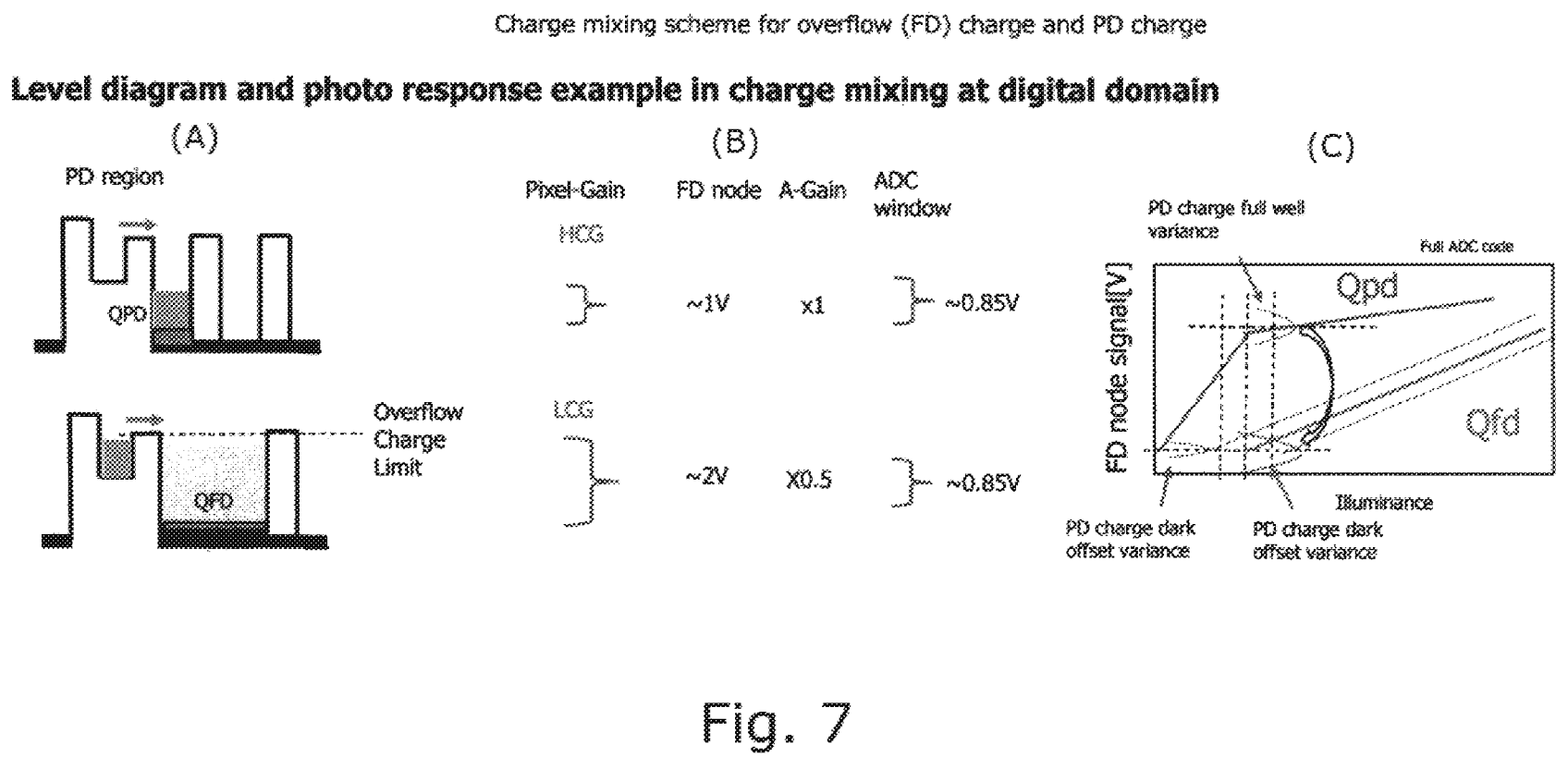

Charge mixing scheme for overflow (FD) charge and PD charge

Level diagram and photo response example in charge mixing at digital domain

Fig. 7

Expected photo response plot in digital domain charge mixing (A)

Photo response at FD node for PD and FD photo charge

Fig. 13

Performance summary : comparison of digital and charge domain mixing

Performance index summary
x: worse △: better o:best

| Charge mixing Operation | S cap gain | Lower voltage | Pixel Size | SNR drop At Injection Point | Dynamic Range | Peak Noise Performance |
|---|---|---|---|---|---|---|
| Charge domain | 1 | △ | △ | ○ | △ | x |
| | 2 | △ | x | ○ | ○ | x |
| Digital domain | 1 | ○ | ○ | △ | ○ | ○ |

Fig. 14

Example layout

Photo charge level diagram @ LOFIC+SEHDR

| PD / FD domain | Pixel gain | Handling Charge And its Voltage | After Analog Gain & SF buffer | After ADC @800mV window | Corresponding Accumulated Photo charge, its node and gain ratio in digital domain |
|---|---|---|---|---|---|
| (A) Read out1 FD overflown charge | LCG ~20uV/e~ | 80Ke~ 1.6V | X0.5 80Ke~ 0.64V | >80Ke~ | 40K~80Ke~ FD(overflow) x128 |
| (B) Read out2 PD charge w/ High gain | HCG ~150uV/e~ | 8Ke~ 1.2V | x8 8Ke~ 1.2V | x8 ~1Ke~ | 0Ke~1Ke~ PD x1 |
| (C) Read out3 PD charge w/ low gain | LCG ~20uV/e~ | 40~50Ke~ 1.0V | x1 40~50Ke~ 0.8V | x1 40~50Ke~ | 0Ke~50Ke~ PD X64 @pixelxanalog gain |

Fig. 18

Estimated dynamic range performance in typical operation

| Read out sequence | Pixel conversion gain[uV/e-] Readout1 | Analog gain Readout1 | Maximum handling charge (Q)/ Correspondent Tnoise | Pixel conversion gain[uV/e-] Readout2 | Analog gain Readout2 | Maximum handling charge (Q)/ Correspondent Tnoise | Pixel conversion gain[uV/e-] Readout 1 | Analog gain Readout 1 | Maximum handling charge (Q)/ Correspond ent Tnoise | Total DR Max Qe/ min TN |
|---|---|---|---|---|---|---|---|---|---|---|
| Conventional Binning scheme | (150 @HCG) 20 @LCG | (8) 1 | (1Ke-/1e-) 40Ke-/30e | NA | NA | NA | NA | NA | NA | 60 (62) |
| SEHDR | 150 @HCG | 8 | 1Ke-/1e- | 20@LCG | 1 | 40Ke-/30e- | NA | NA | NA | 92 |
| LOFIC | 150 @HCG | 1 | 8Ke-/4e- | 10@LCG | 1 | 80Ke-/50e- | NA | NA | NA | 86 |
| LOFIC+SEHDR | 20@LCG | 0.5 | 80Ke-/50e- | 150 @HCG | 8 | 1Ke-/1e- | 20@LCG | 1 | 40 @LCG | 101 |

Total DR Max [db]: 20x log (Maximum accumulated photo charge/ Minimum Temp noise) Maximum handling charge (Q): Accumulated photo charge for correspondent node (PD or FD) Correspondent Tnoise: Temporal noise

Fig. 21 overflow charge skimming pixel configuration

Figure 25:
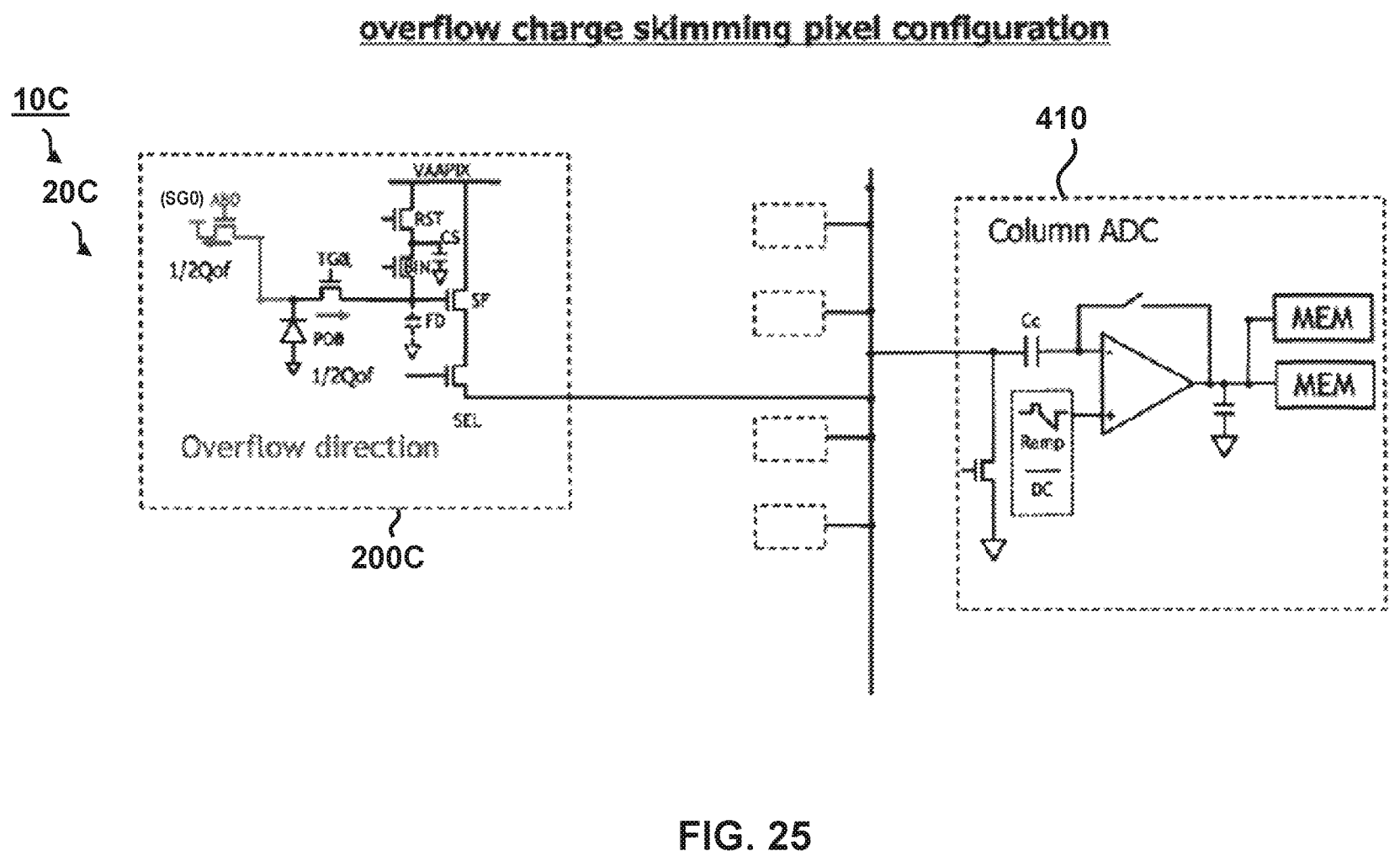

Column ADC

410

MEM

MEM

Cc $C_c$

200C

Overflow direction

SEL

SF

RST

FD (SG0)

1/20pf

1/20pf

Overflow direction

10C

20C

FIG. 25 non-share pixel          layout
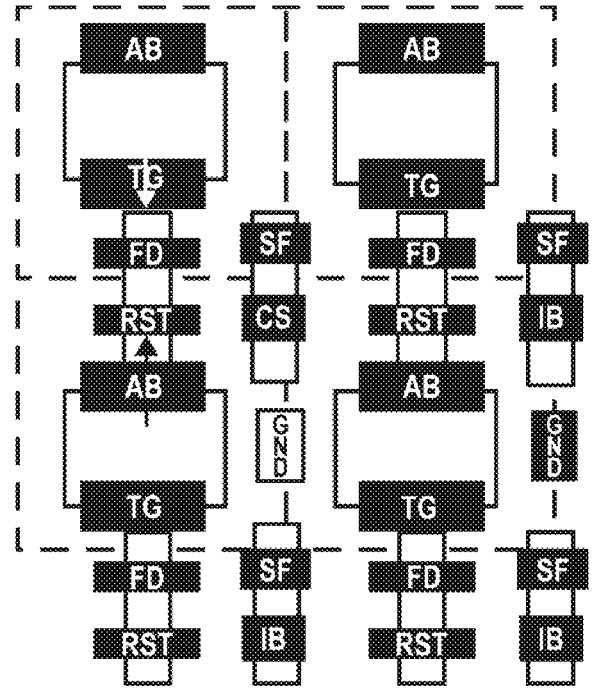
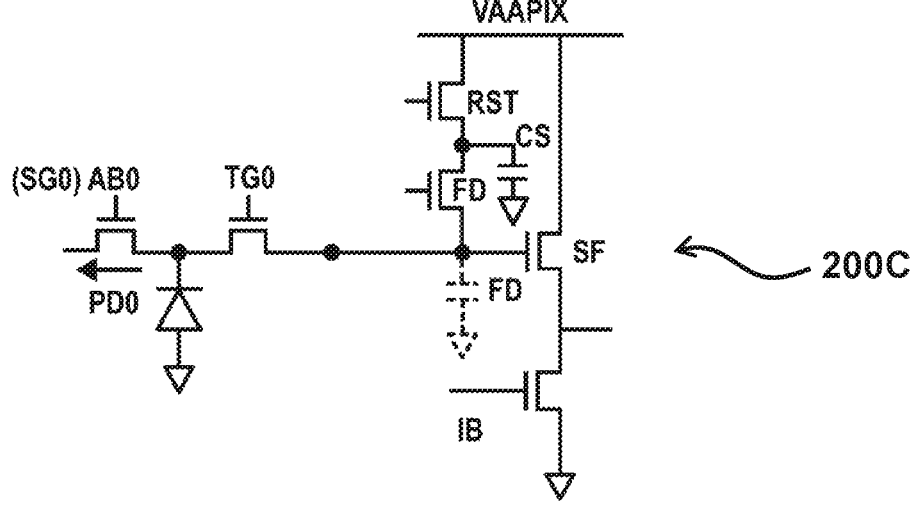
FIG. 26 overflow charge skimming pixel configuration

Figure 27:
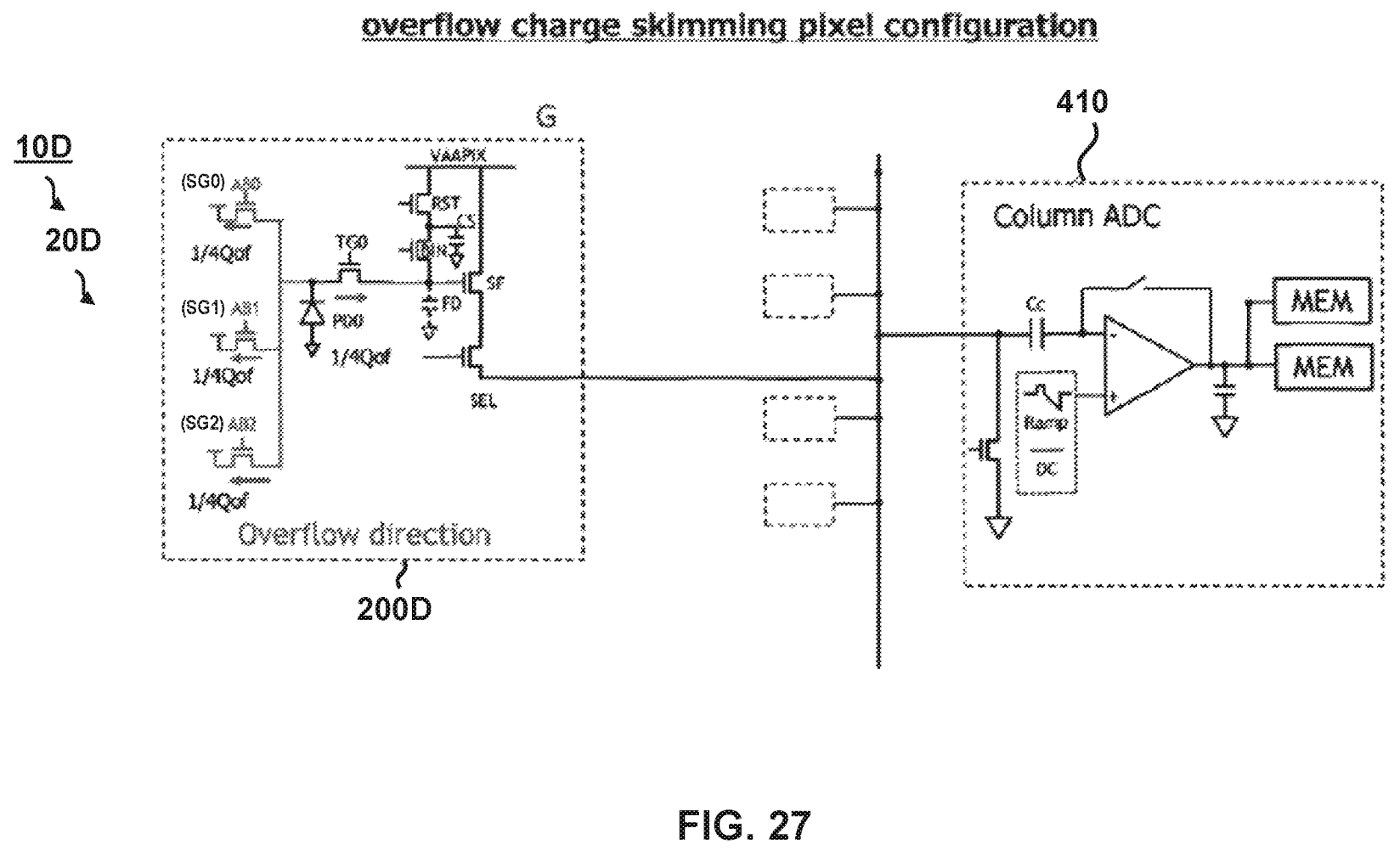

Column ADC

410

MEM

MEM $C_c$

G

VMAPX

RST

SF

FD

SEL

TG0

PIX0

1/4Q0f (SG0) A0f

1/4Q0f (SG1) A1f

1/4Q1f (SG2) A2f

1/4Q2f

200D

Overflow direction

10D

20D

FIG. 27 non-share pixel        layout2

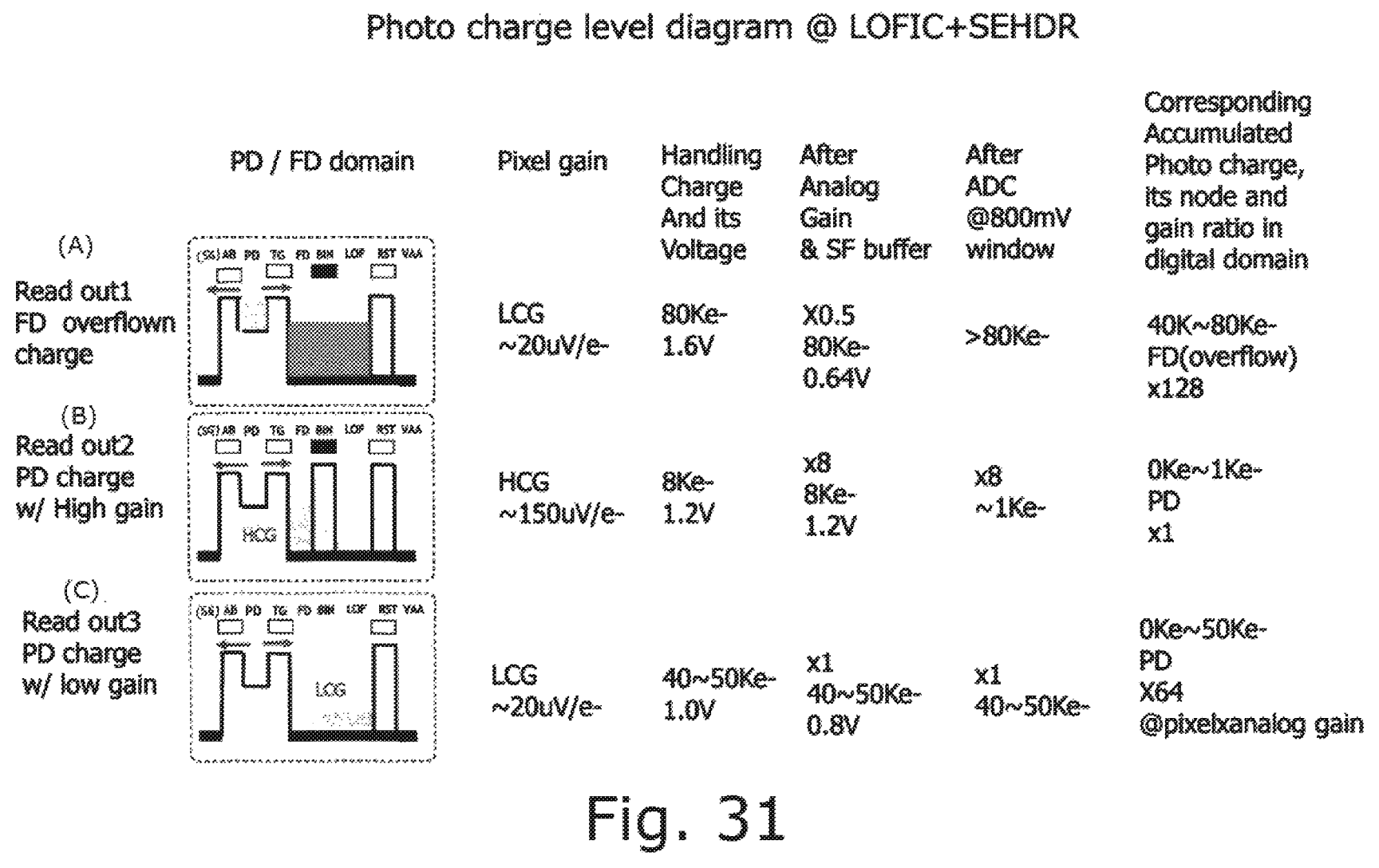

Photo charge level diagram @ LOFIC+SEHDR

| PD / FD domain | Pixel gain | Handling Charge And its Voltage | After Analog Gain & SF buffer | After ADC @800mV window | Corresponding Accumulated Photo charge, its node and gain ratio in digital domain |
|---|---|---|---|---|---|
| (A) Read out1 FD overflown charge | LCG ~20uV/e- | 80Ke~ 1.6V | X0.5 80Ke~ 0.64V | >80Ke~ | 40K~80Ke~ FD(overflow) x128 |
| (B) Read out2 PD charge W/ High gain | HCG ~150uV/e- | 8Ke~ 1.2V | x8 8Ke~ 1.2V | x8 ~1Ke~ | 0Ke~1Ke~ PD x1 |
| (C) Read out3 PD charge W/ low gain | LCG ~20uV/e- | 40~50Ke~ 1.0V | x1 40~50Ke~ 0.8V | x1 40~50Ke~ | 0Ke~50Ke~ PD X64 @pixelxanalog gain |

Fig. 31

Estimated dynamic range performance in typical operation

| Read out sequence | Pixel conversion gain[uV/e-] Readout 1 | Analog gain Readout 1 | Maximum handling charge (Q)/ Correspondent Tnoise | Pixel conversion gain[uV/e-] Readout2 | Analog gain Readout2 | Maximum handling charge (Q)/ Correspondent Tnoise | Pixel conversion gain[uV/e-] Readout 1 | Analog gain Readout 1 | Maximum handling charge (Q)/ Correspond ent Tnoise | Total DR Max Qe/ min TN |
|---|---|---|---|---|---|---|---|---|---|---|
| Conventional Binning scheme | (150 @HCG) 20 @LCG | (8) 1 | (1Ke-/1e-) 40Ke-/30e | NA | NA | NA | NA | NA | NA | 60 (62) |
| SEHDR | 150 @HCG | 8 | 1Ke-/1e- | 20@LCG | 1 | 40Ke-/30e- | NA | NA | NA | 92 |
| LOFIC | 150 @HCG | 1 | 8Ke-/4e- | 10@LCG | 1 | 80Ke-/50e- | NA | NA | NA | 86 |
| LOFIC+SEHDR | 20@LCG | 0.5 | 80Ke-/50e- | 150 @HCG | 8 | 1Ke-/1e- | 20@LCG | 1 | 40 @LCG | 101 |
| Skimming LOFIC+SEHDR | 20@LCG | 0.5 | (180000-/50e-) | 150 @HCG | 8 | 1Ke-/1e- | 20@LCG | 1 | 40 @LCG | 107 |

Total DR Max [db]: 20x log (Maximum accumulated photo charge/ Minimum Temp noise) Maximum handling charge (Q): Accumulated photo charge for correspondent node (PD or FD) Correspondent Tnoise: Temporal noise

Fig. 34

S1: Linear ADC conversion for photo charge in PD via FD node
N1: Dark noise in ADC
S2: Time domain overflow charge detect time to flip code corresponding the illuminance
    Start point of ADC code is corresponded to the overflow point of PD.
Ss: Individual saturation signal correlated to the starting point of saturation.

Block diagram and data processing example(x3 memory buffer)

Block diagram and data processing example (A)Timing Diagram, (B)Pixel circuit, (C) PD potential diagram and pixel memory state

1

SOLID-STATE IMAGING DEVICE, METHOD FOR DRIVING SOLID-STATE IMAGING DEVICE, AND ELECTRONIC APPARATUS HAVING LATERAL OVERFLOW STORAGE CAPACITANCE CONFIGURATION

CROSS-REFERENCE TO RELATED APPLICATIONS

This application is based on and claims the benefit of priority from Japanese Patent Application Serial No. 2023-070410 (filed on Apr. 21, 2023), the contents of which are incorporated herein.

TECHNICAL FIELD

The present disclosure relates to a solid-state imaging device, a method for driving a solid-state imaging device, and an electronic apparatus.

BACKGROUND

Solid-state imaging devices (image sensors) including photoelectric conversion elements for detecting light and generating charges are embodied as complementary metal oxide semiconductor (CMOS) image sensors, which have been in practical use. The CMOS image sensors have been widely applied in various types of electronic apparatuses such as digital cameras, video cameras, surveillance cameras, medical endoscopes, personal computers (PCs), mobile phones and other portable terminals (mobile devices) as their parts.

The CMOS image sensors include, for each pixel, a photodiode (a photoelectric conversion element) and a floating diffusion (FD) amplifier having a floating diffusion (FD). The mainstream design of the reading operation in the CMOS image sensors is a column parallel output processing of selecting one of the rows in the pixel array and reading the pixels in the selected row simultaneously in the column output direction.

Each pixel of the CMOS image sensor generally includes, for one photodiode for example, four active elements: a transfer transistor serving as a transfer element; a reset transistor serving as a reset element; a source follower transistor serving as a source follower element (an amplification element); and a selection transistor serving as a selection element.

Such CMOS image sensors (CIS) can employ various characteristic structures in the pixels for achieving an improved dynamic range.

One of the methods to increase the dynamic range is lateral overflow integration capacitor (LOFIC) (see, for example, Japanese Patent Application Publication No. 2005-328493 and International Publication No. WO 2005/083790).

When having the LOFIC configuration, the pixels have a storage capacitor serving as a storage capacitance element and a storage transistor serving as a storage connection element in addition to the above-listed basic constituents, so that overflow charges (charges beyond saturation) overflowing from the photodiode within the same exposure period are not wasted but stored in the storage capacitor.

The LOFIC pixel can have two types of conversion gains: a high conversion gain (HCG) determined by the capacitance of the floating diffusion FD; and a low conversion gain (LCG) determined by the sum of the capacitance of the floating diffusion and the LOFIC capacitance of the storage capacitor. In other words, the LOFIC pixel can achieve high saturation and low dark noise using a low conversion gain (LCG) signal and a high conversion gain (HCG) signal.

The CMOS image sensor may sequentially scan the pixels or rows one-by-one to read the charges generated by photoelectric conversion and stored in the photodiodes. When such sequential scan is employed, in other words, a rolling shutter is employed as the electronic shutter, it is not possible to start and end the exposure for storing the charges produced by photoelectric conversion at the same time in all of the pixels. Therefore, the sequential scan has such a problem that, when a moving object is imaged, a captured image may experience distortion.

In a case where image distortion is not acceptable, for example, where a fast moving object is imaged or sensing is performed that requires simultaneity among the captured images, a global shutter is employed as the electronic shutter. When the global shutter is employed, the exposure can be started and ended at the same timing in all of the pixels of the pixel array part.

In a CMOS image sensor employing a global shutter as the electronic shutter, a pixel has therein a signal holding part for holding, in a signal hold capacitor, a signal that is read out from a reading part, for example. The CMOS image sensors employing global shutter sample and hold in an analog manner and store the charges from the photodiodes in the signal hold capacitors of the signal holding parts at the same time in the form of voltage signals and subsequently sequentially read the voltage signals. In this way, the simultaneity is reliably achieved among the images (see, for example, J. Aoki, et al., "A Rolling-Shutter Distortion-Free 3D Stacked Image Sensor with −160 dB Parasitic Light Sensitivity In-Pixel Storage Node" ISSCC 2013/SESSION 27/IMAGE SENSORS/27.3).

CMOS image sensors having a high dynamic range and high image quality include pixels with a global shutter function, which are typified by voltage mode global shutter (VMGS) pixels and charge mode global shutter (CMGS) pixels.

The VMGS pixels advantageously have higher shutter efficiency and lower parasitic light sensitivity (PLS) than the CMGS pixels.

In recent years, especially in the fields of machine vision and Internet Of Things (IoT), global shutter (GS) CMOS image sensors (CIS) are in increasing demand. In these technical fields, there is also a strong need for single exposure high dynamic range (SEHDR) performance as well as the GS capability.

During recent years, the increase in number of pixels in CMOS image sensors lead to an enhanced demand for a reduction in pixel size. To deal with this demand, multiple-pixel sharing technique has been proposed, according to which one floating diffusion FD, one reset transistor, one source follower transistor and one selection transistor are shared between a plurality of photodiodes and between a plurality of transfer transistors (see, for example, Japanese Patent Application Publications Nos. 2007-81033 ("the '033 Publication") and 2013-627895 ("the '895 Publication")).

The '033 Publication discloses an example of pixels of a CMOS image sensor having a two-pixel sharing configuration in which one floating diffusion FD, one reset transistor, one source follower transistor, and one selection transistor are shared by two sets of a photodiode and a transfer transistor.

The '895 Publication discloses an example of pixels of a CMOS image sensor having a four-pixel sharing configuration in which one floating diffusion FD, one reset transistor, one source follower transistor, and one selection transistor are shared by four sets of a photodiode and a transfer transistor.

The sharing pixel PXL1 has a rectangular region RCT1 where the elements are formed. The rectangular region RCT1 can be divided into a central region CTAR1 positioned in the center, and a first region FSAR1 and a second region SCAR1 sandwiching the central region CTAR1 therebetween (in the Y direction). The layout of the sharing pixel is basically as follows. A floating diffusion FD is arranged at the center of the element formation region, and photoelectric conversion elements or photodiodes PD are radially arranged around the floating diffusion FD.

For example, according to a two-pixel sharing configuration, in the central region CTAR1, the floating diffusion FD is formed in the X- and Y-direction-wise central portion thereof, the reset transistor RST-Tr is formed on the right side of the floating diffusion FD in the X direction, and the source follower transistor SF-Tr and the selection transistor SEL-Tr are formed on the left side of the floating diffusion FD in the X direction. The relative positions represented by the terms such as left and right can be only example and modified in any other manners than the illustrated example. A first photodiode PD0 and a first transfer transistor TG0-Tr are adjacent to each other in the first region FSAR1. The first transfer transistor TG0-Tr is shaped like a rectangle, arranged closer to the central region CTAR1, and connected to the floating diffusion FD.

In the second region SCAR1, a second photodiode PD1 and a second transfer transistor TG1-Tr are formed. The second transfer transistor TG1-Tr is arranged closer to the central region CTAR1 and connected to the floating diffusion FD.

According to the above-described configurations, every two or four pixels can share their pixel components, so that the photodiode PD in each pixel can have a maximized size. This can contribute to reduce the size of the pixels while the sensitivity and well capacity remain unchanged.

Since the floating diffusion FD is shared by two or more photodiodes PDs, the deep trench isolation (DTI) technique is applied to prevent color signal cross-talk between the photodiodes PDs. Beneath the region where the shared FD is formed, the sub-deep trench isolation (sub-DTI) technique is applied in place of the full deep trench isolation (full-DTI).

Various types of pixel signal reading (output) circuits have been proposed for CMOS image sensors of the column parallel output scheme. Among them, one of the most advanced circuits is a circuit that includes an analog-to-digital converter (ADC) for each column and obtains a pixel signal in a digital format (see, for example, Japanese Patent Application Publications Nos. 2005-278135 and 2005-295346).

In this CMOS image sensor having column-parallel ADCs (column-wise-AD CMOS image sensor), a comparator compares the pixel signal against a so-called RAMP wave and a counter of a later stage performs digital CDS, so that AD conversion is performed.

The CMOS image sensors of this type are capable of transferring signals at high speed, but disadvantageously incapable of reading the signals with a global shutter.

To address this issue, a digital pixel sensor has been proposed that has, in each pixel, an ADC including a comparator (and additionally a memory part), so that the sensor can realize a global shutter according to which the exposure to light can start and end at the same timing in all of the pixels of the pixel array part (see, for example, U.S. Pat. No. 7,164,114 B2 FIG. 4 and US 2010/0181464 A1).

The above-described conventional CMOS image sensor constituted by a digital pixel sensor is capable of realizing global shutter function. In addition, if an ADC including a comparator is arranged in each pixel and reading is performed in a predetermined mode, the conventional CMOS image sensor is capable of achieving widened dynamic range.

The dynamic range can be widened by, for example, reading two types of signals having different integration durations from the same pixel of the image sensor and combining the read two types of signals, or by combining a signal with a small dynamic range read from a high-sensitive pixel and a signal with a widened dynamic range read from a low-sensitive pixel.

The CMOS image sensors described above respectively have the following disadvantages.

Single-chip wide dynamic range (DR) CMOS image sensors, to which LOFIC-based saturation point optimization technology is applied, have demonstrated good color reproduction and high sensitivity in the visible wavelength band. LOFIC CMOS image sensors employing the LOFIC architecture can have maximized dynamic range, thereby achieving optimized capacitance value of each color pixel depending on the sensitivity.

The LOFIC architecture, however, has serious issues, or faces a reduced SNR at the conjunction (combination) point of a high conversion gain (HCG) signal and a low conversion gain (LCG) signal. More specifically, the LOFIC architecture alone cannot remove kTC noise of the LCG signal, which results in a lower SNR at the conjunction point between the HCG signal and the LCG signal.

The high conversion gain (HCG) signal and the low conversion gain (LCG) signal have opposite signal directions. When the low conversion gain (LCG) is used to read the output signal from the pixel, the reset noise of the read-out reset signal VRL is different from the reset noise of the read-out luminance signal VSL. Therefore, subtraction process referred to as the differential double sampling (DDS) can hardly eliminate the reset noise.

The following further discusses in more detail the challenges faced by the LOFIC CMOS image sensors.

The LOFIC (Lateral Overflow Integration Capacitor) configuration provides the ability to increase the dynamic range of the photo response by making use of the overflow charges from the PD node of the photodiode PD. The LOFIC configuration allows the overflow charges to be stored separately in the PD node and in the FD node of the floating diffusion FD. This means that the LOFIC configuration can utilize the sum of adding the amount of charges at the FD node (Qfd) to the amount of charges at the PD node (Qpd). Here, the photodiodes PD vary from each other. For this reason, a charge mixing scheme has been proposed to avoid a signal gap between the charges Qpd at the PD node and the charges Qfd at the FD node.

However, if the LOFIC CMOS image sensor is actually used in a high optical intensity environment, there is a limitation on the charges at the floating diffusion FD due to the margin for the charge transfer from the photodiode PD to the floating diffusion FD. This accordingly limits the signal swing at the FD node.

To further increase the dynamic range, the capacitance value of the storage capacitor CS in the LOFIC of each pixel may be increased according to the required dynamic range. It should be, however, noted that the increase in the capacitance of the storage capacitor CS results in a drop in the SNR at the conjunction point between the charges Qpd at the PD node and the charges Qfd at the FD node. In addition, as the size of the storage capacitor CS increases, the pixel size also increases. For this reason, the size of the storage capacitor CS is limited.

Another approach to increase the dynamic range may include a dual gain conversion reading method. One of the examples of the dual conversion gain scheme is a two-step LOFIC operation, which can increase the dynamic range itself. The increase, however, requires a certain capacitor region. The pixel cell size is adversely affected from the perspective of the area.

As described above, there is a trade-off between the key pixel performance parameters: (1) the dynamic range; (2) the drop in SNR; (3) the dark noise; and (4) the pixel size.

A CMOS image sensor including digital pixel sensors (DPSs) includes: a photoelectric conversion circuit (a photoelectric conversion reading part); and an application-specific circuit. The photoelectric conversion circuit includes: a pinned photodiode for storing charges photoelectrically produced during an integration period; a floating diffusion (FD) node for storing the charges from the photodiode; and at least four transistors. The application-specific circuit has an analog-to-digital converter (ADC) and a storage device. The application-specific circuit is electrically connected to the photoelectric conversion circuit for implementing a global shutter operation. Overflow charges beyond the capacity of the photodiode PD are stored in the FD node during the integration period, and the charges in the photodiode PD are transferred to the FD node at the end of the integration period.

The ADC is configured to operate in a first mode in the integration period to convert a first voltage corresponding to the overflow charges into a digital value and to operate in a second mode in another read out period to convert a second voltage corresponding to the charges transferred to the FD node after the end of the integration period into a digital signal. The ADC includes a comparator for receiving a time-varying reference voltage while operating in the first mode.

In the above-described example of the conventional CMOS image sensor constituted by digital pixel sensors, however, it is generally difficult to reduce the pixel in size since each pixel is required to have many transistors of the comparator and digital memory mounted therein. In other words, the above-described CMOS image sensor including the conventional digital pixel sensors face difficulties in reducing in size the comparator and digital memory, which plays a role as a bottleneck in attempts to reduce the pixel size and resultantly poses limitations on the widening of the dynamic range.

<Noise Present while ADC Operating in First and Second Modes>

The photo charges are converted into digital values and stored in a shared memory. The digital data resulting from the respective operation modes can be stored in a memory device with a flag bit that can be set in two different modes and may be used to identify where the data is originated. The main noise components of the FPN and time noise present in the second mode are both caused by the application-specific circuit including the analog-to-digital converter (ADC). Specifically, the FPN between the two different modes is dominated by the variation in the PD saturation in the second mode.

In this case, the main pixel performance parameters that need to be improved include the drop in SNR at the conjunction point of the two modes and the dark noise.

SUMMARY

An object of the present disclosure is to provide a solid-state imaging device, a method for driving a solid-state imaging device and an electronic apparatus that are capable of not only reducing the size of the pixels while keeping the sensitivity and well capacity unchanged but also preventing an increase in junction capacitance and wiring capacitance, preventing an increase in the capacitance of the floating diffusion serving as an output node, preventing a drop in conversion gain, and eventually achieving improved noise characteristics, and also preventing the charges of different pixels from mixing together at the floating diffusion. Another object of the present disclosure is to provide a solid-state imaging device, a method for driving a solid-state imaging device and an electronic apparatus that are capable of achieving maximized photo-responsiveness, ensuring low optical SNR in addition to reproducibility, achieving high saturation and little dark noise, and further reducing the pixel size, thereby efficiently improving performance factors such as the dynamic range, responsiveness, and resolution.

A first aspect of the present disclosure provides a solid-state imaging device including: a pixel part having pixels arranged therein, each of the pixels being configured to perform photoelectric conversion to generate charges and store the charges that are to be read at least once with different conversion gains; and a reading part for reading a pixel signal from each of the pixels in the pixel part with a conversion gain. Each of the pixels at least includes: a photoelectric conversion element having a first storage node for storing therein, in an integration period, the charges generated by the photoelectric conversion; a transfer element for transferring, in a transfer period, the charges stored in the photoelectric conversion element; an output node to which the charges stored in the photoelectric conversion element are transferred through the transfer element; an output buffer part for converting the charges in the output node into a voltage signal at a level determined by an amount of the charges and outputting the voltage signal; a connection element connected to the output node; and a storage capacitance element having a second storage node for storing the charges in the output node via the connection element, the storage capacitance element being configured to store signal charges beyond a storage capacity of the photoelectric conversion element. The reading part includes: an analog-to-digital converting part (ADC) for performing analog-to-digital (AD) conversion on an analog overflow charge signal and an analog stored charge signal of the photoelectric conversion element into a digital overflow charge signal and a digital stored charge signal and outputting the digital overflow charge signal and the digital stored charge signal; and a digital processing part for performing linearization on the overflow charge signal and the stored charge signal output from the ADC, the overflow charge signal and the stored charge signal having different gains and offsets as stored in different nodes. The reading part: controls the output node, the first storage node and the second storage node such that the output node, the first storage node and the second storage node are coupled with each other to perform reading of the overflow charge signal; and controls the output node and the second storage node such that the output node and the second storage node are separated from each other to perform reading of the stored charge signal.

A second aspect of the present disclosure provides a method for driving a solid-state imaging device including: a pixel part having pixels arranged therein, each of the pixels being configured to perform photoelectric conversion to generate charges and store the charges that are to be read at least once with different conversion gains; and a reading part for reading a pixel signal from each of the pixels in the pixel part with a conversion gain. Each of the pixels at least includes: a photoelectric conversion element having a first storage node for storing therein, in an integration period, the charges generated by the photoelectric conversion; a transfer element for transferring, in a transfer period, the charges stored in the photoelectric conversion element; an output node to which the charges stored in the photoelectric conversion element are transferred through the transfer element; an output buffer part for converting the charges in the output node into a voltage signal at a level determined by an amount of the charges and outputting the voltage signal; a connection element connected to the output node; and a storage capacitance element having a second storage node for storing the charges in the output node via the connection element, the storage capacitance element being configured to store signal charges beyond a storage capacity of the photoelectric conversion element. The reading part includes: an analog-to-digital converting part (ADC) for analog-to-digital (AD) converting an analog overflow charge signal and an analog stored charge signal of the photoelectric conversion element into a digital overflow charge signal and a digital stored charge signal and outputting the digital overflow charge signal and the digital stored charge signal; and a digital processing part for performing linearization on the overflow charge signal and the stored charge signal output from the ADC, the overflow charge signal and the stored charge signal having different gains and offsets as stored in different nodes. The reading part: controls the output node, the first storage node and the second storage node such that the output node, the first storage node and the second storage node are coupled with each other to perform reading of the overflow charge signal; and controls the output node and the second storage node such that the output node and the second storage node are separated from each other to perform reading of the stored charge signal. A sequence of operations to read the pixel signal from each of the pixels is performed such that the reading of the overflow charge signal takes place prior to the reading of the stored charge signal without charge mixing at the output node.

A third aspect of the present disclosure provides an electronic device including: a solid-state imaging device; and an optical system for forming a subject image on the solid-state imaging device. The solid-state imaging device includes: a pixel part having pixels arranged therein, each of the pixels being configured to perform photoelectric conversion to generate charges and store the charges that are to be read at least once with different conversion gains; and a reading part for reading a pixel signal from each of the pixels in the pixel part with a conversion gain. Each of the pixels at least includes: a photoelectric conversion element having a first storage node for storing therein, in an integration period, the charges generated by the photoelectric conversion; a transfer element for transferring, in a transfer period, the charges stored in the photoelectric conversion element; an output node to which the charges stored in the photoelectric conversion element are transferred through the transfer element; an output buffer part for converting the charges in the output node into a voltage signal at a level determined by an amount of the charges and outputting the voltage signal; a connection element connected to the output node; and a storage capacitance element having a second storage node for storing the charges in the output node via the connection element, the storage capacitance element being configured to store signal charges beyond a storage capacity of the photoelectric conversion element. The reading part includes: an analog-to-digital converting part (ADC) for analog-to-digital (AD) converting an analog overflow charge signal and an analog stored charge signal of the photoelectric conversion element into a digital overflow charge signal and a digital stored charge signal and outputting the digital overflow charge signal and the digital stored charge signal; and a digital processing part for performing linearization on the overflow charge signal and the stored charge signal output from the ADC, the overflow charge signal and the stored charge signal having different gains and offsets as stored in different nodes. The reading part: controls the output node, the first storage node and the second storage node such that the output node, the first storage node and the second storage node are coupled with each other to perform reading of the overflow charge signal; and controls the output node and the second storage node such that the output node and the second storage node are separated from each other to perform reading of the stored charge signal.

Advantageous Effects

The present disclosure can not only reduce the size of the pixels while keeping the sensitivity and full well capacity unchanged but also prevent an increase in junction capacitance and wiring capacitance, prevent an increase in the capacitance of the floating diffusion serving as an output node, prevent a drop in conversion gain and eventually achieve improved noise characteristics, and also prevent mixing of the charges at the floating diffusion. The present disclosure can also achieve maximized photo-responsiveness, ensure low optical SNR in addition to reproducibility, achieve high saturation and little dark noise, and further reduce the pixel size, thereby efficiently improving important performance factors such as the dynamic range, responsiveness, and resolution.

BRIEF DESCRIPTION OF THE DRAWINGS

FIG. 7 shows a level diagram and an example of photo response in charge mixing at the digital domain.

FIG. 8 shows an example of an expected photo response plot in digital domain charge mixing.

FIG. 13 shows an example of photo response at the FD node to the photo charges at the photodiode PD and the floating diffusion FD.

FIG. 14 shows an overview of performance factors to describe and compare the charge mixing in the digital and charge domains.

FIG. 18 shows an example of a reading method with LOFIC and SEHDR applicable to the solid-state imaging device relating to the second embodiment of the present disclosure.

FIG. 21 shows, as a reference, estimated dynamic range performance in a typical operation when the sharing pixel of the solid-state imaging device relating to the second embodiment of the present disclosure is employed.

FIG. 25 is a circuit diagram showing an example of a solid-state imaging device relating to a fourth embodiment of the present disclosure.

FIG. 26 shows an example layout of a non-sharing pixel of a first example of the solid-state imaging device relating to the fourth embodiment of the present disclosure.

FIG. 27 is a circuit diagram showing a second example of the pixels of the solid-state imaging device relating to the fourth embodiment of the present disclosure.

FIG. 31 shows an example of a reading method with LOFIC and SEHDR applicable to the solid-state imaging device relating to the fourth embodiment of the present disclosure.

FIG. 34 shows, as a reference, estimated dynamic range performance in a typical operation when the sharing pixel of the solid-state imaging device relating to the fourth embodiment of the present disclosure is employed.

DESCRIPTION OF THE PREFERRED EMBODIMENTS

Embodiments of the present disclosure will be hereinafter described with reference to the drawings.

First Embodiment

Figure 1:
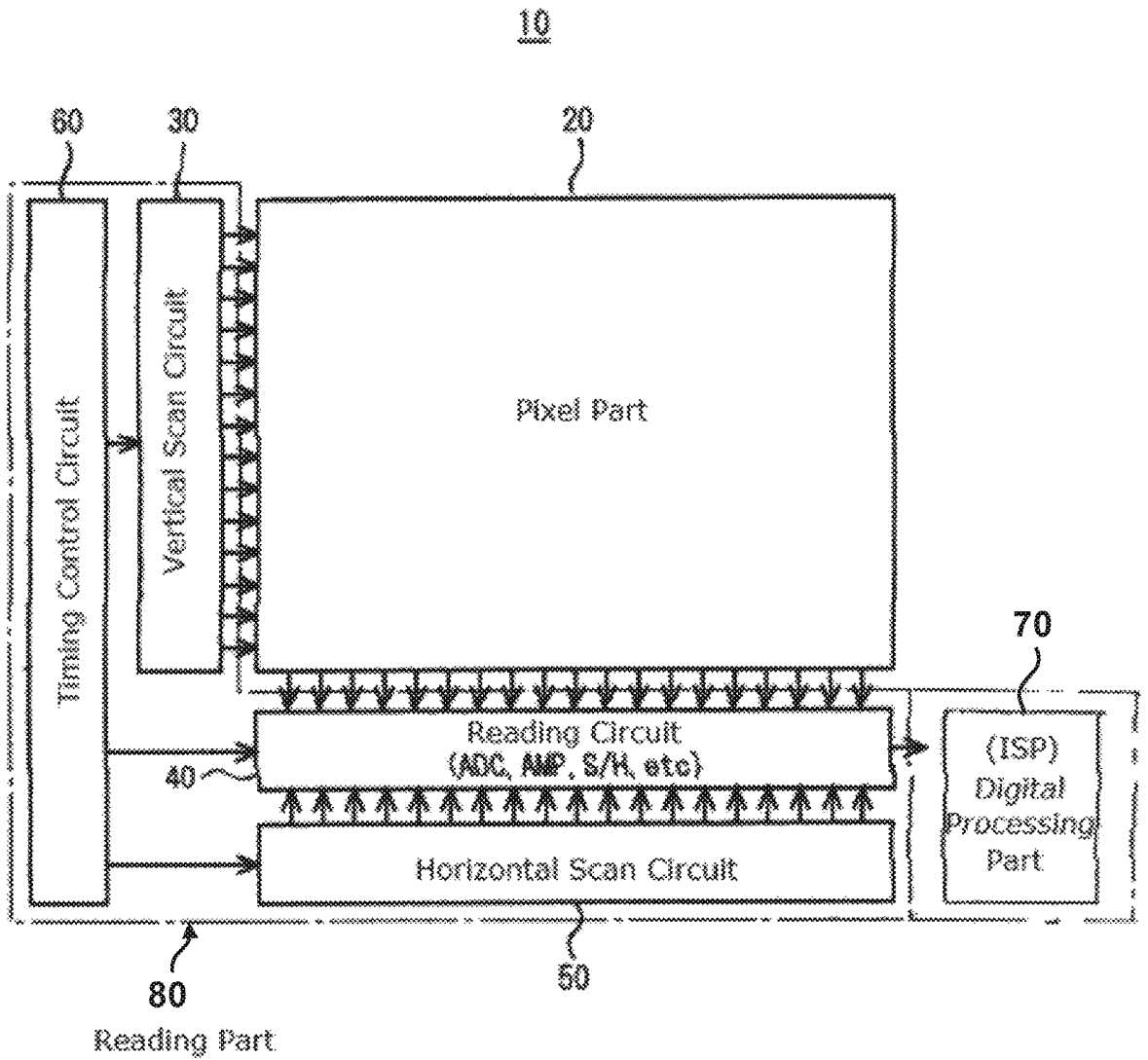
FIG. 1 is a block diagram showing an example overall configuration of a solid-state imaging device according to a first embodiment of the present disclosure.
Figure 2:
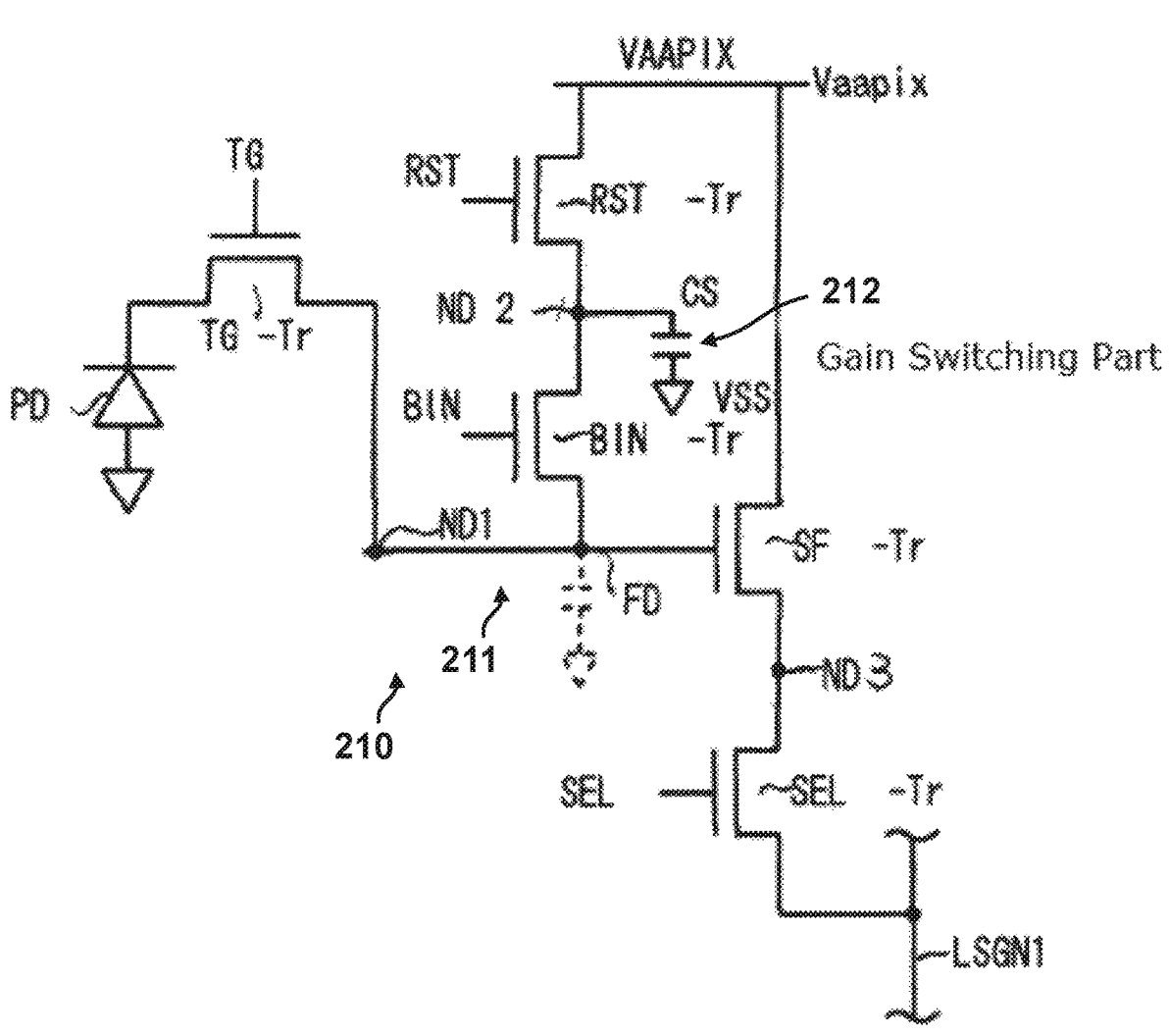
FIG. 2 is a circuit diagram showing an example of pixels of the solid-state imaging device relating to the first embodiment of the present disclosure.
Figure 3:
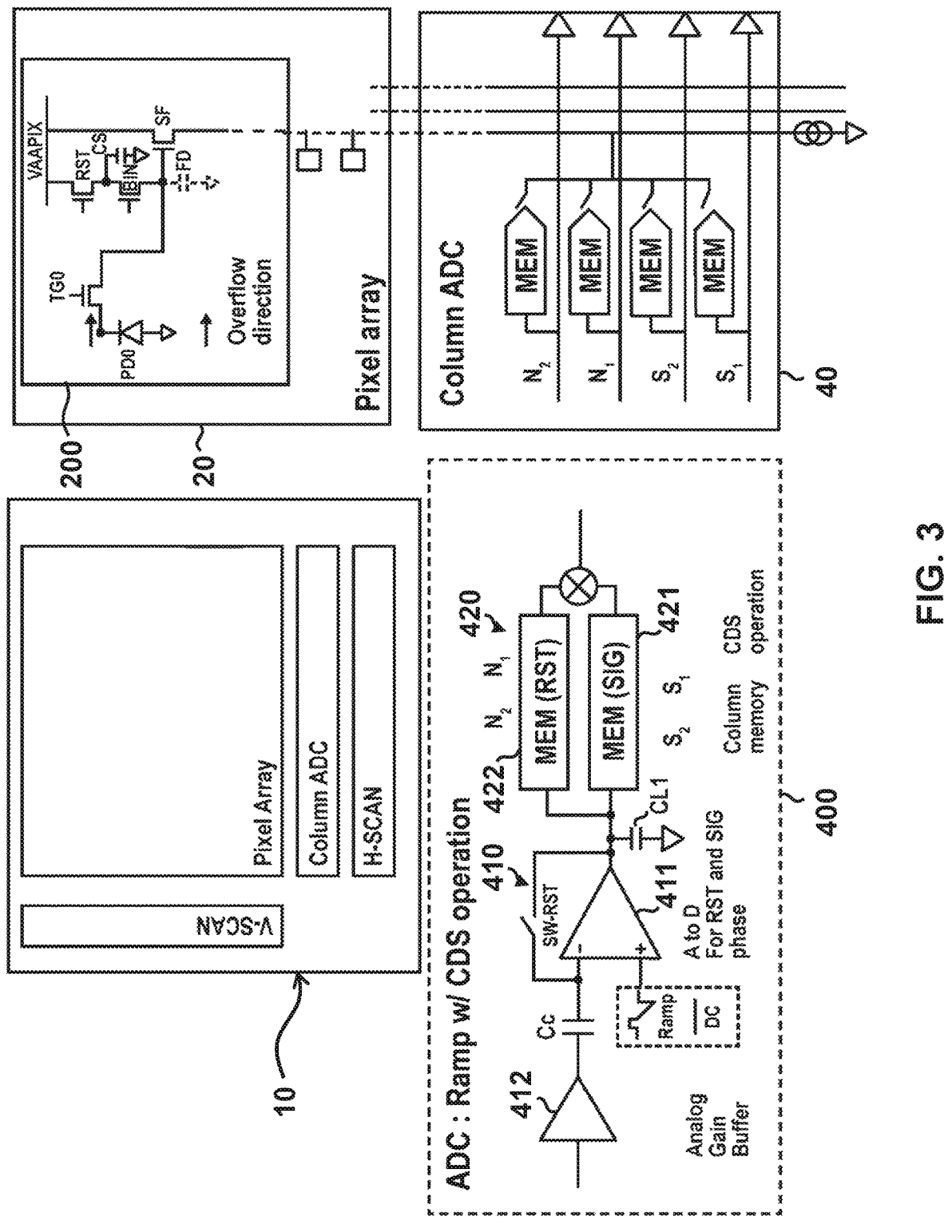
FIG. 3 is a circuit diagram showing an example configuration of a column reading circuit of the solid-state imaging device relating to the first embodiment of the present disclosure and an example configuration of an analog-to-digital converter (ADC) applied to the column reading circuit.
Figure 4:
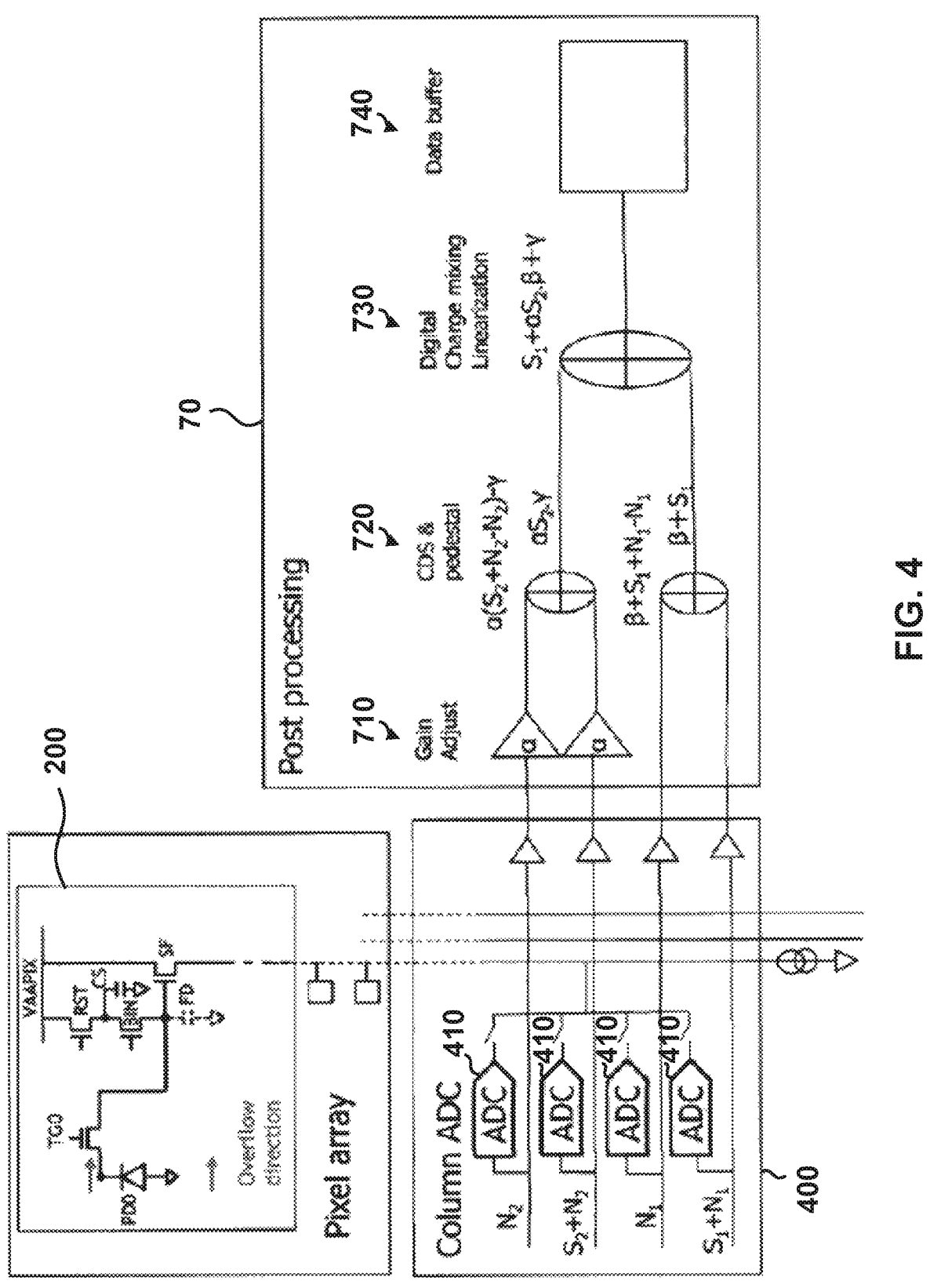
FIG. 4 is a block diagram showing an example configuration of the column reading circuit of the solid-state imaging device relating to the first embodiment of the present disclosure and an example configuration of a digital processing part (ISP) connected to the column reading circuit.

FIG. 1 is a block diagram showing an example overall configuration of a solid-state imaging device relating to a first embodiment of the present disclosure. FIG. 2 is a circuit diagram showing an example of the pixels of the solid-state imaging device relating to the first embodiment of the present disclosure. FIG. 3 is a circuit diagram showing an example configuration of a column reading circuit of the solid-state imaging device relating to the first embodiment of the present disclosure and an example configuration of an analog-to-digital converter (ADC) applied to the column reading circuit. FIG. 4 is a block diagram showing an example configuration of the column reading circuit of the solid-state imaging device relating to the first embodiment of the present disclosure and an example configuration of an digital processing part connected to the column reading circuit.

In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, a timing control circuit 60, and a digital processing part (ISP) 70. Among these components, for example, the vertical scanning circuit 30, reading circuit 40, horizontal scanning circuit 50, timing control circuit 60 and digital processing part 70 constitute a reading part 80 for reading pixel signals.

In the first embodiment, the solid-state imaging device 10 is configured such that pixels 200 arranged in a matrix pattern in the pixel part 20 (or the pixel part 20) can perform photoelectric conversion to produce charges and store the charges. The stored photo charges can be read with different conversion gains at least once. The conversion gains include, for example, a first conversion gain (high conversion gain: HCG) and a second conversion gain (low conversion gain: LCG). This configuration will be described in detail below. The reading part 80 controls the reading of the pixel signals from the pixels 200 of the pixel part 20 with different conversion gains.

In the present embodiment, since correlated double sampling (CDS) is later performed, the signals that can be read from each pixel 200 include two sets of a reset signal VRST (N1, N2) and a luminance signal VSIG (S1, S2), specifically, a first reset signal VRST1 (may be hereinafter referred to as N1), a first luminance signal VSIG1 serving as a stored charge signal SAC (may be hereinafter referred to as S1), a second reset signal VRST2 (may be hereinafter referred to as N2), and a second luminance signal VSIG2 serving as an overflow charge signal SOV (may be referred to as S2).

The solid-state imaging device 10 relating to the first embodiment characteristically employs a lateral overflow storage capacitance (LOFIC) configuration to achieve improved pixel dynamic range.

Having the LOFIC configuration, the pixels each have a storage capacitor (CS) serving as a storage capacitance element and a storage transistor (BIN) serving as a storage connection element in addition to basic constituents including a photodiode (PD), a floating diffusion (FD), a transfer transistor (TG), a reset transistor (RST) and a source follower transistor (SF), so that overflow charges (charges beyond saturation) overflowing from the photodiode within the same exposure period are not wasted but stored in the storage capacitor (CS).

The LOFIC pixel can have two types of conversion gains: the conversion gain determined by the capacitance Cfd1 of the floating diffusion FD (high gain: proportional to 1/Cfd1); and the conversion gain determined by the sum of the capacitance Cfd1 of the floating diffusion and the LOFIC capacitance Clofic of the storage capacitor CS (low gain: proportional to 1/(Cfd1+Clofic)). In other words, the LOFIC pixels can achieve high full well capacity and low dark noise using a low conversion gain (LCG) signal and a high conversion gain (HCG) signal.

In the solid-state imaging device 10 relating to the first embodiment, the second luminance signal S2 and second reset signal N2 associated with the overflow charge signal SOV are read with the low conversion gain (LCG), and the first luminance signal S1 and first reset signal N1 associated with the stored charge signal SAC are read with the high conversion gain (HCG).

In the first embodiment, the reading part 80 includes an analog-to-digital converter (ADC) 410, a column memory 420, and a digital processing part 70. The ADC 410 performs analog-to-digital (AD) conversion on the analog overflow charge signal SOV and on the analog stored charge signal SAC from the photodiode (photoelectric conversion element) PD and outputs a resulting digital overflow charge signal DOV and a resulting digital stored charge signal DAC. The digital processing part 70 performs linearization on the overflow charge signal and stored charge signal output from the ADC 410, which are produced with different gains and offsets as they are stored in different nodes. The reading part 80 controls the floating diffusion FD serving as an output node, a first storage node ND1 of the photodiode PD, and a second storage node ND2 of the storage capacitor CS such that they are coupled with each other to perform reading of the overflow charge signal, and controls the floating diffusion FD serving as the output node and the second storage node ND2 of the storage capacitor CS such that they are separated from each other to perform reading of the stored charge signal.

In the first embodiment, the reading part 80 controls a sequence of operations to read the pixel signals such that the reading of the overflow charge signal SOV happens prior to the reading of the stored charge signal SAC without charge mixing at the floating diffusion FD serving as the output node. In the first embodiment, the reading part 80 controls a sequence of operations to read the pixel signals such that a low conversion gain signal reading operation LCGSIG, a low conversion gain reset reading operation LCGRST, a high conversion gain reset reading operation HCGRST, and a high conversion gain signal reading operation HCGSIG sequentially take place.

Each pixel 200 can be configured such that the overflow charges can be skimmed by a charge discharge path connected to the first storage node ND1 of the photodiode PD.

The ADC 410 is configured to perform at least one or more AD conversions with different gains in a single frame period on each signal output from an output buffer part 211 of the pixel 200.

The pixel 200 or reading part 80 includes a redundant memory RMEM for temporarily storing the stored charge signal SAC, so that offset correction can be performed at least for each pixel. In the first embodiment, a memory MEM for temporarily storing a result of analog-to-digital converting the stored charge signal SAC is provided for each pixel, each column, or outside the chip. Each pixel 200 has a memory arranged therein that has a flag bit FLG so that a signal to be captured can be automatically selected depending on the level of the signal.

In the first embodiment, the digital processing part 70 can perform signal processing for the linearity of the signals by digitally performing saturation variation correction and gain correction for each pixel. The digital processing part 70 combines the stored charge signal DAC and overflow charge signal DOV to obtain the total amount of the charges while linear photo response can be achieved without a loss in the signal region between the first and second storage nodes ND1 and ND2, and adds redundant digital memory data to the digital code of each pixel.

The pixel 200 of the solid-state imaging device 10 relating to the present embodiment has the following characteristic components to not only reduce the size of the pixels while the sensitivity and full well capacity remain unchanged but also prevent an increase in junction capacitance and wiring capacitance, prevent an increase in capacitance of the floating diffusion serving as the output node to prevent a drop in conversion gain, and eventually achieve improved noise characteristics, and to secure maximized photo-responsiveness, to ensure low optical SNR in addition to reproducibility, to achieve high saturation and little dark noise, and to further reduce the pixel size, thereby efficiently improving important performance factors such as the dynamic range, responsiveness, and resolution.

The following first briefly describes characteristic configurations of the solid-state imaging device 10 relating to the first embodiment, such as the pixel 200 and pixel part 20, a column reading circuit 40 including the ADC 410 of the reading part 80, and the digital processing part 70, and then moves onto detailed description of the pixel configuration, the configurations and functions of the column reading circuit 40 including the ADC 410 of the reading part 80 and digital processing part 70.

<Overview of Characteristic Components of Solid-State Imaging Device 10 Relating to First Embodiment Such as Pixel and Column Reading System>

In the pixel 200 of the solid-state imaging device 10 of the first embodiment, a signal beyond saturation is completely transferred (overflows) from the photodiode PD to the floating diffusion FD, and the overflow charges can be stored in the storage (connecting) capacitor CS having a capacitance corresponding to the capacitance of the floating diffusion FD. The transfer transistor (TG-Tr) can transfer the charges stored in the PD node of the photodiode PD serving as the first storage node ND1.

As shown in FIG. 2, the pixel 200 includes the floating diffusion FD serving as the output node, the photodiode PD, the transfer transistor (TG-Tr), the reset transistor (RST-Tr), a binning transistor (BIN-Tr), and a source follower transistor (SF-Tr). The photodiode PD is formed by a pinned photodiode to which the transfer transistor TG-Tr is connected in order to transfer the charges to the floating diffusion FD. The reset transistor RST-Tr is connected to forcibly set the floating diffusion FD to a reset level (Vrst) before the charges are transferred. In the pixel 200, the electrons produced by the photoelectric conversion at the photodiode PD are stored in the first storage node ND1 of the photodiode PD, and transferred to the floating diffusion FD serving as the output node via the transfer transistors TG-Tr.

The reading part 80 can start the sequence of operations to read the pixel signal by reading the overflow charge signal (Qfd) of the floating diffusion FD. After this, as the second step, the PD signal (Qpd) is read out. Therefore, the total amount of photo charges is equal to the sum of the charges in the photodiode PD and the charges in the floating diffusion FD (Qpd+Qfd).

The signals representing the stored photo charges can be read out within a single frame using memories MEM (SIG) 421 and MEM (RST) 422 respectively provided in a column- or pixel-wise ADC 410, as shown in FIGS. 3 and 4. The reading of the floating diffusion FD with a plurality of conversion gains is designed to cover a range of signals, that is to say, from low illuminance (the high conversion gain of the FD and an analog gain corresponding to a small amount of charges in the PD) to high illuminance (the low conversion gain of the FD and an analog gain corresponding to a large amount of overflow FD charges). This sequence of operations can result in improved dynamic range and enhanced SNR in low-illuminance environment.

The AD conversion and digital CDS are performed on the signals representing the stored photo charges with corresponding conversion gains, to convert the reset signals (N1, N2) corresponding to the charges Qpd and Qfd and the combined signals (S1+N1, S2+N2) obtained by combining the luminance and reset signals into digital codes. These digital codes can be linearized after post-data processing, which is performed by the digital processing part 70 on the pixel data stored in the memories in the pixel, column, and frame domain.

The digital processing part 70 of the solid-state imaging device 10 relating to the first embodiment is configured to minimize the signal gap per pixel that is generated after the linearization performed on the signals that respectively represent the overflow charges and PD charges and that are produced with different gains and offsets since the overflow charges and PD charges are stored at different nodes.

The digital processing part 70 relating to the first embodiment includes a gain adjusting part 710, a CDS processing part 720, a digital charge mixing linearization part 730, and a data buffer 740 to linearize the signals representing the stored charges, as shown in FIG. 4.

In order to linearize the signals representing the stored charges, the gain adjusting part 710 of the digital processing part 70 first globally adjusts the signal gain in the digital domain. After this, a corresponding offset value is added, and the conjunction point between the two different pieces of stored data at the photodiode PD and floating diffusion FD is fixed. Although there is some variation in the PD stored charges, smooth signal conjunction is achieved due to the linearization of the two signals representing the charges stored at the PD and FD nodes. This is because the charges in all of the PDs have redundancy to keep the full well capacity of each PD within the ADC window. In other words, as long as operations are performed on the signals of each pixel such that the starting point of the overflow charges matches the full well capacity of the photodiode PD, linear signal characteristics can be accomplished for the stored charges Qfd(i,j)+Qpd(i,j) in each pixel.

<Specific Examples of Characteristic Components of Solid-State Imaging Device 10 Relating to First Embodiment Such as Pixel 200, Column Reading System 400 and Digital Processing Part 70>

The above has briefly described the characteristic components of the solid-state imaging device 10 relating to the first embodiment, such as the pixel, column reading system, digital processing part. The following now describes the specific examples of the characteristic configurations of the solid-state imaging device 10 relating to the first embodiment such as the pixel 200, column reading system 40 and digital processing part 70.

<Overview of Characteristic Components of Solid-State Imaging Device 10 Relating to First Embodiment Such as Pixel>

In the solid-state imaging device 10 of the first embodiment, the pixel 200 includes a photodiode PD, and a first saturation signal beyond saturation is completely transferred (overflows) from the photodiode PD to the floating diffusion FD, and the overflow charges can be stored in the storage (connecting) capacitor CS having a capacitance corresponding to the capacitance of the floating diffusion FD. The transfer transistor (TG-Tr) can transfer the charges stored in the PD node of the photodiode PD (the first storage node ND1).

The photodiode PD is connected to the transfer transistor TG-Tr serving as a transfer gate. The transfer transistor TG-Tr can transfer the charges stored in the PD node of the photodiode PD to the floating diffusion FD.

The pixel 200 includes, in addition to the photodiode PD, the floating diffusion FD, the transfer transistor TG-Tr, the reset transistor RST-Tr, the binning (BIN) transistor BIN-Tr, and the source follower (SF) transistor SF-Tr.

The photodiode PD is formed by a pinned photodiode having a charge transfer path to which the transfer transistor TG-Tr is connected to transfer the charges to the floating diffusion FD. The electrons produced by the photoelectric conversion are stored in the photodiode PD and transferred to the floating diffusion FD via the transfer transistor TG-Tr.

The signals representing the stored photo charges can be read out within a single frame using a pair of memories for the signals provided in a column- or pixel-wise ADC. Such multi-node multi-gain readout scheme can accomplish increased dynamic range, so that signals can be reliably produced over a wide range of conditions from low illuminance (high gain) to bright light (low gain).

AD conversion may occur for each signal corresponding to the stored photo charges, and at least two or more AD conversions are available with different conversion gains. These digital codes can be linearized after post data processing.

In the solid-state imaging device 10 relating to the first embodiment, the pixel part 20 includes pixels, and each pixel includes a photoelectric conversion reading part 210, and the column reading circuit 40 includes an analog-to-digital (AD) converting part 410 and a memory part 420. The solid-state imaging device 10 is configured, for example, as a stacked CMOS image sensor. The solid-state imaging device 10 may be configured to be capable of operating in a global shutter mode. In the solid-state imaging device 10 relating to the first embodiment, each column of the array of pixels has the analog-to-digital (AD) converting part 410, and the AD converting part 410 includes a comparator 411 for comparing the voltage signal read out by the photoelectric conversion reading part against a referential voltage to analog-to-digital (AD) convert the read-out voltage signal VSIG and VRST and outputting a resulting digital comparison result signal.

Under the control of the reading part 80, the comparator 411 performs a first comparing operation and a second comparing operation. The first comparing operation is designed to output a digital first comparison result signal obtained by processing the voltage signal corresponding to the overflow charges that overflow from the photodiode PD to the floating diffusion FD serving as the output node in an integration (exposure) period. The second comparing operation is designed to output a digital second comparison result signal obtained by processing the voltage signal corresponding to the charges stored in the photodiode PD that are transferred to the floating diffusion serving as the output node in a transfer period following the integration period.

If irregular and strong light enters the photodiode PD during the second comparing operation, charges may overflow from the photoelectric conversion element to the floating diffusion FD to cause a change in the FD level. According to the present embodiment, a shutter gate (SG) may be provided to allow the unnecessary charges to be released from the photodiode PD to a region that is outside the floating diffusion FD region and thus prevent a change in the level of the FD. In this way, even if irregular and strong light enters the photodiode PD during the second comparing operation, a change in the FD level is prevented and AD conversion is successfully completed.

The following outlines the configurations and functions of the parts of the solid-state imaging device 10. In particular, the configurations and functions of the pixel part 20 and pixels, the relating read-out scheme of the column reading circuit 40 and digital processing part 70, and the reading operations will be described in detail, and other features will be also described in detail.

<Example Configuration of Pixel 200>

FIG. 2 shows an example of the pixel circuit of the solid-state imaging device 10 relating to the first embodiment of the present disclosure.

In the pixel part 20, a plurality of pixels 200 are arranged in a matrix of N rows and M columns.

The pixels 200 relating to the first embodiment each include the photoelectric conversion reading part 210, and the column reading circuit 40 includes the AD converting part 410 and the memory part 420.

The photoelectric conversion reading part 210 of the pixel 200 includes a photodiode (photoelectric conversion element) PD and one in-pixel amplifier.

The photodiode PD performs photoelectric conversion to generate charges and store the generated charges in an integration period. The transfer transistor TG-Tr serving as the transfer element is connected between the first storage node ND1 of the photodiode PD and the floating diffusion FD.

The photoelectric conversion reading part 210 includes, for one floating diffusion FD serving as the output node, one reset transistor RST-Tr serving as a reset element, one source follower transistor SF-Tr serving as a source follower element, one storage transistor BIN-Tr serving as a storage element, one storage capacitor CS serving as a storage capacitance element, and one reading node ND3. The photoelectric conversion reading part 210 can further include a selection transistor SEL-Tr serving as a selecting element.

In the first embodiment, the source follower transistor SF-Tr and the reading node ND3 together constitute an output buffer part 211. The storage transistor BIN-Tr and the storage capacitor CS together constitute a gain switching part 212.

In the photoelectric conversion reading part 210 relating to the first embodiment, the reading node ND3 of the output buffer part 211 is connected to the input part of the AD converting part 410. The photoelectric conversion reading part 210 converts the charges in the floating diffusion FD serving as an output node into a voltage signal at a level corresponding to the amount of the charges and outputs the voltage signal VRST, VSIG to the AD converting part 410.

The reading part 80 controls the photoelectric conversion reading part 210 relating to the first embodiment such that the charges stored in the first storage node ND1 of the photodiode PD serving as the photoelectric conversion element and the charges stored in the second storage node ND2 of the storage capacitor CS may be read out in, for example, a LOFIC read-out mode RML.

For example, the photoelectric conversion reading part 210 outputs, in a first comparing operation period PCMP1 of the AD converting part 410, a voltage signal VSIG (VRST) corresponding to the overflow charges overflowing from the photodiode PD serving as the photoelectric conversion element to the floating diffusion FD serving as the output node in an integration period PI.

The photoelectric conversion reading part 210 outputs a read-out reset signal (signal voltage) (VRST) and a read-out signal (signal voltage) (VSIG), as a pixel signal, to the AD converting part 410 in a second comparing operation period PCMP2.

The photodiode PD generates signal charges (electrons) in an amount in accordance with the quantity of the incident light and stores the generated signal charges. Description will be hereinafter given of a case where the signal charges are electrons and each transistor is an n-type transistor. However, it is also possible that the signal charges are holes or each transistor is a p-type transistor.

The photodiode (PD) in each pixel 200 is a pinned photodiode (PPD). On the substrate surface for forming the photodiodes (PDs), dangling bonds or other defects form interface states. Therefore, heat energy may cause a lot of charges (dark current), which may undermine reading of correct signals. The pinned photodiodes (PPDs) have the charge storage part buried in the substrate, thereby reducing mixing of the dark current into the signals.

The transfer transistor TG-Tr of the photoelectric conversion reading part 210 is connected between the first storage node ND1 of the photodiode PD and the floating diffusion FD and controlled by a control signal TG applied to the gate thereof through a control line. The transfer transistor TG-Tr remains selected and in the conduction state during a transfer period PT in which the control signal TG is at the high (H) level, to transfer to the floating diffusion FD the charges (electrons) produced by the photoelectric conversion and then stored in the photodiode PD. After the photodiode PD and the floating diffusion FD are reset to a predetermined reset potential, the transfer transistor TG-Tr enters the non-conduction state with the control signal TG being set to the low (L) level and the photodiode PD enters an integration period PI. Under these circumstances, if the intensity of the incident light is very high (the amount of the incident light is very large), the charges above the full well capacity overflow into the floating diffusion FD as overflow charges through the overflow path under the transfer transistor TG-Tr.

The reset transistor RST-Tr is connected between the power supply line Vaapix of the power supply voltage VAAPIX and the floating diffusion FD and controlled by a control signal RST applied to the gate thereof through a control line. The reset transistor RST-Tr remains selected and in the conduction state during a reset period in which the control signal RST is at the H level, to reset the floating diffusion FD to the potential (Vrst) of the power supply line Vaapix of the power supply voltage VAAPIX.

The storage transistor BIN-Tr serving as a connection element is connected between the floating diffusion FD and the reset transistor RST-Tr, and the storage capacitor CS is connected between the second storage node ND2 serving as a connection node and the reference potential VSS. The storage transistor BIN-Tr is controlled by a control signal BIN applied to the gate thereof through a control line. The storage transistor BIN-Tr remains selected and in the conduction state during a reset period in which the control signal BIN is at the H level so as to connect the floating diffusion FD and the storage capacitor CS.

In the first embodiment, the reading part 80 controls a sequence of operations to read a pixel signal such that the reading of the overflow charge signal SOV happens prior to the reading of the stored charge signal SAC without charge mixing at the floating diffusion FD serving as the output node. In the first embodiment, the reading part 80 controls the sequence of operations to read the pixel signal such that a low conversion gain signal reading operation LCGSIG, a low conversion gain reset reading operation LCGRST, a high conversion gain reset reading operation HCGRST and a high conversion gain signal reading operation HCGSIG sequentially takes place.

The low conversion gain signal reading operation LCGSIG and low conversion gain reset reading operation LCGRST are performed while the storage transistor BIN-Tr remains in the conduction state, so that the charges of the floating diffusion FD serving as the output node are combined with the charges in the storage capacitor CS. The low conversion gain reset reading operation LCGRST is performed while the reset transistor RST-Tr and the storage transistor BIN-Tr remain in the conduction state, so that the charges of the floating diffusion FD serving as the output node ND and the charges of the storage capacitor CS are cleared. The high conversion gain reset reading operation HCGRST and high conversion gain signal reading operation HCGSIG are performed while the storage transistor BIN-Tr remains in the non-conduction state, so that the charges in the floating diffusion FD serving as the output node are separated from the charges in the storage capacitor CS.

The source follower transistor SF-Tr serving as the source follower element is connected at the source thereof to the reading node ND3, at the drain thereof to the power supply line Vaapix, and at the gate thereof to the floating diffusion FD. The reading node ND3 forming the output buffer part 211 is connected to a signal line LSGN1, which is connected to the input part of the AD converting part 410. A current source element is connected between the signal line LSGN1 to which the reading node ND3 is connected and the reference potential VSS (for example, GND). The signal line LSGN1 between the reading node ND3 and the input part of the AD converting part 410 is driven by the current source element.

The AD converting part 410 compares the analog voltage signal VSIG output from the photoelectric conversion reading part 210 against the referential voltage VREF, which has a ramp waveform varying with a predetermined gradient or a fixed voltage level, to convert the analog signal into a digital signal.

As shown in FIG. 3, the AD converting part 410 includes a comparator (COMP) 421, an input-side coupling capacitor CC, an analog gain buffer 412, an output-side load capacitor CL1, and a reset switch SW-RST.

In the comparator 411, a first input terminal or inversion input terminal (−) receives the voltage signal VSIG fed thereto, which is output from the output buffer part 211 of the photoelectric conversion reading part 210 to the signal line LSGN1, and a second input terminal or non-inversion input terminal (+) receives the referential voltage VREF fed thereto. The comparator 411 performs AD conversion (a comparing operation) of comparing the voltage signal VSIG against the referential voltage VREF and outputting a digital comparison result signal SCMP.

The first input terminal or inversion input terminal (−) of the comparator 411 is connected to the coupling capacitor CC. In this way, the output buffer part 211 of the photoelectric conversion reading part 210 is AC coupled to the input part of the comparator 411 of the AD converting part 410, so that the noise can be reduced and high SNR can be achieved when the illuminance is low.

As for the comparator 411, the reset switch SW-RST is connected between the output terminal and the first input terminal or inversion input terminal (−), and the load capacitor CL1 is connected between the output terminal and the reference potential VSS.

In the AD converting part 410, basically, the comparator 411 compares the analog signal (the potential VSIG) read from the output buffer part 211 of the photoelectric conversion reading part 210 to the signal line LSGN1 against the referential voltage VREF, for example, a ramp signal RAMP that linearly changes with a certain gradient or has a slope waveform. During the comparison, a counter (not shown), which is provided for each column as is the comparator 411, is operating. The ramp signal RAMP having a ramp waveform and the value of the counter vary in a one-to-one correspondence, so that the voltage signal VSIG is converted into a digital signal. Basically, the AD converting part 410 converts a change in voltage, in other words, a change in the referential voltage VREF (for example, the ramp signal RAMP) into a change in time, and counts the change in time at certain intervals (with certain clocks). In this way, a digital value is obtained. When the analog signal VSIG and the ramp signal RAMP (the referential voltage VREF) cross each other, the output from the comparator 411 is inverted, the clock input into the counter (not shown) is stopped or the suspended clock is input into the counter (not shown), and the value (data) of the counter at that timing is saved in the memory part 420. In this way, the AD conversion is completed. After the end of the above-described AD converting period, the data (signal) stored in the memory part 420 is output through the column reading circuit 40 to the digital processing part 70 and subject to predetermined signal processing, so that a two-dimensional image is produced.

The memory part 420 is formed by an SRAM or DRAM, receives digital signals fed thereto, is compatible with photo conversion codes, and can be read by an external IO buffer in the column reading circuit 40 near the pixel array. In the present example, the memory part 420 includes two memories 421 and 422 connected to the output from the comparator 411.

The vertical scanning circuit 30 drives the photoelectric conversion reading parts 210 of the pixels 200 through row-scanning control lines in shutter and reading rows, under the control of the timing control circuit 60. The vertical scanning circuit 30 feeds the referential voltage VREF, which is set in accordance with the comparing operation, to each comparator 411, under the control of the timing control circuit 60. Further, the vertical scanning circuit 30 outputs, according to an address signal, row selection signals indicating the row addresses of the reading row from which signals are to be read out and the shutter row in which the charges stored in the photodiodes PD are to be reset.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel.

The column reading circuit 40 may include a correlated double sampling (CDS) circuit, an analog-to-digital converter (ADC), an amplifier (AMP), a sample/hold (S/H) circuit, and the like.

As shown in FIGS. 3 and 4, for example, the column reading circuit 40 may include a plurality of AD converting parts 410 described above for converting the read-out signals VSIG output from the respective columns of the pixel part 20 into digital signals. In this case, the AD converting parts 410 may be referred to as column AD converting parts 410.

The timing control circuit 50 generates timing signals required for signal processing in the pixel part 20, the vertical scanning circuit 30, the column reading circuit 40, and the like.

In the first embodiment, the reading part 80 controls reading of the pixel signals from the pixels 200.

The following further describes how to read the pixel signals in the first embodiment. In the first embodiment, the reading method applicable to the pixels can be typified by the methods applicable to the following first and second cases.

The first case is applied to single exposure high dynamic range (SEHDR) performance. A dual conversion gain scheme is used, specifically, the high conversion gain (first conversion gain) HCG and the low conversion gain (second conversion gain) LCG are both used. In this case, the charges in the photodiode PD are read with the high conversion gain HCG, and the charges in the floating diffusion FD are read with the low conversion gain LCG.

The second case is applied to the LOFIC mode. A dual conversion gain scheme is used, specifically, the high conversion gain (first conversion gain) HCG and the low conversion gain (second conversion gain) LCG are both used. In this case, the charges in the photodiode PD are read with the high conversion gain HCG, and the charges in the floating diffusion FD are read with the low conversion gain LCG.

Figure 5:
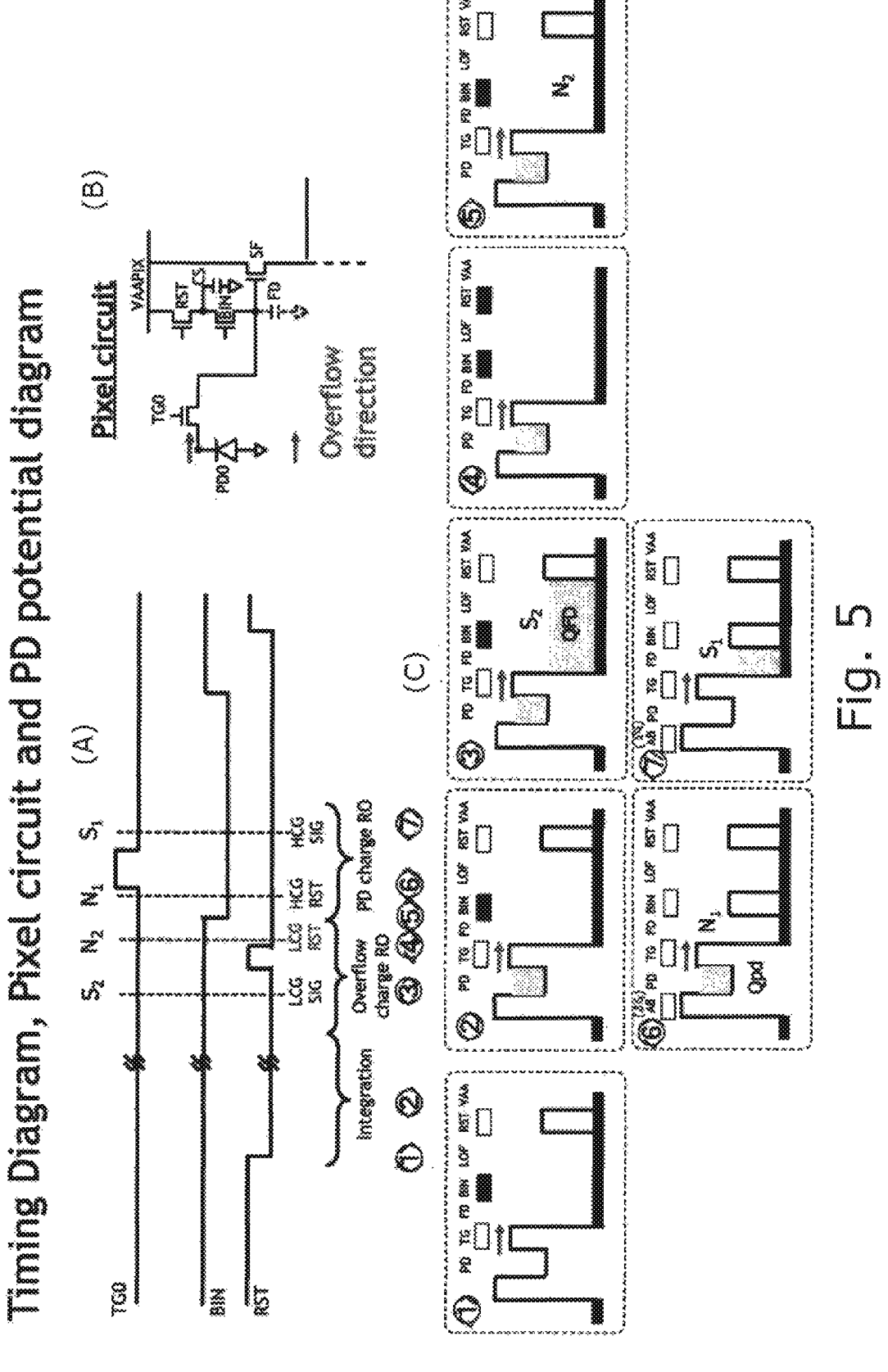
FIG. 5 shows an example of a reading method applicable to the pixel of the solid-state imaging device relating to the first embodiment of the present disclosure, showing an example of a circuitry of the pixel, a timing chart and potential transition in relation with each other.

FIG. 5 includes views (A), (B) and (C) showing an example of a reading method applicable to the pixel of the solid-state imaging device relating to the first embodiment of the present disclosure, showing an example of the circuitry of the pixel, a timing chart and potential transition in relation with each other.

According to the example shown, upon elapse of a charge integration period, a dual conversion gain operation using LOFIC is firstly performed to read the charges in the photodiode PD. Specifically, in the first embodiment, the reading part 80 controls a sequence of operations to read the pixel signal such that the reading of the overflow charge signal SOV happens prior to the reading of the stored charge signal SAC without charge mixing at the floating diffusion FD serving as the output node. In the first embodiment, the reading part 80 controls the sequence of operations to read the pixel signal such that a low conversion gain signal reading operation LCGSIG, a low conversion gain reset reading operation LCGRST, a high conversion gain reset reading operation HCGRST and a high conversion gain signal reading operation HCGSIG sequentially take place.

The above has described the characteristic components, functions and reading method of the solid-state imaging device 10 relating to the first embodiment including pixels. The following now describes specific examples of the charge mixing and linearization performed by the digital processing part 70 of the solid-state imaging device 10 relating to the first embodiment.

Figure 6:
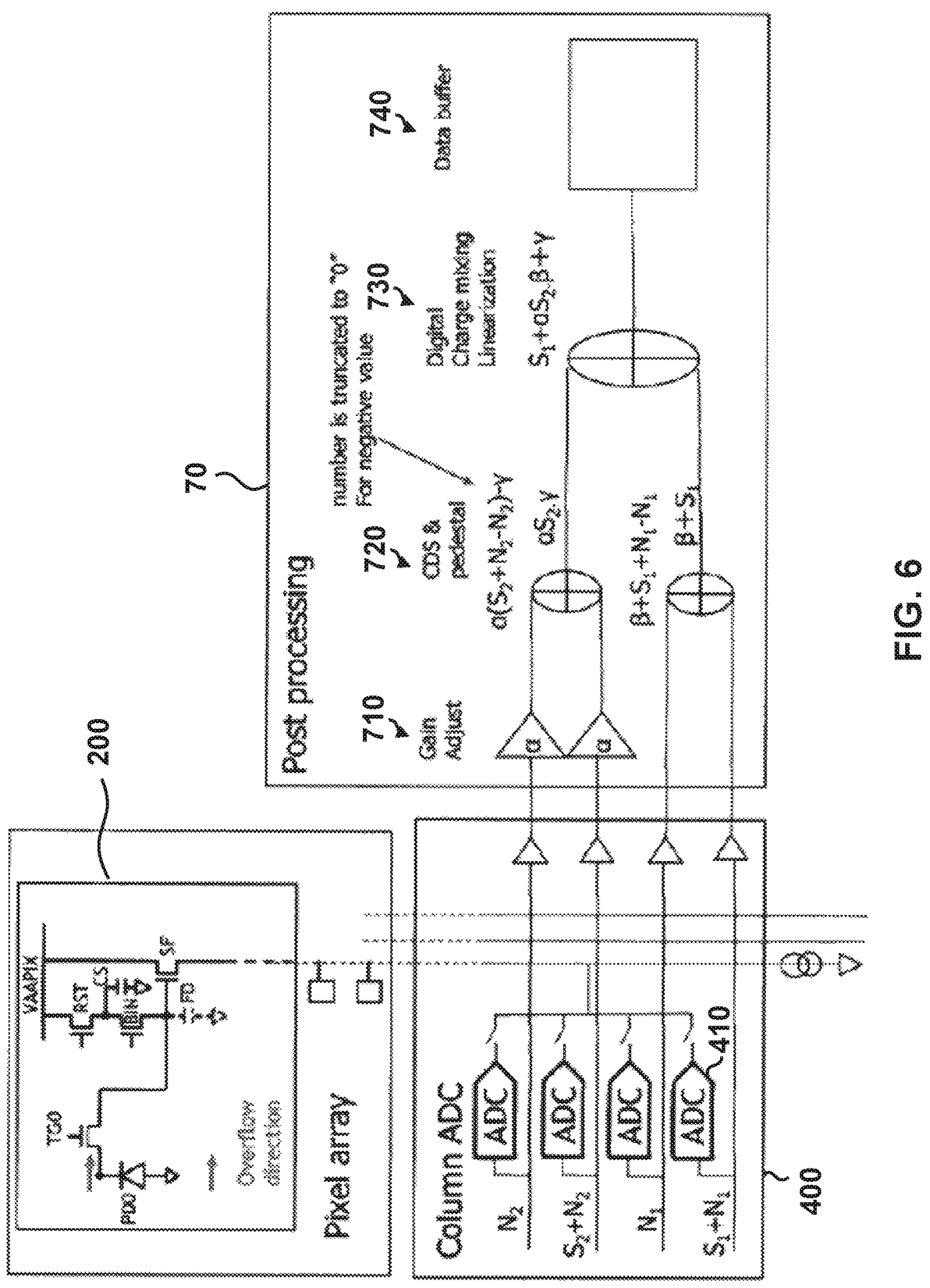
FIG. 6 is used to illustrate a first example of how the column reading circuit and digital processing part of the solid-state imaging device relating to the first embodiment performs a reading operation and charge mixing and linearization.

FIG. 4 is a block diagram showing an example configuration of the column reading circuit of the solid-state imaging device relating to the first embodiment of the present disclosure and an example configuration of the digital processing part connected to the column reading circuit. FIG. 6 is used to illustrate a first example of how the digital processing part 70 of the solid-state imaging device 10 relating to the first embodiment performs charge mixing and linearization.

The digital processing part 70 of the solid-state imaging device 10 relating to the first embodiment is configured to minimize the signal gap per pixel that is generated after the linearization performed on the signals that respectively represent the overflow charges and PD charges and that are produced with different gains and offsets since the overflow charges and PD charges are stored at different nodes.

As has been described with reference to FIG. 4, the digital processing part 70 relating to the first embodiment includes the gain adjusting part 710, CDS processing part 720, digital charge mixing linearization part 730, and data buffer 740 to linearize the respective signals representing the stored charges, as shown in FIG. 4.

In order to linearize the signals representing the stored charges, the gain adjusting part 710 of the digital processing part 70 first globally adjusts the signal gain in the digital domain. After this, the CDS processing part 720 adds a corresponding offset value, and the digital charge mixing linearization part 730 fixes the conjunction point between the two different pieces of stored data at the photodiode PD and floating diffusion FD. Although there is some variation in the PD stored charges, smooth signal conjunction is achieved due to the linearization of the two signals representing the charges stored at the PD and FD nodes. This is because the charges in all of the PDs have redundancy to keep the full well capacity of each PD within the ADC window. In other words, as long as operations are performed on the signals of each pixel such that the starting point of the overflow charges matches the full well capacity of the photodiode PD, linear signal characteristics can be accomplished for the stored charges Qfd(i,j)+Qpd(i,j) in each pixel.

The following now orderly describes the specific examples of the characteristic components and photo response characteristics related to the charge mixing and linearization performed by the digital processing part 70 of the solid-state imaging device 10 relating to the first embodiment.

FIG. 7 includes views (A) to (C) showing a level diagram and an example of photo response in charge mixing at the digital domain.

In FIG. 7, the view (A) shows that the photo charges corresponding to the PD signal are converted with the high gain at the FD node until the saturation level is reached. The overflow charges corresponding to the LOFIC signal are stored and converted in the FD node after the PD charges reach the saturation. The floating diffusion FD can store charges until they reach an overflow charge limit.

In FIG. 7, the view (B) shows the pixel gain and the swing at the FD node, as well as the analog gain and the ADC window. When the pixel gain and the swing at the FD node are applied, the high conversion gain (HCG) produces 1 V and the low conversion gain (LCG) produces 2 V as the LOFIC signal for overflowing. When the analog gain and ADC window are applied, the HCG produces 850 mV@x1V and the LCG produces 850 mV@x2V.

In FIG. 7, the view (C) shows how the illuminance is related to the FD node. Referring to the view (C) in FIG. 7, the Qpd exhibits linear response where Cg[uV/e−] lasts until saturation, and the Qfd indicates that linear response starts after the photodiode PD is saturated and the starting point, which depends on saturation of each PD. The FPN in the vicinity of the start signal of Qfd corresponds to the photodiode PD full well capacity variance. After the linear response, Cg[uV/e−] lasts after the saturation to the overflow charge limit.

Figure 8:
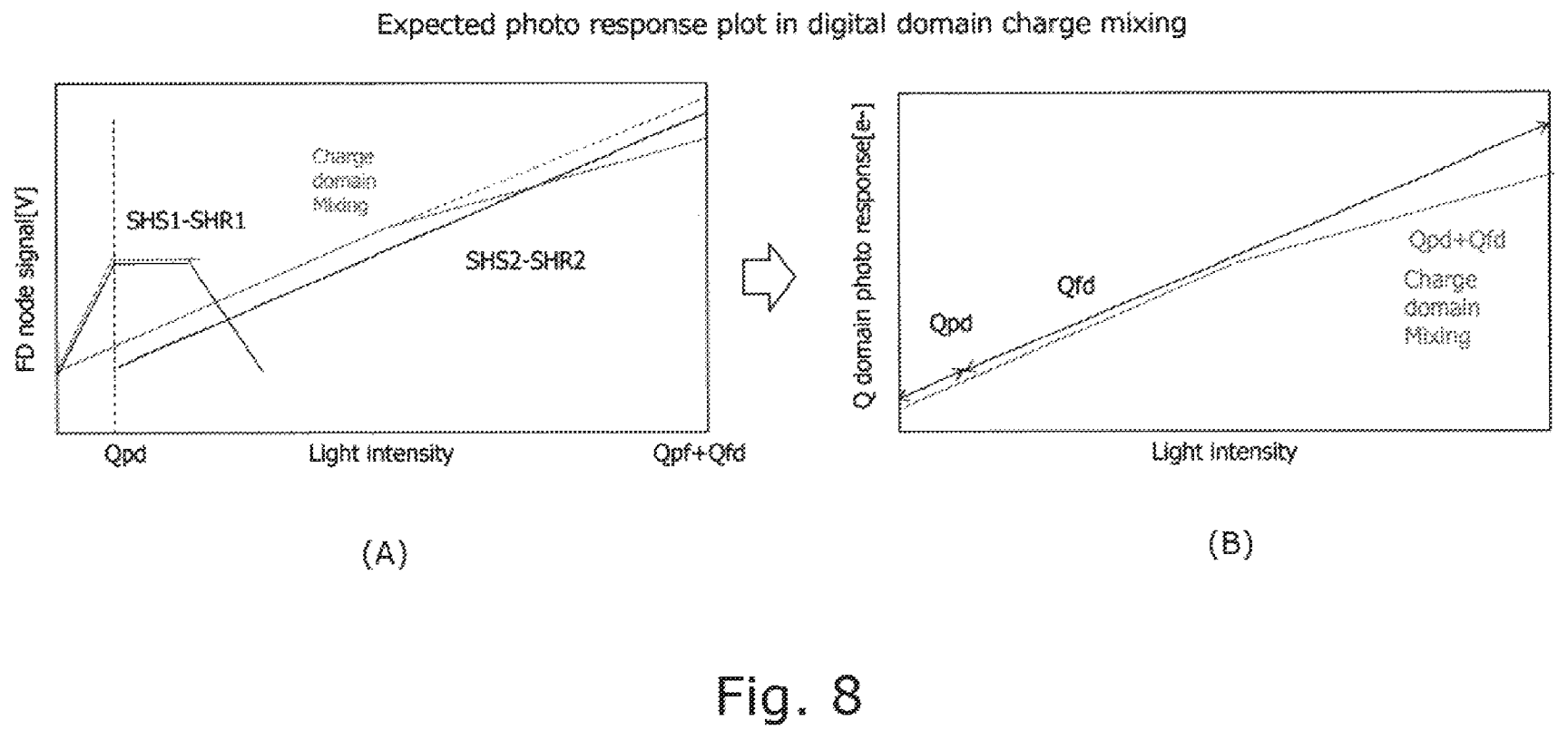

FIG. 8 includes views (A) and (B) showing an example of an expected photo response plot in the digital domain charge mixing. In FIG. 8, the view (A) shows a photo response plot in the charge domain charge mixing, and the view (B) shows a photo response plot in the digital domain charge mixing.

<Charge Mixing at Charge Domain>

In this case, the voltage level of the PD signal and the mixed charges at the FD node are to be read. The PD signal increases until it reaches the saturation level of the photodiode PD with the conversion gain [uV/e−] and according to the photo charges [e−]. The LOFIC signal increases until it reaches the charge transfer limit with the conversion gain [uV/e−] and according to the photo charges [e−]. If the overflow charges exceed the maximum limit of the FD node for charge transfer, the charge transfer lag causes incomplete transfer of the charges from the PD.

<Charge Mixing at Digital Domain>

In this case, the PD signal increases until it reaches the saturation level of the photodiode PD with the conversion gain [uV/e−] and according to the photo charges [e−]. The LOFIC signal increases, after the photodiode PD is saturated, with the conversion gain [uV/e−] and according to the photo charges [e−]. Reading of the signal representing the overflow charges (Qfd) is performed prior to reading of the PD signal (Qpd) without charge mixing at the FD node. The photo charges stored in the respective nodes are read separately, and mixed in the digital domain after being subjected to AD conversion. If the overflow charges exceed the maximum limit of the FD node for charge transfer, the charge transfer lag causes incomplete transfer of the charges from the PD. The first embodiment can prevent this from occurring since the charges are mixed in the digital domain.

Figure 9:
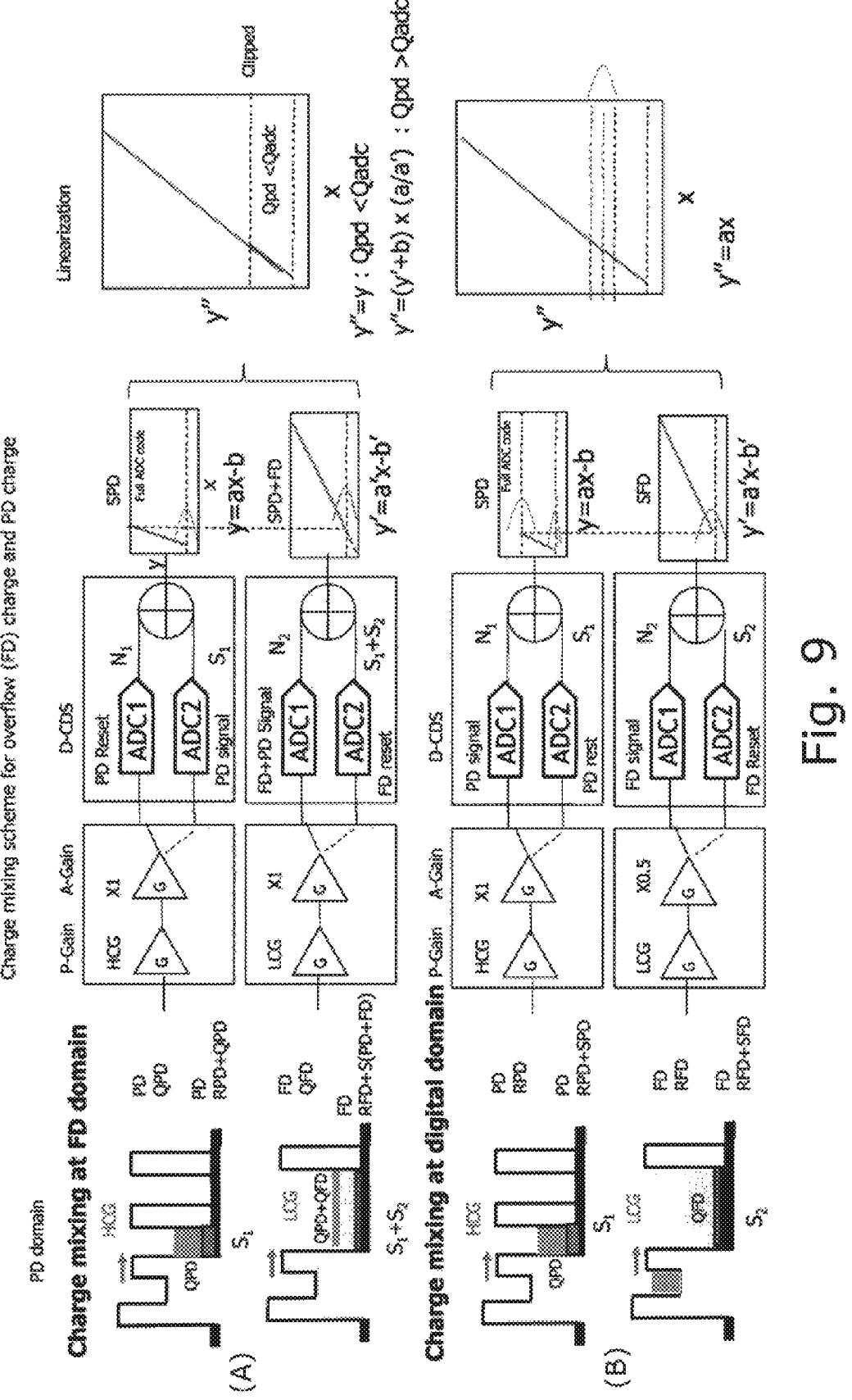
FIG. 9 shows a first example of the charge mixing scheme of the overflow (FD) charges and PD charges performed by the digital processing part of the first embodiment shown in FIG. 6.
Figure 10:
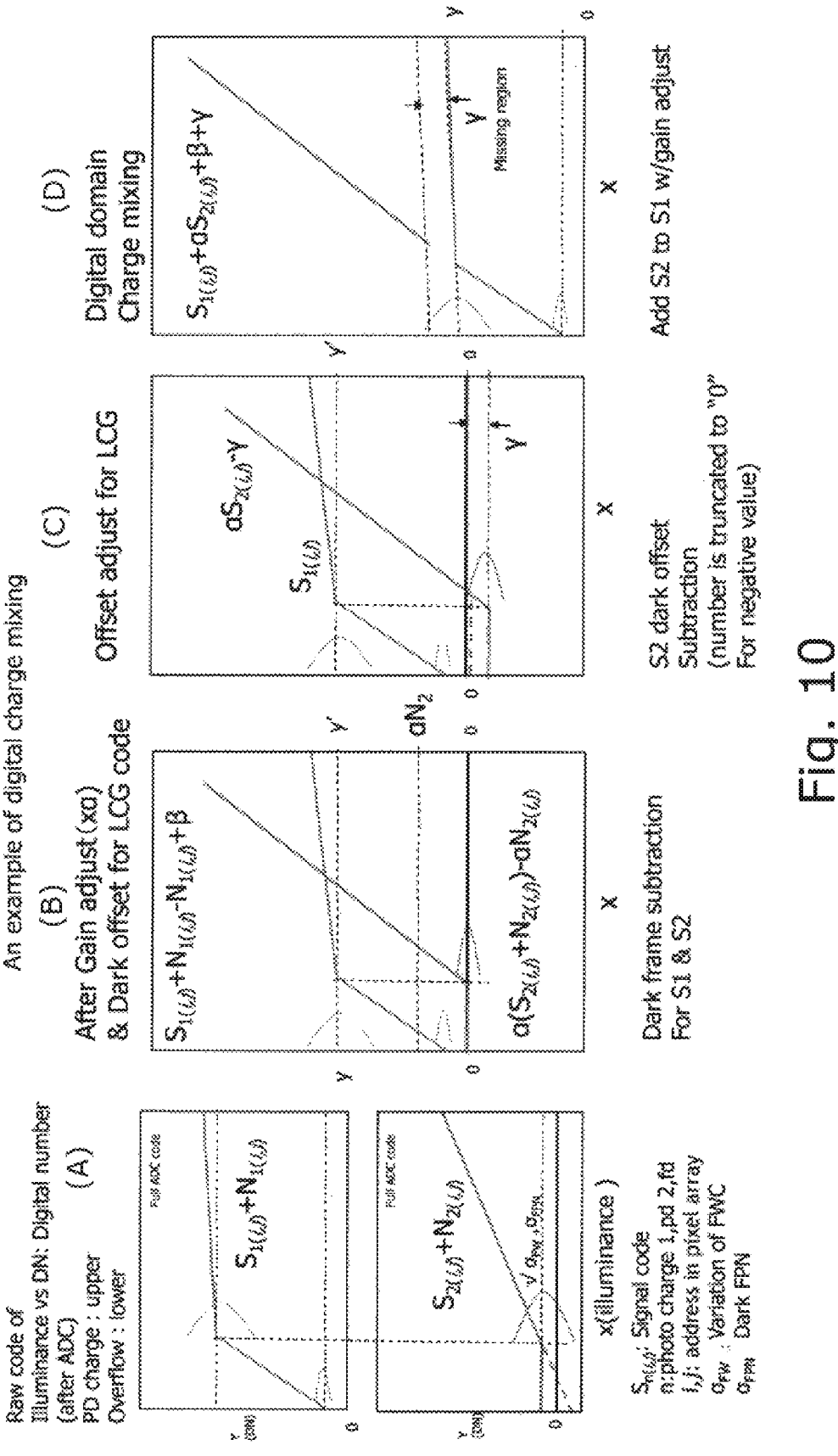
FIG. 10 shows in more detail the charge mixing scheme for the overflow (FD) charges and PD charges in the digital processing part relating to the first embodiment, which is shown in FIG. 9.
Figure 11:
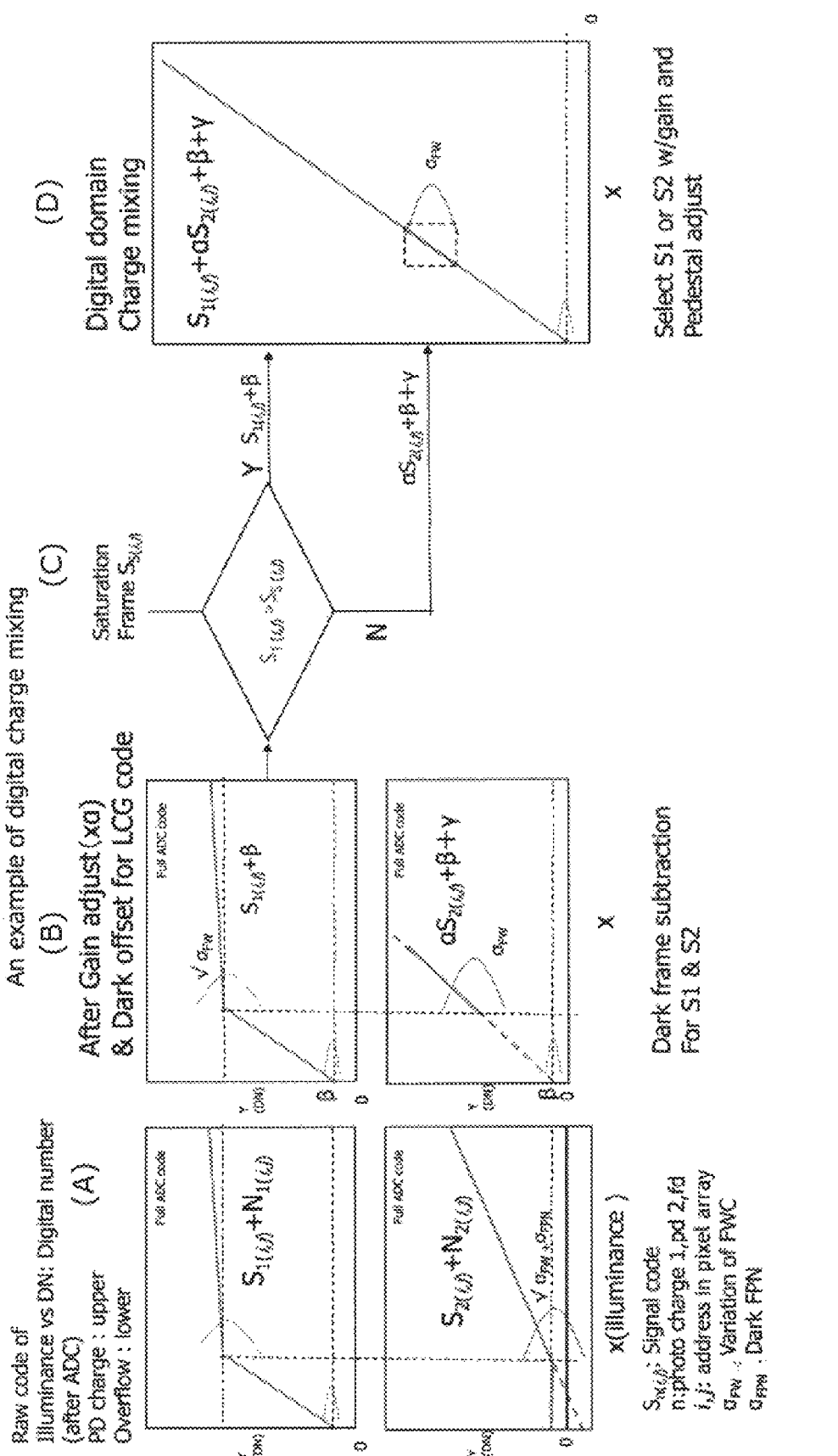
FIG. 11 shows in more detail the charge mixing scheme for the overflow (FD) charges and PD charges in the digital processing part relating to the first embodiment, which is shown in FIG. 9.

FIG. 9 includes views (A) and (B) showing a first example of the charge mixing scheme of the overflow (FD) charges and PD charges performed by the digital processing part of the first embodiment shown in FIG. 6. In FIG. 9, the view (A) shows a comparative example where charge mixing is performed in the FD domain, and the view (B) shows charge mixing performed in the digital domain. FIG. 10 includes views (A) to (D) showing in more detail the charge mixing scheme for the overflow (FD) charges and PD charges in the digital processing part relating to the first embodiment, which is shown in the view (B) in FIG. 9. FIG. 11 includes views (A) to (D) showing in more detail the charge mixing scheme for the overflow (FD) charges and PD charges in the digital processing part relating to the first embodiment, which is shown in the view (B) in FIG. 9.

FIG. 10 includes views (A) to (D) showing how to perform operations on the digital signals, where S1 and N1 show the photoelectric conversion characteristics of the digitized reset and signal levels of the PD signal, and S2 and N2 show the photoelectric conversion characteristics of the digitized reset and signal levels of the overflow charge signal. Referring to FIGS. 9 and 10, the digital processing part 70 performs operations including gain correction and offset correction on the digitized PD stored charge signal S1, reset signal N1, overflow charge stored signal S2 and reset signal N2. In principle, in each pixel, correction is performed in the digital domain to compensate for the offset variation (saturation signal variation and circuit offset variation) that results from the digital processing.

The view (A) in FIG. 10 and the view (A) in FIG. 11 show the raw code of the digital number (DN) after the AD conversion and the illuminance, where the upper graph shows the PD charge signal and the lower graph shows the overflow charge signal. Referring to the view (B) in FIG. 10 and the view (B) in FIG. 11, the gain is adjusted (xα), and the dark offset for the LCG code is then adjusted. Dark frame subtraction is performed on the signals S1 and S2. Referring to the view (C) in FIG. 10 and the view (C) in FIG. 11, the LCG offset is adjusted. Dark offset subtraction is performed on the signals S1 and S2. If the result is a negative value, the numerical value is truncated to "0". Referring to the view (D) in FIG. 10 and the view (D) in FIG. 11, the charge mixing is performed in the digital domain. During this, the gain is adjusted to add the signal S2 to the signal S1. Alternatively, the signal S1 or S2 is selected in addition to the gain, and the pedestal is adjusted.

Figure 12:
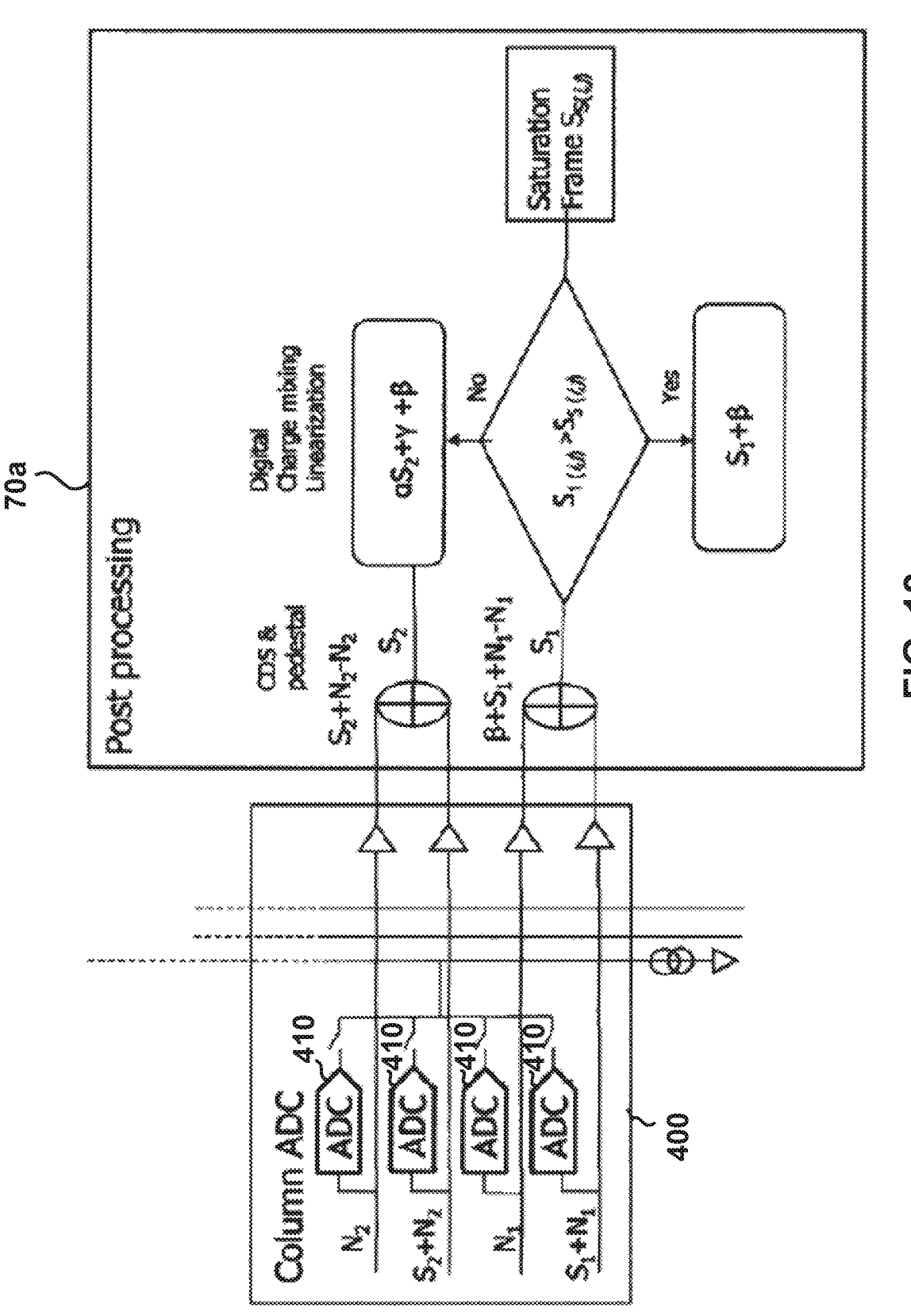
FIG. 12 is used to illustrate a second example of how the column reading circuit and digital processing part of the solid-state imaging device relating to the first embodiment of the present disclosure performs a reading operation and charge mixing and linearization.

FIG. 12 is used to illustrate a second example of how digital processing part of the solid-state imaging device relating to the first embodiment performs charge mixing and linearization.

A digital processing part 70a relating to the second example is different from the digital processing part 70 shown in FIGS. 6 and 11 in that the processing in the digital domain includes CDS processing with pedestal adjustment, digital charge mixing and linearization.

According to the second example, the photo charges stored in the respective nodes are read separately, and mixed in the digital domain after being subjected to AD conversion, as in the first example. If the overflow charges exceed the maximum limit of the FD node for charge transfer, the charge transfer lag causes incomplete transfer of charges from the PD. Like the first example, the second example can prevent this from occurring since the charges are mixed in the digital domain.

Figure 13:
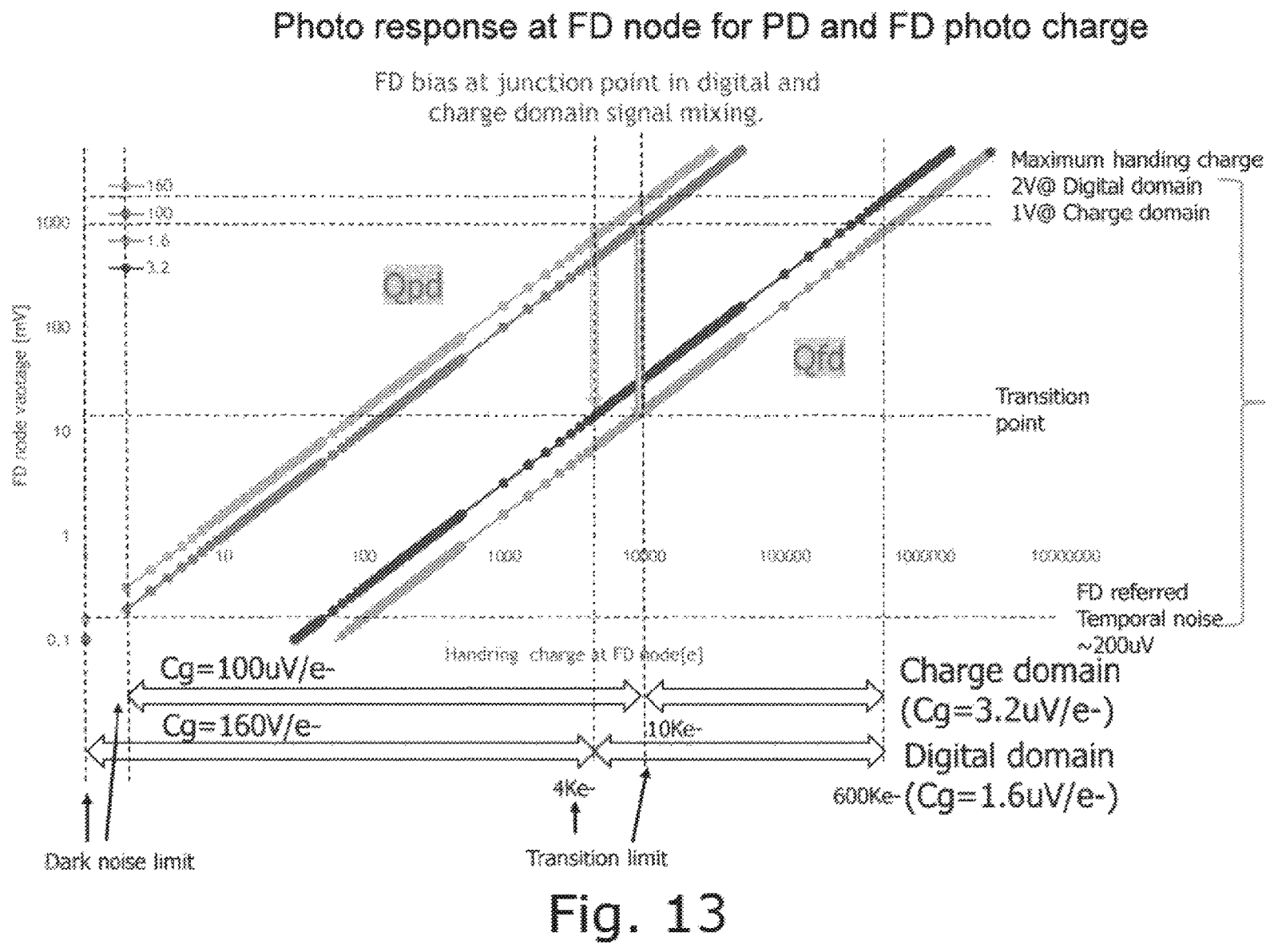

The digital domain charge mixing scheme is described in the following with reference to FIG. 13. FIG. 13 shows an example of photo response at the FD node to the photo charges at the photodiode PD and the floating diffusion FD.

Assuming that the FD node saturates at 600 Ke–, the digital domain charge mixing scheme can achieve further better swing of the FD node than does the charge domain mixing scheme. This allows the storage capacitor CS to have reduced capacity. The reduction in the capacity Cs may lead to higher signal charges at the transition point than when the charge domain mixing scheme is employed. Accordingly, a reduced drop in SNR and a higher Cg can be accomplished. Furthermore, lowered noise can be accomplished.

<Overview of Performance: Comparing Charge Mixing Between Digital and Charge Domains>

The following now compares and describes the charge mixing in the digital and charge domains with reference to FIG. 14. FIG. 14 shows an overview of performance factors to describe and compare the charge mixing in the digital and charge domains. FIG. 14 shows performance indices including: examples of how to select between the low conversion gain and high conversion gain (the CS cap gain) (#1 indicates the single gain scheme and #2 indicates the two-stage gain scheme); the lower voltage; the pixel size; the drop in SNR at the junction point; the dynamic range; and the dark noise performance.

As for the CS cap gain and lower voltage, the signal mixing in the digital domain can accomplish a lower swing due to no complete transfer of charges. As for the pixel size, the signal mixing in the digital domain can achieve a reduced CS cap region since no charges are transferred and a higher swing is not necessary. As for the drop in SNR at the junction point, the linearization of the pixel-wise signals may be compromised. The dynamic range can be increased as the swing at the FD node is increased. As for the dark noise performance, the digital domain mixing is advantageous for the PD charge high conversion gain operation since the storage capacity of the FD part for the low gain operation can be effectively reduced, the ktc noise level can be lowered, and the drop in SNR at the junction point can be reduced as discussed above.

As described above, the solid-state imaging device 10 relating to the first embodiment can minimize the signal gap per pixel that is generated after linearization performed on the signals representing the overflow charges and PD charges that are produced with different gains and offsets as they are stored at different nodes. Therefore, the following advantageous effects can be produced. The first embodiment can not only reduce the size of the pixels while keeping the sensitivity and full well capacity unchanged but also prevent an increase in junction capacitance and wiring capacitance, prevent an increase in the capacitance of the floating diffusion serving as the output node, prevent a drop in conversion gain and eventually achieve improved noise characteristics, and also prevent mixing of the charges at the floating diffusion. The first embodiment can also achieve maximized photo-responsiveness, ensure low optical SNR in addition to reproducibility, achieve high saturation and little dark noise, and further reduce the pixel size, thereby efficiently improving important performance factors such as the dynamic range, responsiveness, and resolution.

Second Embodiment

Figure 15:
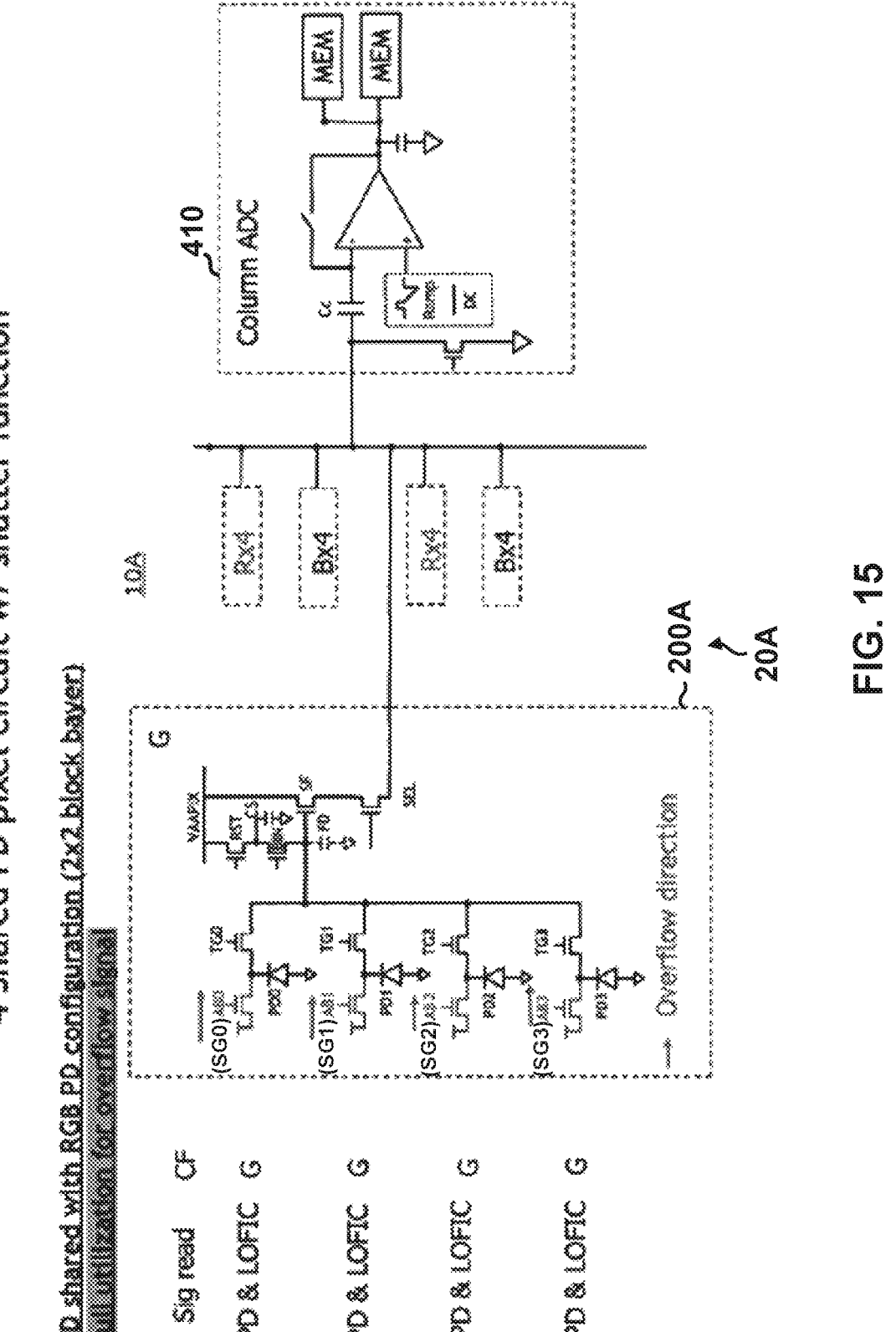
FIG. 15 is a circuit diagram showing an example of a sharing pixel of a solid-state imaging device relating to a second embodiment of the present disclosure.

FIG. 15 is a circuit diagram showing an example of a sharing pixel of a solid-state imaging device relating to a second embodiment of the present disclosure. FIG. 15 shows an example of a read-out system for a pixel circuit with shutter function that has a 2×2 block Bayer configuration and in which four photodiodes PDs share one floating diffusion FD and all overflow signals are used.

A sharing pixel 200A of the solid-state imaging device 10A relating to the second embodiment differs from the pixel 200 of the solid-state imaging device 10 relating to the above-described first embodiment in the following points.

In the pixel 200 of the solid-state imaging device 10 relating to the first embodiment, a single photodiode PD dominantly uses a single floating diffusion FD.

In the sharing pixel 200A of the solid-state imaging device 10A relating to the second embodiment, on the other hand, four photodiodes PD0 to PD3, namely, the one photodiode PD0 and additional three photodiodes PD1, PD2 and PD3, share one floating diffusion FD. Specifically, the solid-state imaging device 10A relating to the second embodiment includes a first photodiode PD0 connected to a first transfer transistor TG0-Tr, a second photodiode PD1 connected to a second transfer transistor TG1-Tr, a third photodiode PD2 connected to a third transfer transistor TG2-Tr, a fourth photodiode PD3 connected to a fourth transfer transistor TG3-Tr, a floating diffusion FD connected to the first, second, third and fourth transfer transistors TG0-Tr, TG1-Tr, TG2-Tr and TG3-Tr, a first shutter gate transistor SG0-Tr serving as an anti-blooming gate connected to the first photodiode PD0, a second shutter gate transistor SG1-Tr serving as an anti-blooming gate connected to the second photodiode PD1, a third shutter gate transistor SG2-Tr serving as an anti-blooming gate connected to the third photodiode PD2, and a fourth shutter gate transistor SG3-Tr serving as an anti-blooming gate connected to the fourth photodiode PD3.

The layout of the FD shared pixel 200A is as follows. The first, second, third and fourth photodiodes PD0, PD1, PD2 and PD3 are provided, and all of the saturation signals SATO to SAT3 from the photodiodes PD0 to PD3 are completely transferred (overflow) to the floating diffusion FD, and its own overflow charges can be discharged to the drain via the other side of the transfer transistors TG (shutter gate transistors SG). Alternatively or additionally, at least one of the saturation signals SATO to SAT3 from the photodiodes PD0 to PD3 is completely transferred (overflows) to the floating diffusion FD, but its own overflow charges can be discharged to the drain via the other side of the transfer transistors TG (shutter gate transistors SG).

In the sharing pixel 200A, the photodiodes PD0 to PD3 are each connected to two charge transfer transistors through which the integrated charges can be individually discharged and the integration time can be individually controlled. The sharing pixel 200A has color filters formed above the corresponding PDs sharing the FD. For example, a color filter configuration of RGB, G filters is applied to a 2×2 block of PDs sharing an FD. Due to the FD shared configuration, the pixels can be formed above a back sided isolation (BSI) structure using a partial full DTI, which can prevent color signal cross talk between the photodiodes PD0 to PD3.

<Example Arrangement of Four PDs and One FD in Sharing Pixel 200A>

Figure 16:
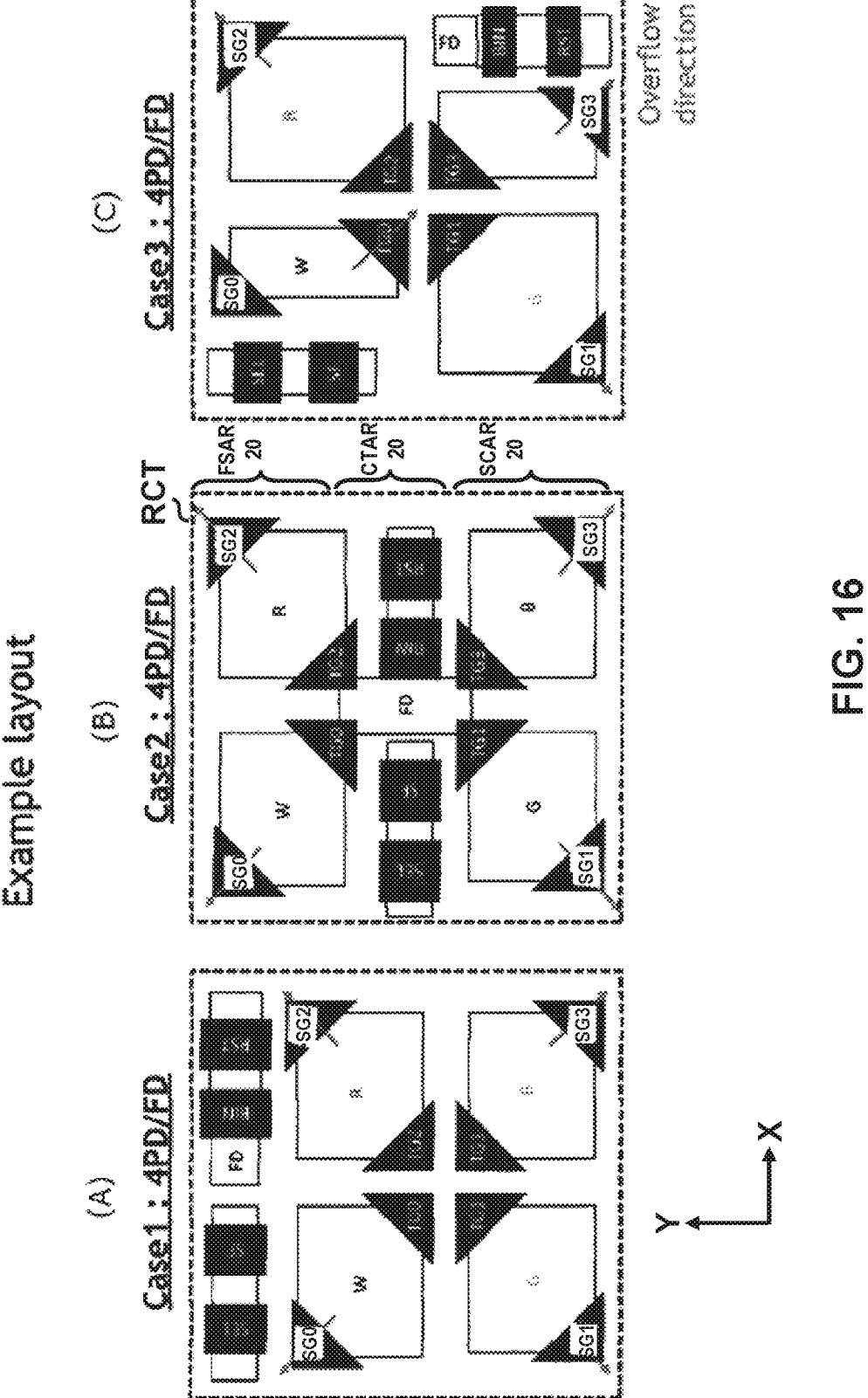
FIG. 16 shows simplified plan views showing examples of how four photodiodes, four transfer transistors, one floating diffusion FD, one reset transistor, one source follower transistor and one selection transistor are arranged in the sharing pixel relating to the second embodiment of the present disclosure.

The following now shows an example layout of the sharing pixel 200A. FIG. 16 includes simplified plan views (A), (B) and (C) showing examples of how four photodiodes, four transfer transistors, one floating diffusion FD, one reset transistor, one source follower transistor and one selection transistor are arranged in the sharing pixel relating to the second embodiment.

With reference to the following example, an example of how the four photodiodes PD0, PD1, PD2 and PD3, the four transfer transistors TG0-Tr, TG1-Tr, TG2-Tr and TG3-Tr, the four shutter gate transistors SG0-Tr, SG1-Tr, SG2-Tr, and SG3-Tr, one floating diffusion FD, one storage transistor BIN-Tr, one reset transistor RST-Tr, one source follower transistor SF-Tr, and one selection transistor SEL-Tr are arranged in the sharing pixel 200A. The relative positions of the elements represented by the terms such as left and right in the following description can be only example and modified in any other manners than the illustrated example.

The sharing pixel 200A has a rectangular region RCT20 where the elements are formed. The rectangular region RCT20 can be divided into a central region CTAR20 positioned in the center, and a first region FSAR20 and a second region SCAR20 sandwiching the central region CTAR20 therebetween (in the Y direction).

The first photodiode PD0, the first transfer transistor TG0-Tr, the first shutter gate transistor SG0-Tr, the third photodiode PD2, the third transfer transistor TG2-Tr and the third shutter gate transistor SG2-Tr are adjacent to each other in the X direction in the first region FSAR20. In the example shown in FIG. 16, the first photodiode PD0, the first transfer transistor TG0-Tr and the first shutter gate transistor SG0-Tr are formed in the left part (left half) of the first region FSAR20, and the third photodiode PD2, the third transfer transistor TG2-Tr and the third shutter gate transistor SG2-Tr are formed in the right part (right half) of the first region FSAR20. The first and third transfer transistors TG0-Tr and TG2-Tr are shaped like a triangle when seen from above, and formed near the central region CTAR20. The first and third shutter gate transistors SG0-Tr and SG2-Tr are shaped like a triangle when seen from above, and formed near the corners of the outer rectangular region RCT.

The second photodiode PD1, the second transfer transistor TG1-Tr, the second shutter gate transistor SG1-Tr, the fourth photodiode PD3, the fourth transfer transistor TG3-Tr and the fourth shutter gate transistor SG3-Tr are adjacent to each other in the X direction in the second region SCAR20. In the example shown in FIG. 16, the second photodiode PD1, the second transfer transistor TG1-Tr and the second shutter gate transistor SG1-Tr are formed in the left part (left half) of the second region SCAR20, and the fourth photodiode PD3, the fourth transfer transistor TG3-Tr and the fourth shutter gate transistor SG3-Tr are formed in the right part (right half) of the second region CSAR20. The second and fourth transfer transistors TG1-Tr and TG3-Tr are shaped like a triangle when seen from above, and formed near the central region CTAR20. The second and fourth shutter gate transistors SG1-Tr and SG3-Tr are shaped like a triangle when seen from above, and formed near the corners of the outer rectangular region RCT.

Referring to the example indicated by the view (A) in FIG. 16, in the first region FSAR20, the floating diffusion FD is arranged in the X- and Y-direction-wise central portion thereof, the reset transistor RST-Tr is arranged on the right side of the floating diffusion FD in the X direction, and the source follower transistor SF-Tr and the selection transistor SEL-Tr are arranged on the left side of the floating diffusion FD in the X direction.

Referring to the example indicated by the view (B) in FIG. 16, in the central region CTAR20, the floating diffusion FD is formed in the X- and Y-direction-wise central portion thereof, the reset transistor RST-Tr is formed on the right side of the floating diffusion FD in the X direction, and the source follower transistor SF-Tr and the selection transistor SEL-Tr are formed on the left side of the floating diffusion FD in the X direction.

Referring to the example indicated by the view (C) in FIG. 16, the floating diffusion FD, the storage transistor BIN-Tr, and the reset transistor RST-Tr are arranged in the right part of the second region SCAR20 in the X direction, and the source follower transistor SF-Tr and the selection transistor SEL-Tr are arranged in the upper left part of the first region FSAR20.

According to these examples of the pixel layout, the four photodiodes PD0 to PD3 are coupled with one floating diffusion FD via the four corresponding transfer transistors TG0-Tr to TG3-Tr. The overflow direction may be distorted by the channel formed beneath the transfer transistors TG. While the pixel transistor components are arranged in any of the PD regions, the distortion can be spatially accommodated by controlling the PD size.

Figure 17:
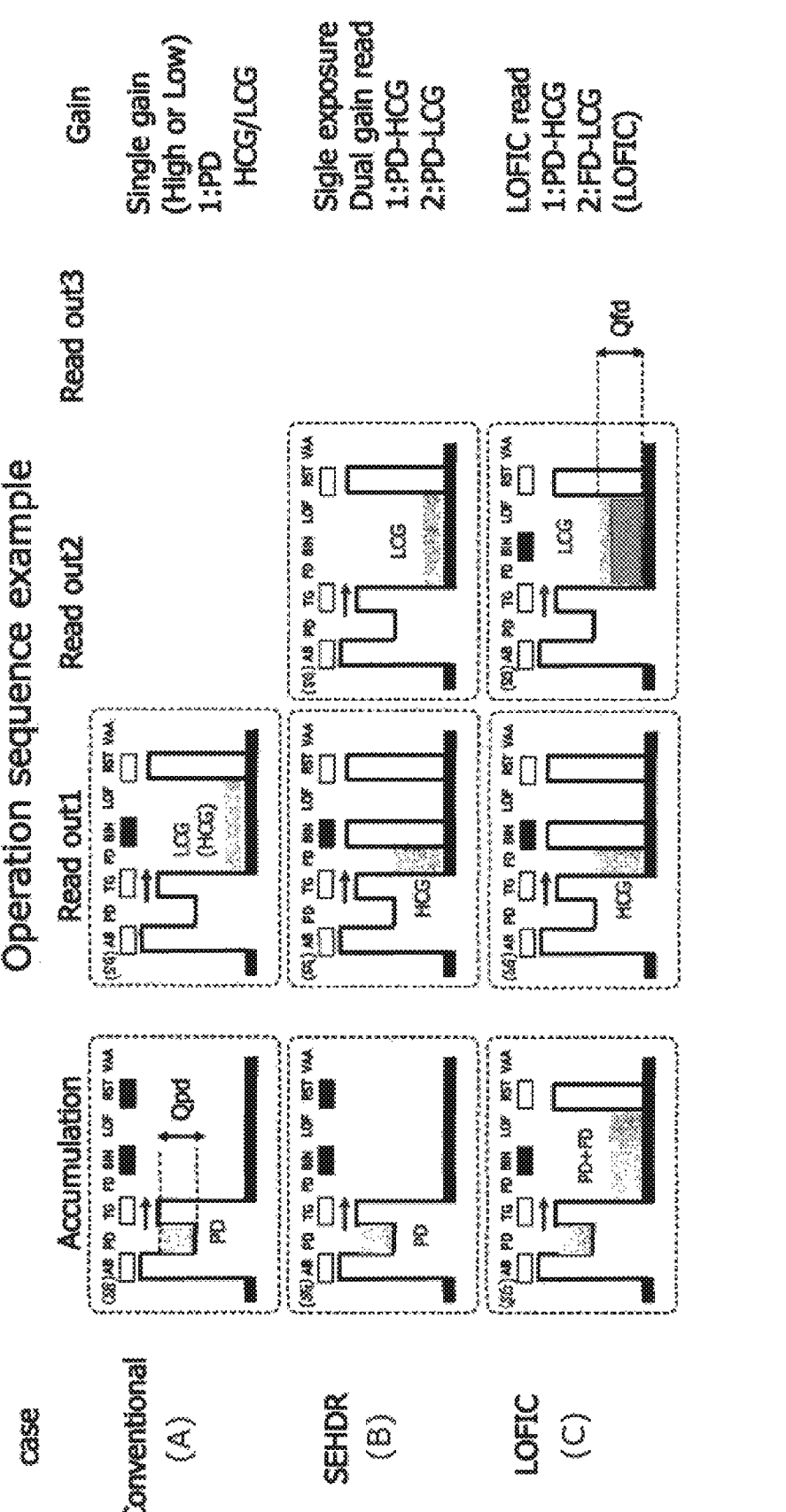
FIG. 17 shows examples of a reading method applicable to the solid-state imaging device relating to the second embodiment of the present disclosure.

The following further describes how to read pixel signals in the second embodiment. FIG. 17 includes views (A), (B) and (C) showing examples of the reading method applicable to the solid-state imaging device relating to the second embodiment of the present disclosure.

The reading method applicable to the sharing pixel can be typified by methods applicable to the cases shown in the views (A), (B) and (C) in FIG. 17.

The case shown in the view (A) in FIG. 17 is applied to read pixel signals from all pixels or perform binning. A single gain is used as the read-out gain, which is selected from among the high conversion gain (first conversion gain) HCG and the low conversion gain (second conversion gain) LCG. In this case, a reading operation is performed on either the first or second photodiode PD0 or PD1.

The view (B) in FIG. 17 shows the method applicable to single exposure high dynamic range (SEHDR) performance. A dual conversion gain scheme is used, specifically, the high conversion gain (first conversion gain) HCG and the low conversion gain (second conversion gain) LCG are both used. In this case, the charges in the first photodiode PD0 are firstly read with the high conversion gain HCG, and the charges in the second photodiode PD1 are secondly read with the low conversion gain LCG.

The method shown in the view (C) in FIG. 17 is applied to the LOFIC mode. A dual conversion gain scheme is used, specifically, the high conversion gain (first conversion gain) HCG and the low conversion gain (second conversion gain) LCG are both used. In this case, the charges in the first photodiode PD0 are firstly read with the high conversion gain HCG, and the charges in the floating diffusion FD are secondly read with the low conversion gain LCG.

FIG. 18 includes views (A), (B) and (C) showing an example of a reading method with LOFIC and SEHDR applicable to the solid-state imaging device relating to the second embodiment of the present disclosure.

The reading method with LOFIC and SEHDR being partially used, which is applicable to the sharing pixel, can be typified by the methods applicable to the case shown in the views (A), (B) and (C) in FIG. 18.

In FIG. 18, the view (A) shows an example of how to read the floating diffusion FD including the overflow charges, the view (B) shows an example of how to read the charges in the photodiodes PD with the high conversion gain, the view (C) shows an example of how to read the charges in the photodiodes PD with the low conversion gain.

Figure 19:
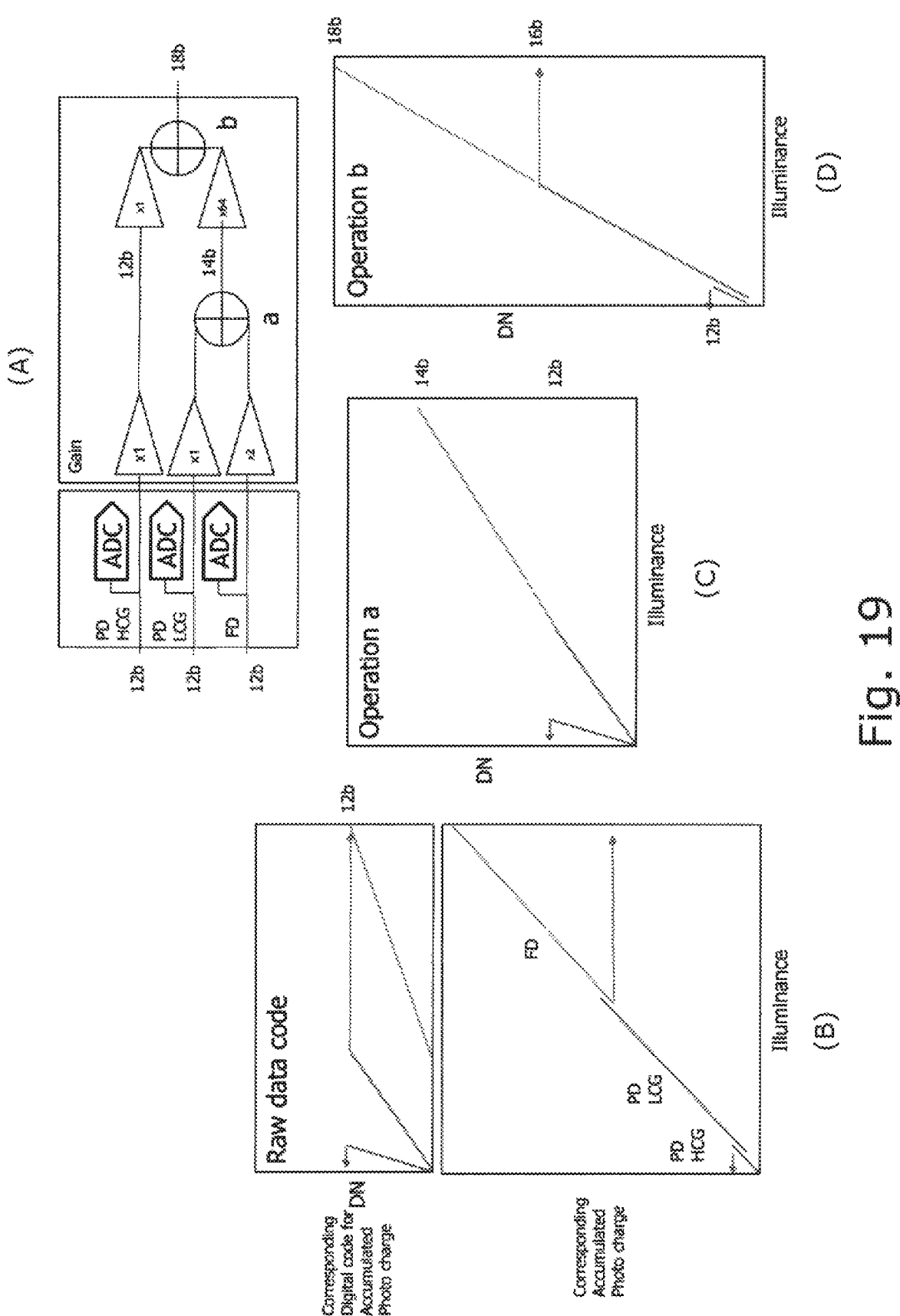
FIG. 19 shows photo charge coverage for each of the reading method and charge mixing scheme for linearization.

FIG. 19 includes views (A) to (D) showing photo charge coverage for each of the reading method and charge mixing scheme for linearization.

In FIG. 19, the view (A) shows an equivalent circuit showing in more detail the charge mixing scheme for the overflow (FD) charges and PD charges in the column reading circuit 400A and digital processing part 70A relating to the second embodiment. In the column reading circuit 400A, the overflow charge signal of the floating diffusion FD, the PD charge signal produced with the high conversion gain (first conversion gain) HCG, and the PD charge signal produced with the low conversion gain (second conversion gain) LCG are converted into digital signals, which are fed to the digital processing part 70A. The digital processing part 70A performs a first operation a or a first linearization operation on the overflow charge signal and the PD charge signal produced with the low conversion gain (LCG) along with gain adjustment. The digital processing part 70A then performs a second operation or a second linearization operation on the charge signal resulting from the first linearization operation and the PD charge signal produced with the high conversion gain (HCG) along with the gain adjustment.

The view (B) in FIG. 19 shows the raw code of the digital number (DN) after the AD conversion and the illuminance, where the upper graph shows the PD charge signal and the lower graph shows the overflow charge signal. Referring to the view (C) in FIG. 19, the gain is adjusted (xa), and the dark offset of the LCG code is then adjusted. Dark frame subtraction is performed on the signals S1 and S2. Referring to the view (D) in FIG. 19, the LCG offset is adjusted. Dark offset subtraction is performed on the signals S1 and S2. If the result is a negative value, the numerical value is truncated to "0". Referring to the views (C) and (D) in FIG. 19, the charge mixing is performed in the digital domain. During this, the gain is adjusted to add the signal S2 to the signal S1.

Figure 20:
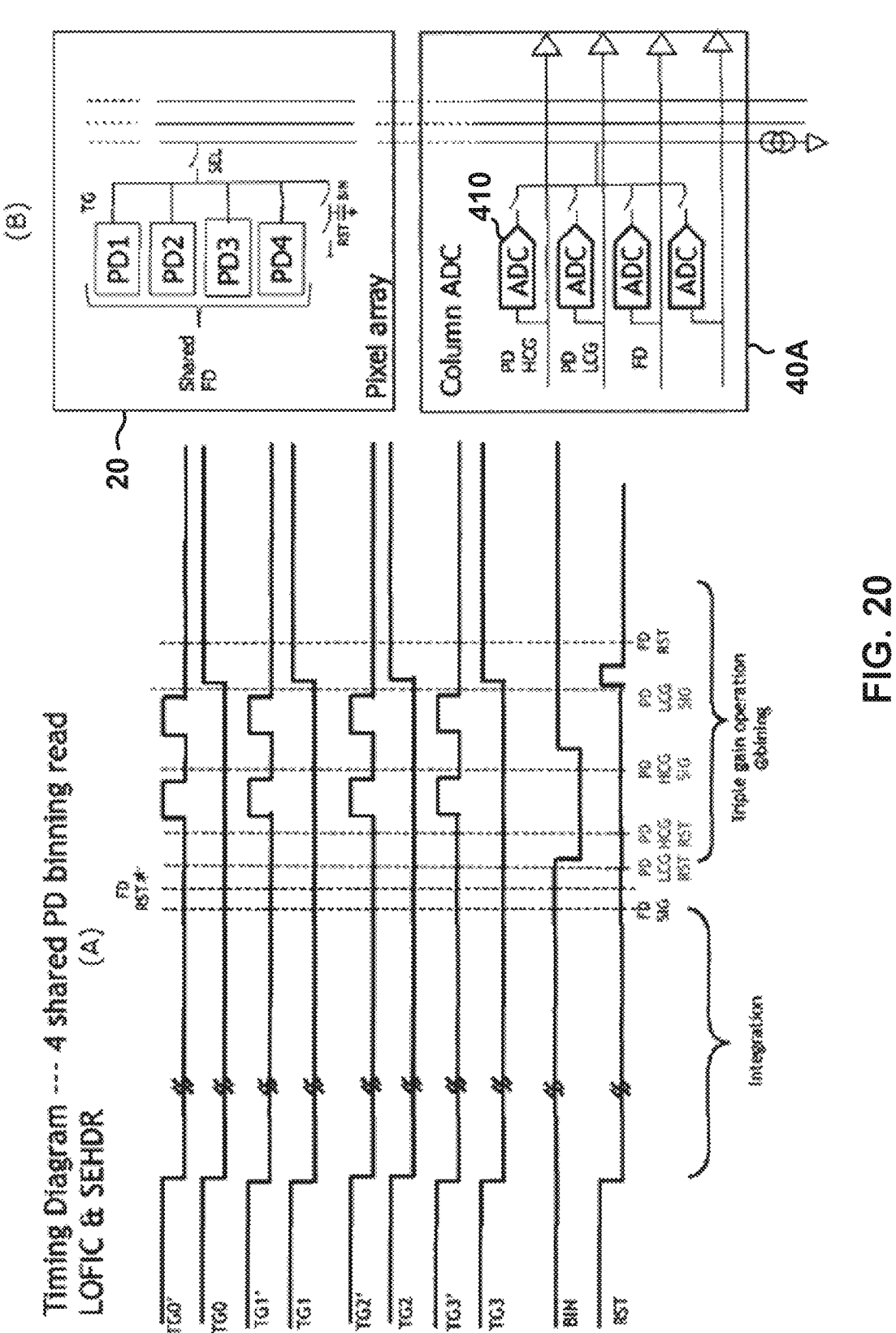
FIG. 20 is a timing chart illustrating an example of a four shared PD binning reading method applicable to the sharing pixel of the solid-state imaging device relating to the second embodiment of the present disclosure, also showing an example of the reading circuit of the sharing pixel.

FIG. 20 includes a timing chart (A) illustrating an example of a four shared PD binning reading method applicable to the sharing pixel of the solid-state imaging device relating to the second embodiment of the present disclosure, along with a view (B) showing an example of the reading circuit of the sharing pixel.

According to this example, upon elapse of a charge integration period, a low conversion gain illuminance signal reading operation LCGSIG (FD) is first performed to read the charges from the floating diffusion FD. After this, a dual conversion gain operation using SEHDR is next performed to read the charges in a predetermined photodiode, for example, the first photodiode PD0. Specifically, a low conversion gain reset signal reading operation LCGRST (PD), a high conversion gain reset signal reading operation HCGRST (PD), a high conversion gain illuminance signal reading operation HCGSIG (PD), and a low conversion gain illuminance signal reading operation LCGSIG (PD) are performed in order on the first photodiode PD0. Following this, a low conversion gain reset signal reading operation LCGRST (FD) is performed to read the charges from the floating diffusion FD.

FIG. 21 shows, as a reference, estimated dynamic range performance in a typical operation when the sharing pixel of the solid-state imaging device relating to the second embodiment of the present disclosure is employed. FIG. 21 shows the total DR Max [db]: 20× log (the maximum accumulated photo charge/noise), the maximum handling charge, the correspondent node (Q): accumulated photo charges at (PD or FD), and the correspondent noise Tnoise: readout noise (temporal noise). As can be seen from FIG. 21, the solid-state imaging device of the second embodiment can achieve sufficiently higher dynamic range performance than does a corresponding solid-state imaging device employing the conventional binning scheme.

As described above, the FD sharing pixel of the second embodiment is constituted by the first to fourth photodiodes PD0 to PD3, and all of the PD saturation signals are completely transferred (overflow) to the floating diffusion FD, but its own overflow charges can be discharged to the drain via the other side of the transfer gate TG (SG). The pixel is constituted by the PDs sharing the FD and the other components described in the first embodiment. The photodiodes PD0 to PD3 each have two transfer gates connected thereto, so that the stored charges can be individually discharged to individually control the integration time. This enables the binning function of the PDs sharing a FD. In the case of 2×2 binning, all of the overflow charges are entirely stored in the expanded FD node. The sequence of operations to read the pixel signal can be the same as in the first embodiment. In the second embodiment, a multiple-gain read-out sequence is shown.

A third embodiment (modification example) will be now described below, where the overflow charges may be stored in an external FD.

Third Embodiment

Figure 22:
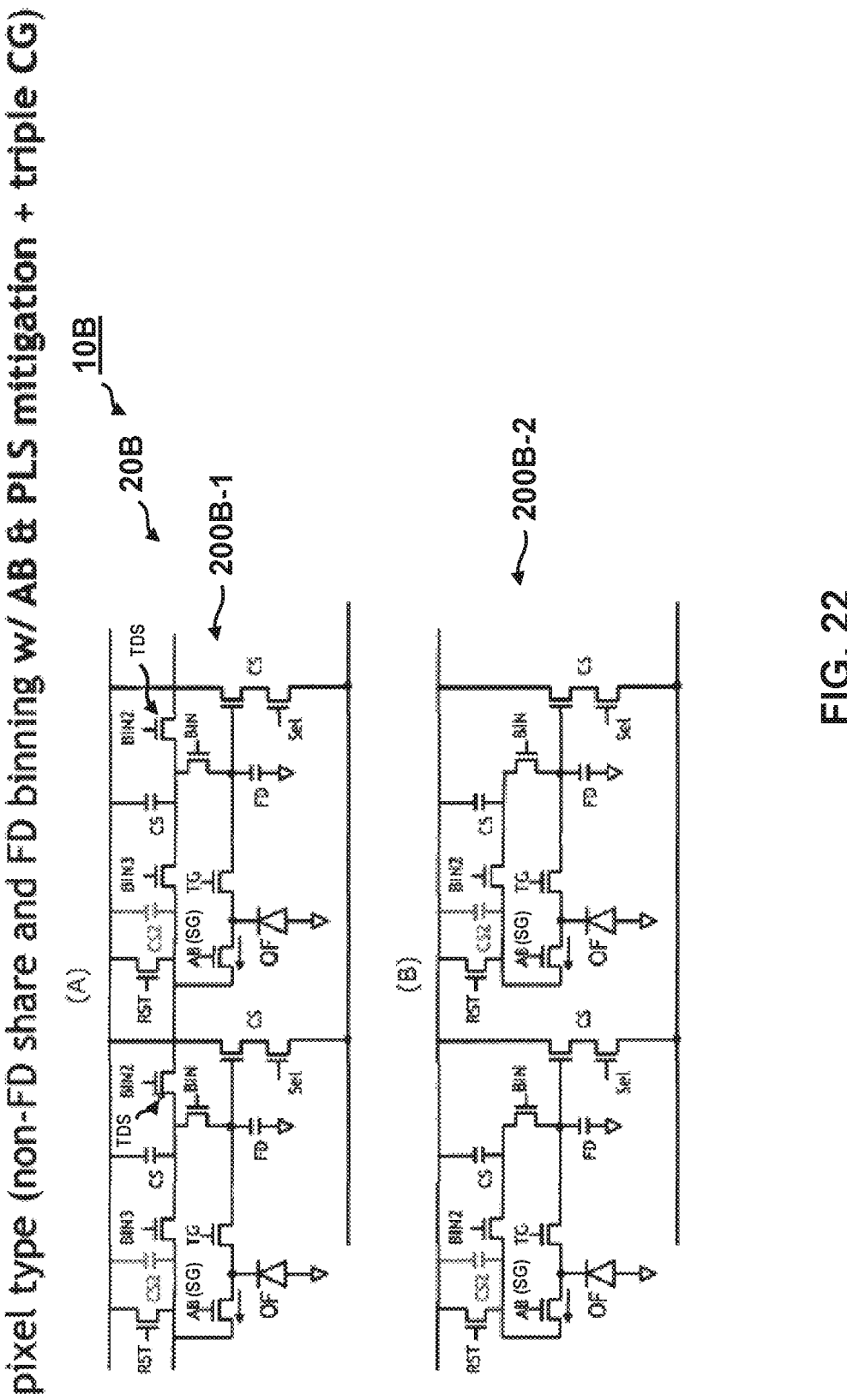
FIG. 22 includes circuit diagrams showing an example of a non-FD-sharing pixel of a solid-state imaging device relating to a third embodiment of the present disclosure.

FIG. 22 includes views (A) and (B), which are circuit diagrams showing an example of a non-FD-sharing pixel of a solid-state imaging device relating to a third embodiment of the present disclosure.

A non-FD-sharing pixel 200B in FIG. 22 is capable of performing FD binning with anti-blooming AB and PLS mitigation, and employ a triple conversion gain (CG) scheme. A non-FD-sharing pixel 200B-1 shown in the view (A) in FIG. 22 has a tide switch TDS between adjacent pixels, while a non-FD-sharing pixel 200B-2 shown in the view (B) in FIG. 22 has no tide switch TDS between adjacent pixels.

In the solid-state imaging device 10B employing the non-FD-sharing pixel 200B, the overflow charges are independently stored. The FD node can be associated with frequently used pixels.

Figure 23:
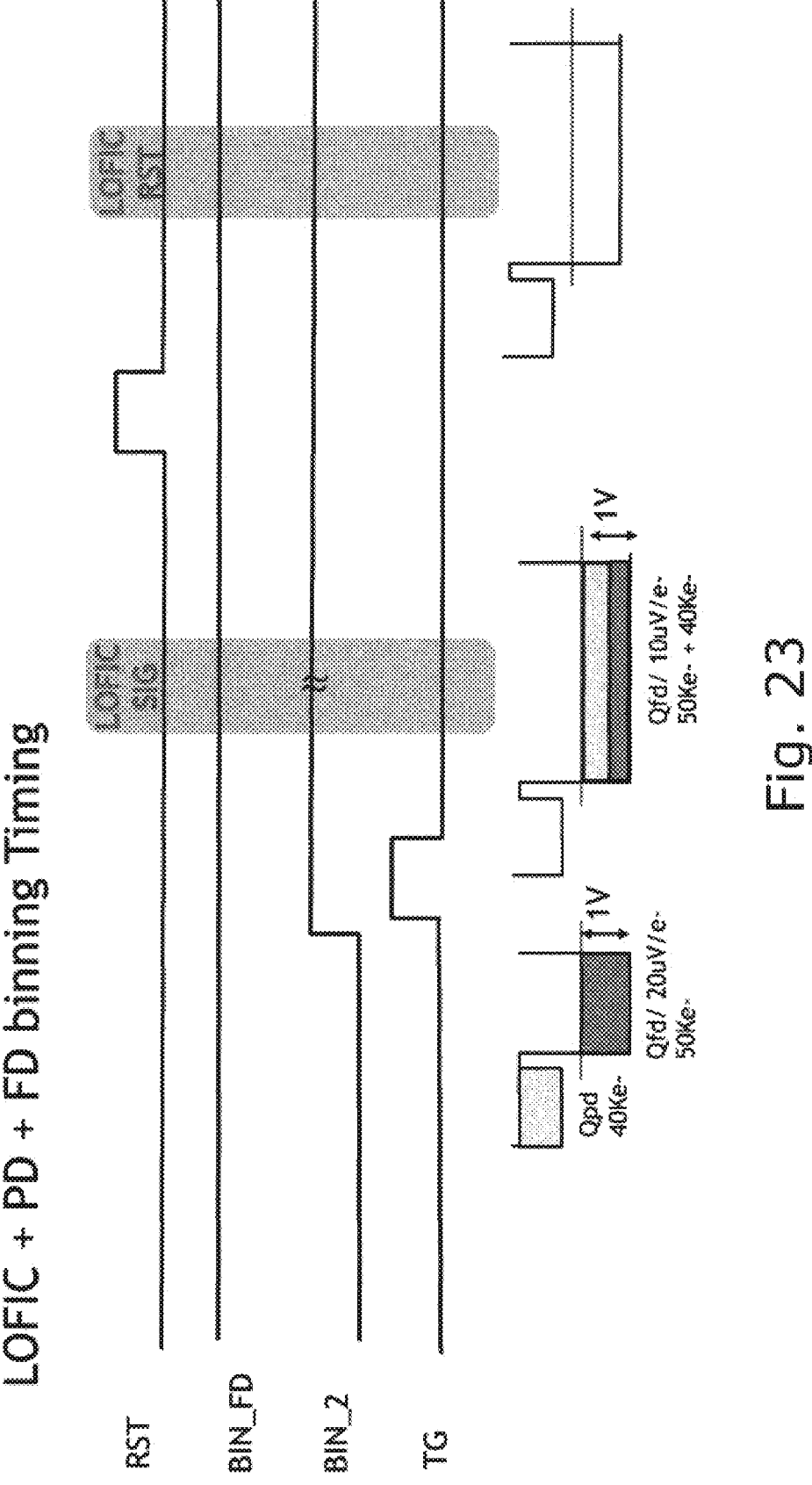
FIG. 23 is a timing chart illustrating an example of a reading method involving LOFIC, PD charge signal reading and FD binning applicable to the non-FD-sharing pixel of the solid-state imaging device relating to the third embodiment of the present disclosure.
Figure 24:
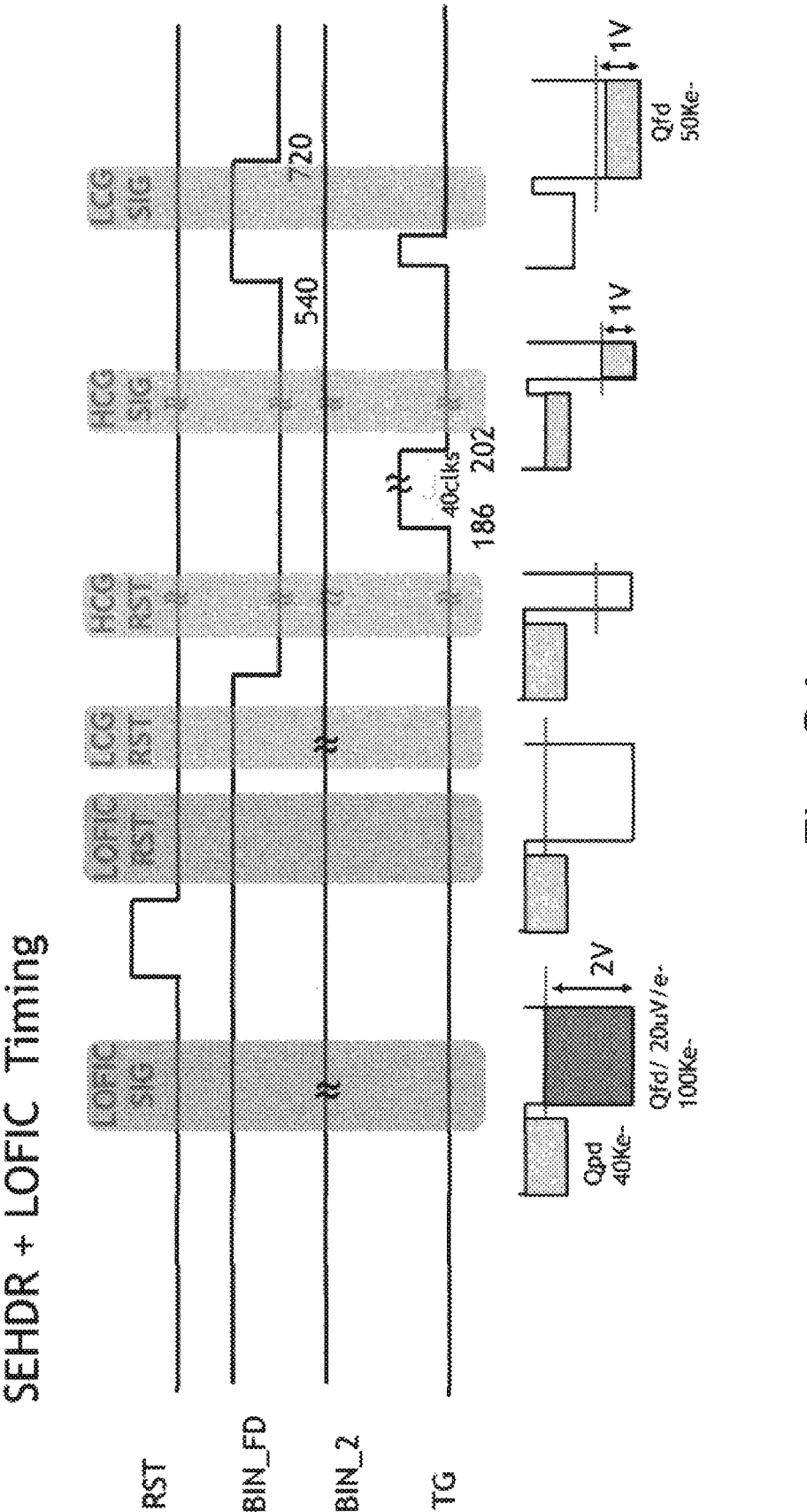
FIG. 24 is a timing chart showing an example of a reading method with LOFIC and SEHDR applicable to the non-FD-sharing pixel of the solid-state imaging device relating to the third embodiment of the present disclosure.

FIGS. 23 and 24 each show a timing chart to illustrate an example of a reading method applicable to the non-FD-sharing pixel of the solid-state imaging device relating to the third embodiment, along with the respective reading operations.

FIG. 23 is a timing chart illustrating an example of a reading method involving LOFIC, PD charge signal reading and FD binning applicable to the non-FD-sharing pixel of the solid-state imaging device relating to the third embodiment of the present disclosure.

In this example, a tide switch TDS is provided between adjacent pixels for charge mixing at the FD node. The reading operation of this example uses the low conversion gain (LCG), which is the reading gain employed for LOFIC, so that the low conversion gain illuminance signal reading operation LCG (LOFIC) SIG (FD) is performed, followed by the low conversion gain reset signal reading operation LCG (LOFIC) RST (PD).

FIG. 24 is a timing chart showing an example of a reading method with LOFIC and SEHDR applicable to the non-FD-sharing pixel of the solid-state imaging device relating to the third embodiment of the present disclosure.

The reading operation of the present example employs the low conversion gain (LCG), which is the reading gain employed for LOFIC, so that the low conversion gain illuminance signal reading operation LCG (LOFIC) SIG (FD) is performed, followed by the low conversion gain reset signal reading operation LCG (LOFIC) RST (PD). After this, a dual conversion gain operation using SEHDR is next performed to read the charges in a predetermined photodiode PD. Specifically, a low conversion gain reset signal reading operation LCGRST (PD), a high conversion gain reset signal reading operation HCGRST (PD), a high conversion gain illuminance signal reading operation HCGSIG (PD), and a low conversion gain illuminance signal reading operation LCGSIG (PD) are performed in order on the photodiode PD.

In the present example, the LOFIC and PD signals are added in the digital domain. This means that they are not added at the FD node, but are added later. This can address the SNRGAP issue. According to the present example, the overflow charge signal can be read out in a full 3T mode, so that a sufficient FD swing may be accomplished and the saturation level can be doubled.

As described above, in the third embodiment, the non-FD-sharing pixel is configured such that the PD saturation signal is entirely and completely transferred (overflows) to the floating diffusion FD and its own overflow charges can be discharged to the drain via the other side of the transfer gate TG (SG). The pixel is constituted by the non-FD-sharing PD and the other components described in the first embodiment. Each photodiode has two transfer gates connected thereto, so that the stored charges can be individually discharged to individually control the integration time. This enables the non-FD-sharing PDs to use binning. In the case of 2×2 binning, all of the overflow charges are entirely stored in the expanded FD node. As the binning is performed in this manner, the FD node can be expanded as needed, so that a further low gain is possible. The sequence of operations to read the pixel signal can be the same as in the first embodiment. In the third embodiment, a multiple-gain readout sequence is shown. Furthermore, the FD may serve as a temporary storage node for the PD signal so that the charges can be read out from all of the pixels in the pixel array simultaneously and globally. As a result, distortion-free images can be obtained.

A fourth embodiment (modification example) will be now described below, where the overflow charges may be skimmed to reduce flicker noise.

Fourth Embodiment

FIG. 25 is a circuit diagram showing a first example of the pixels of a solid-state imaging device relating to a fourth embodiment of the present disclosure. FIG. 26 shows an example layout of a non-sharing pixel of the first example of the solid-state imaging device relating to the fourth embodiment of the present disclosure.

A pixel 200C of the first example of the fourth embodiment differs from the pixel 200 of the first embodiment in the following points.

The pixel 200C of the first example of the fourth embodiment has a shutter gate transistor SG-Tr between the charge storage node ND1 of the photodiode PD and the power supply line Vaapix of the power supply potential VAAPIX. The shutter gate transistor SG-Tr serves as a charge overflow gate element that is also configured to perform anti-blooming AB. The shutter gate transistor SG-Tr is controlled by a control signal SG applied through a control line. The shutter gate transistor SG-Tr remains selected and in the conduction state during the period in which the control signal SG is at the H level, to form a charge release (discharge) path providing for antiblooming function between the charge storage node ND1 of the photodiode PD and the predetermined fixed potential VAAPIX. In this way, unnecessary charges are released to the fixed potential VAAPIX.

The transfer transistor TG-Tr and shutter gate transistor SG-Tr are driven and controlled at individually selected timings.

In the pixel 200C, the shutter gate transistor SG-Tr serving as an overflow gate is coupled with the photodiode PD to skim the overflow charges. Since the overflow charges are equally divided by the number of overflow gates, skimming errors can be reduced. This can result in increasing the detectable overflow charges, thereby increasing the dynamic range DR. The skimming errors may lead to a drop in SNR, but the first example of the fourth embodiment can reduce such degradation of the SNR as compared to a conventional skimming sensor manipulation. The sequence of operations to read the pixel signal can be the same as in the first embodiment described above.

Figure 28:
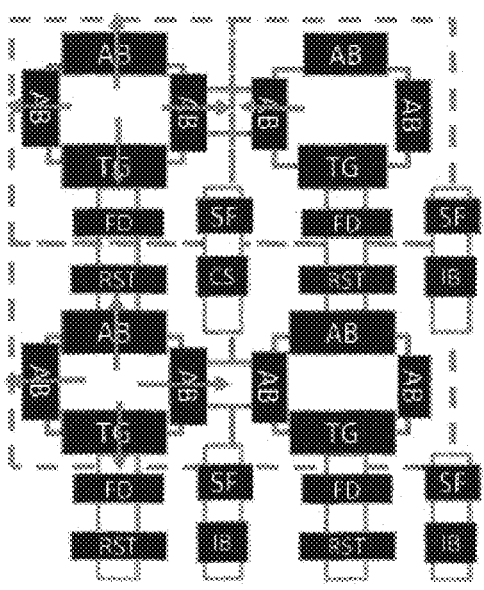
FIG. 28 shows an example layout of a non-sharing pixel of a second example of the solid-state imaging device relating to the fourth embodiment of the present disclosure.

FIG. 27 is a circuit diagram showing a second example of the pixels of the solid-state imaging device relating to the fourth embodiment of the present disclosure. FIG. 28 shows an example layout of a non-sharing pixel of the second example of the solid-state imaging device relating to the fourth embodiment of the present disclosure.

A pixel 200D of the second example of the fourth embodiment differs from the pixel 200 of the first embodiment in the following points.

The pixel 200D of the second example of the fourth embodiment has three shutter gate transistors SG0-Tr, SG1-Tr, and SG2-Tr connected in parallel between the charge storage node ND1 of the photodiode PD and the power supply line Vaapix of the power supply potential VAAPIX. The shutter gate transistors SG0-Tr, SG1-Tr and SG2-Tr serve as a charge overflow gate element that is also configured to perform anti-blooming AB. The shutter gate transistors SG0-Tr, SG1-Tr and SG2-Tr are controlled by control signals SG0, SG1 and SG2 applied through respective control lines. The shutter gate transistors SG-Tr remain selected and in the conduction state during the period in which the control signals SG are at the H level, to form a charge release (discharge) path providing for antiblooming function between the charge storage node ND1 of the photodiode PD and the predetermined fixed potential VAAPIX. In this way, unnecessary charges are released to the fixed potential VAAPIX.

The transfer transistors TG0-Tr, TG1-Tr and TG2-Tr and the shutter gate transistors SG0-Tr, SG1-Tr, and SG2-Tr are driven and controlled at individually selected timings.

The pixel 200D is constituted by the FD sharing PD and the other components described in the first embodiment. The shutter gate transistor SG1-Tr serving as the second overflow gate is coupled with the photodiode PD to skim the overflow charges. Since the overflow charges are equally divided by the number of overflow gates, skimming errors can be reduced. This can result in increasing the detectable overflow charges, thereby increasing the dynamic range DR. The skimming errors may lead to a drop in SNR, but the second example of the fourth embodiment can reduce such degradation of the SNR as compared to a conventional skimming sensor manipulation. The sequence of operations to read the pixel signal can be the same as in the first embodiment described above.

Figure 29:
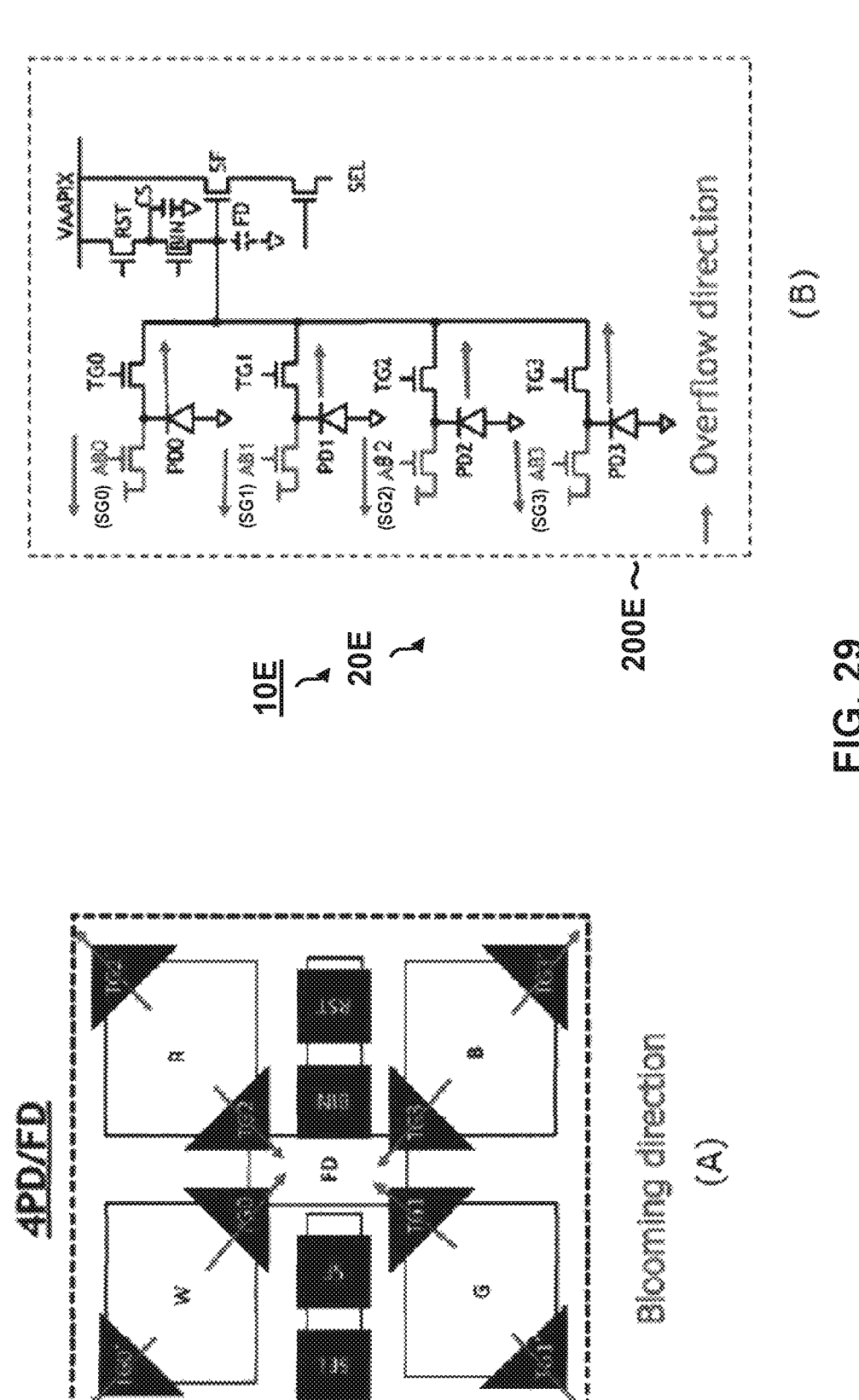
FIG. 29 includes a layout view and a circuit diagram showing a third example of the pixels of the solid-state imaging device relating to the fourth embodiment of the present disclosure.

FIG. 29 includes a layout view (A) and a circuit diagram (B) showing a third example of the pixels of the solid-state imaging device relating to the fourth embodiment of the present disclosure. The layout view (A) of FIG. 29 is the same as the above-described view (B) of FIG. 16 and not described in detail.

A pixel 200E of the third example of the fourth embodiment differs from the pixel 200 of the first embodiment in the following points.

In the pixel 200A of the second embodiment, the overflow charges from the photodiodes PD flow toward the floating diffusion FD via the transfer transistors TG0-Tr to TG3-Tr.

In the pixel 200E of the third example of the fourth embodiment, on the other hand, the overflow charges from the photodiodes PDs flow toward the power supply potential (fixed potential) VAAPIX via the shutter gate transistors SG0-Tr, SG1-Tr, SG2-Tr and SG3-Tr. A charge release (discharge) path providing for antiblooming function is formed between the charge storage nodes of the photodiodes PDs and the predetermined fixed potential VAAPIX to release the overflow charges to the drain side (the fixed potential VAAPIX side).

The transfer transistors TG0-Tr, TG1-Tr, TG2-Tr and TG3-Tr and the shutter gate transistors SG0-Tr, SG1-Tr, SG2-Tr and SG3-Tr are driven and controlled at individually selected timings.

In the pixel 200E, the shutter gate transistor SG1-Tr serving as the second overflow gate is coupled with the photodiode PD to skim the overflow charges. Since the overflow charges are equally divided by the number of overflow gates, skimming errors can be reduced. This can result in increasing the detectable overflow charges, thereby increasing the dynamic range DR. The skimming errors may lead to a drop in SNR, but the third example of the fourth embodiment can reduce such degradation of the SNR as compared to a conventional skimming sensor manipulation. The sequence of operations to read the pixel signal can be the same as in the first embodiment described above.

Figure 30:
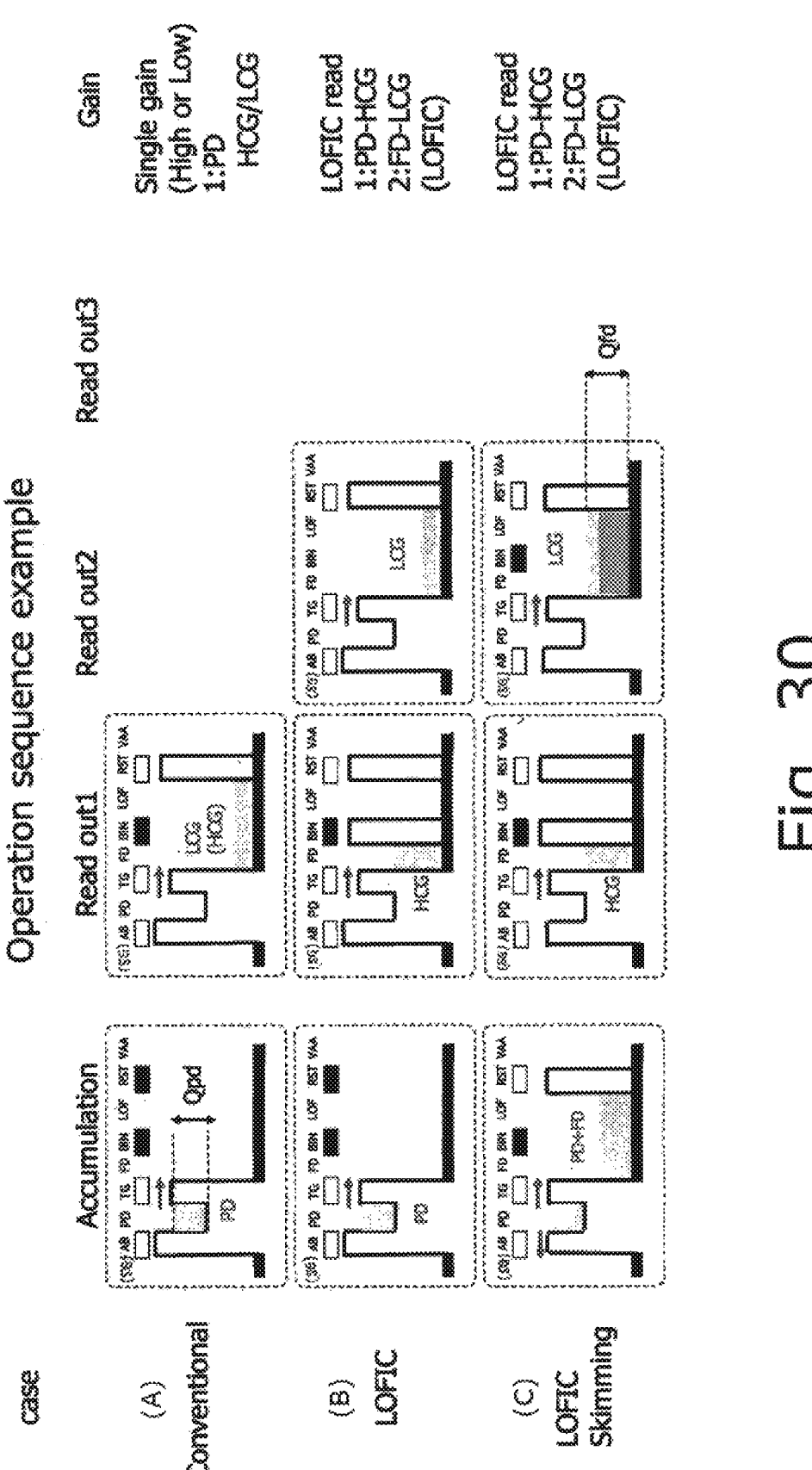
FIG. 30 shows examples of a reading method applicable to the solid-state imaging device relating to the fourth embodiment of the present disclosure.

The following further describes how to read pixel signals in the fourth embodiment. FIG. 30 includes views (A), (B) and (C) showing examples of the reading method applicable to the solid-state imaging device relating to the fourth embodiment of the present disclosure.

A reading method applicable to the sharing pixel can be typified by methods applicable to the cases shown in the views (A), (B) and (C) in FIG. 30.

The case shown in the view (A) in FIG. 30 is applied to read pixel signals from all pixels or perform binning. A single gain is used as the read-out gain, which is selected from among the high conversion gain (first conversion gain) HCG and the low conversion gain (second conversion gain) LCG. In this case, the pixel signal may be read from the first or second photodiode PD0 or PD1.

The method shown in the view (B) in FIG. 30 is applied to the LOFIC mode. A dual conversion gain scheme is used, specifically, the high conversion gain (first conversion gain) HCG and the low conversion gain (second conversion gain) LCG are both used. In this case, the charges in the first photodiode PD0 are firstly read with the high conversion gain HCG, and the charges in the floating diffusion FD are secondly read with the low conversion gain LCG.

The method shown in the view (C) in FIG. 30 is applied to the LOFIC skimming mode. A dual conversion gain scheme is used, specifically, the high conversion gain (first conversion gain) HCG and the low conversion gain (second conversion gain) LCG are both used. In this case, the charges in the first photodiode PD0 are firstly read with the high conversion gain HCG, and the charges in the floating diffusion FD are secondly read with the low conversion gain LCG.

FIG. 31 includes views (A), (B) and (C) showing an example of a reading method with LOFIC and SEHDR applicable to the solid-state imaging device relating to the fourth embodiment of the present disclosure.

A reading method with LOFIC and SEHDR being partially used applicable to the sharing pixel can be typified by the method applicable to the cases shown in the views (A), (B) and (C) in FIG. 31.

In FIG. 31, the view (A) shows an example of how to read the floating diffusion FD including the overflow charges, the view (B) shows an example of how to read the charges in the photodiode PD with the high conversion gain, and the view (C) shows an example of how to read the charges in the photodiode PD with the low conversion gain.

Figure 32:
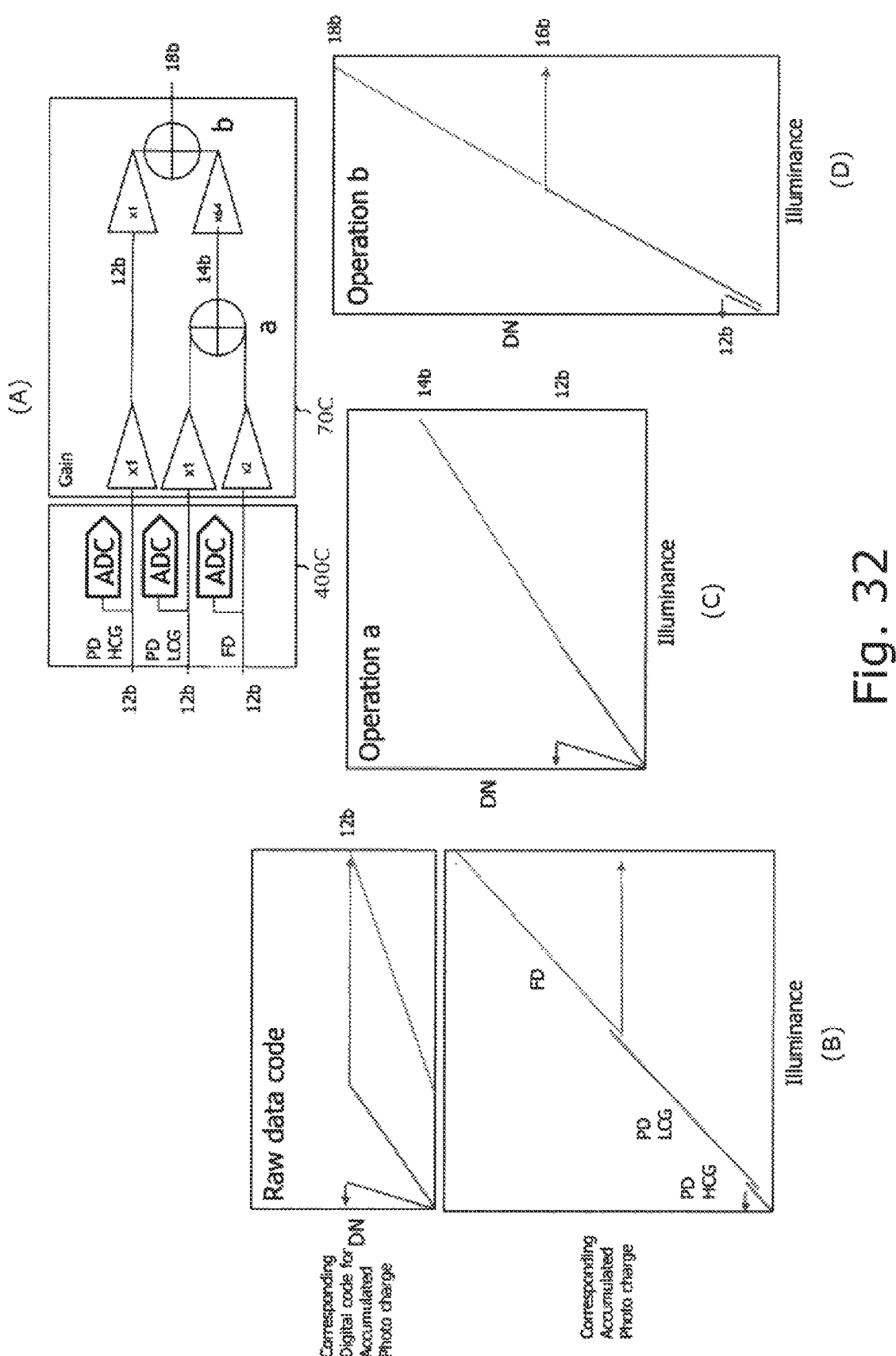
FIG. 32 shows photo charge coverage for each of the reading method and charge mixing scheme for linearization in the fourth embodiment.

FIG. 32 includes views (A) to (D) showing photo charge coverage for each of the reading method and charge mixing scheme for linearization in the fourth embodiment.

In FIG. 32, the view (A) shows an equivalent circuit showing in more detail the charge mixing scheme for the overflow (FD) charges and PD charges in the column reading circuit 400C and digital processing part 70C relating to the fourth embodiment. In the column reading circuit 400C, the overflow charge signal of the floating diffusion FD, the PD charge signal produced with the high conversion gain (first conversion gain) HCG, and the PD charge signal produced with the low conversion gain (second conversion gain) LCG are converted into digital signals, which are fed to the digital processing part 70C. The digital processing part 70C performs a first operation a or a first linearization operation on the overflow charge signal and the PD charge signal produced with the low conversion gain (LCG) along with gain adjustment. The digital processing part 70C then performs a second operation or a second linearization operation on the charge signal resulting from the first linearization operation and the PD charge signal produced with the high conversion gain (HCG) along with the gain adjustment.

The view (B) in FIG. 32 shows the raw code of the digital number (DN) after the AD conversion and the illuminance, where the upper graph shows the PD charge signal and the lower graph shows the overflow charge signal. Referring to the view (C) in FIG. 32, the gain is adjusted (xa), and the dark offset of the LCG code is then adjusted. Dark frame subtraction is performed on the signals S1 and S2. Referring to the view (D) in FIG. 32, the LCG offset is adjusted. Dark offset subtraction is performed on the signals S1 and S2. If the result is a negative value, the numerical value is truncated to "0". Referring to the views (C) and (D) in FIG. 32, the charge mixing is performed in the digital domain. During this, the gain is adjusted to add the signal S2 to the signal S1.

Figure 33:
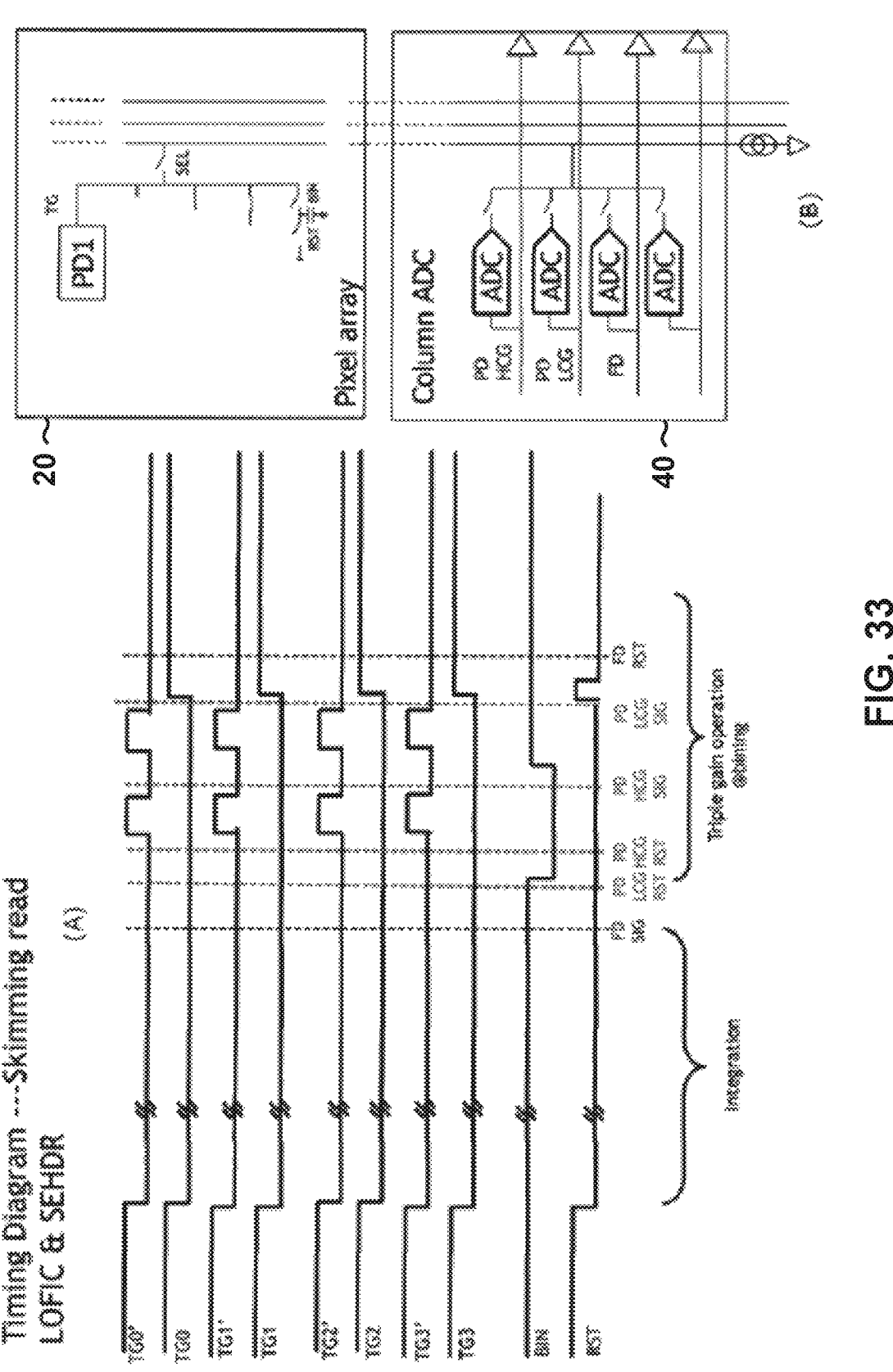
FIG. 33 includes a timing chart to illustrate an example of a skimming reading method applicable to the sharing pixel of the solid-state imaging device relating to the fourth embodiment of the present disclosure, along with a view showing an example of the reading circuit of the sharing pixel.

FIG. 33 includes a timing chart (A) to illustrate an example of a skimming reading method applicable to the sharing pixel of the solid-state imaging device relating to the fourth embodiment of the present disclosure, along with a view (B) showing an example of the reading circuit of the sharing pixel.

According to this example, upon elapse of a charge integration period, a low conversion gain illuminance signal reading operation LCGSIG (FD) is first performed to read the charges from the floating diffusion FD. After this, a dual conversion gain operation using SEHDR is next performed to read the charges in a predetermined photodiode, for example, the first photodiode PD0. Specifically, a low conversion gain reset signal reading operation LCGRST (PD), a high conversion gain reset signal reading operation HCGRST (PD), a high conversion gain illuminance signal reading operation HCGSIG (PD), and a low conversion gain illuminance signal reading operation LCGSIG (PD) are performed in order on the first photodiode PD0. Following this, a low conversion gain reset signal reading operation LCGRST (FD) is performed to read the charges from the floating diffusion FD.

FIG. 34 shows, as a reference, estimated dynamic range performance in a typical operation when the sharing pixel of the solid-state imaging device relating to the fourth embodiment of the present disclosure is employed. FIG. 34 shows the total DR Max [db]: 20× log (the maximum accumulated photo charge/noise), the maximum handling charge, correspondent node (Q): accumulated photo charge (in PD or FD), and the correspondent noise Tnoise: readout noise (temporal noise).

As can be seen from FIG. 34, the solid-state imaging device of the fourth embodiment can achieve sufficiently higher dynamic range performance than does a corresponding solid-state imaging device employing the conventional skimming scheme.

As described above, in the pixel 200E relating to the fourth embodiment, the shutter gate transistors SG1-Tr serving as the second overflow gate is coupled with the photodiode PD to skim the overflow charges. Since the overflow charges are equally divided by the number of overflow gates, skimming errors can be reduced. This can result in increasing the detectable overflow charges, thereby increasing the dynamic range DR. The skimming errors may lead to a drop in SNR, but the fourth embodiment can reduce such degradation of the SNR as compared to a conventional skimming sensor manipulation. The sequence of operations to read the pixel signal can be the same as in the first or second embodiment described above.

The following now describes a fifth embodiment (modification example), where a plurality of, for example, three sets of in-pixel memories are arranged in each pixel. An example block configuration of a pixel circuit system and an example of how the data is processed will be herein after described.

Fifth Embodiment

Figure 35:
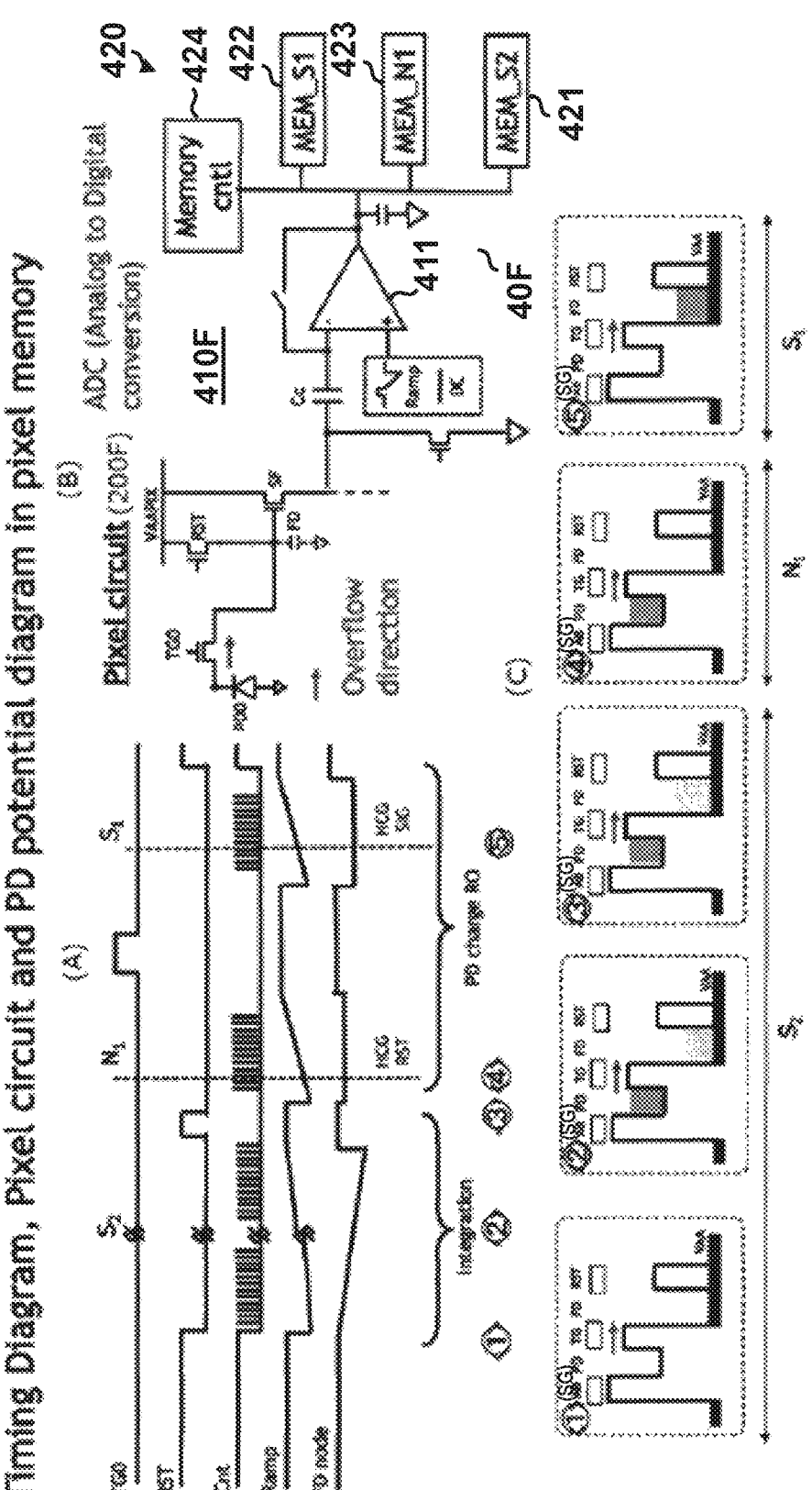
FIG. 35 shows a first example of a reading method applicable to the pixel of the solid-state imaging device relating to a fifth embodiment of the present disclosure, showing a first example of a circuitry of the pixel, a timing chart and potential transition in relation to each other.
Figure 36:
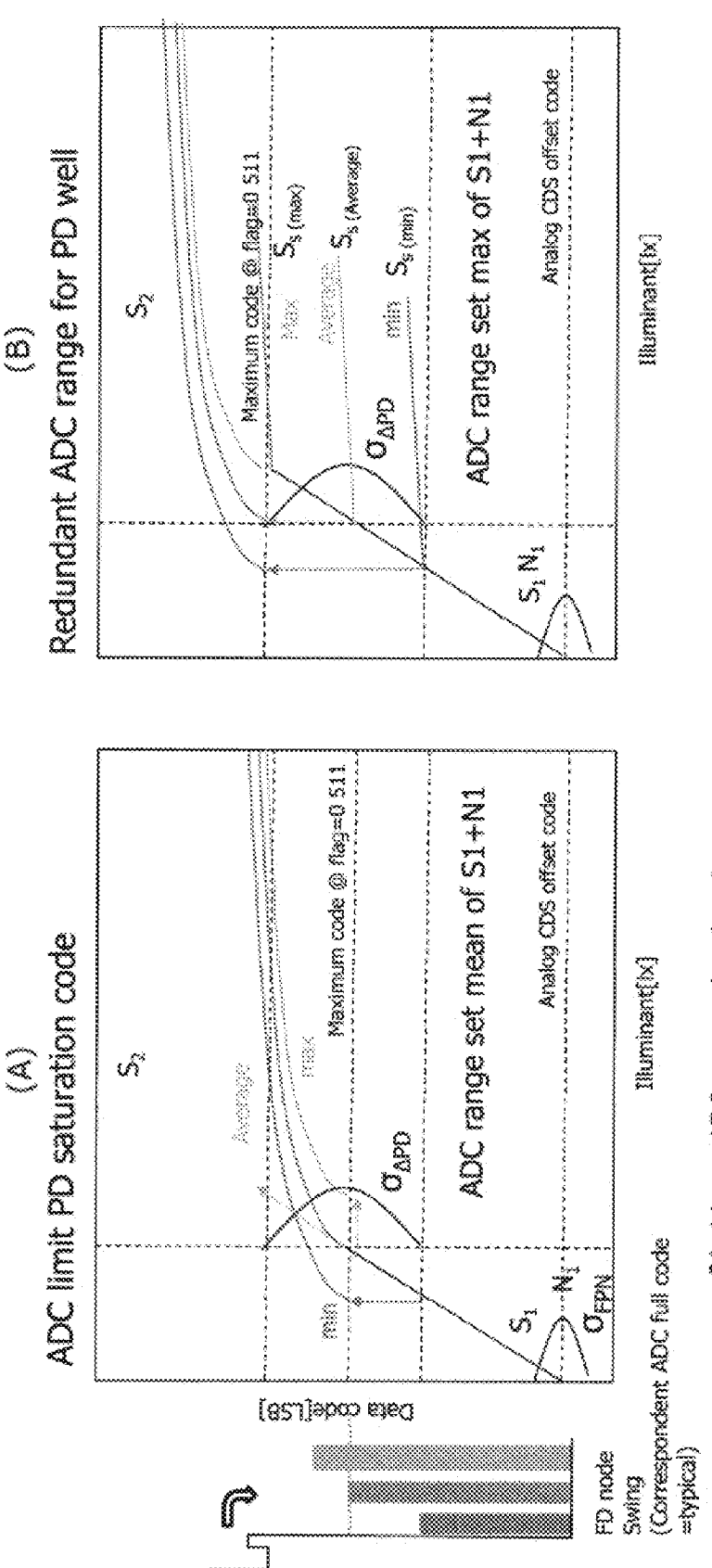
FIG. 36 shows photo response characteristics in the 2Q DPS signal gap at the junction point of the read-out signals and ADC window in a first example of the reading method applicable to the pixel of the solid-state imaging device relating to the fifth embodiment of the present disclosure.
Figure 37:
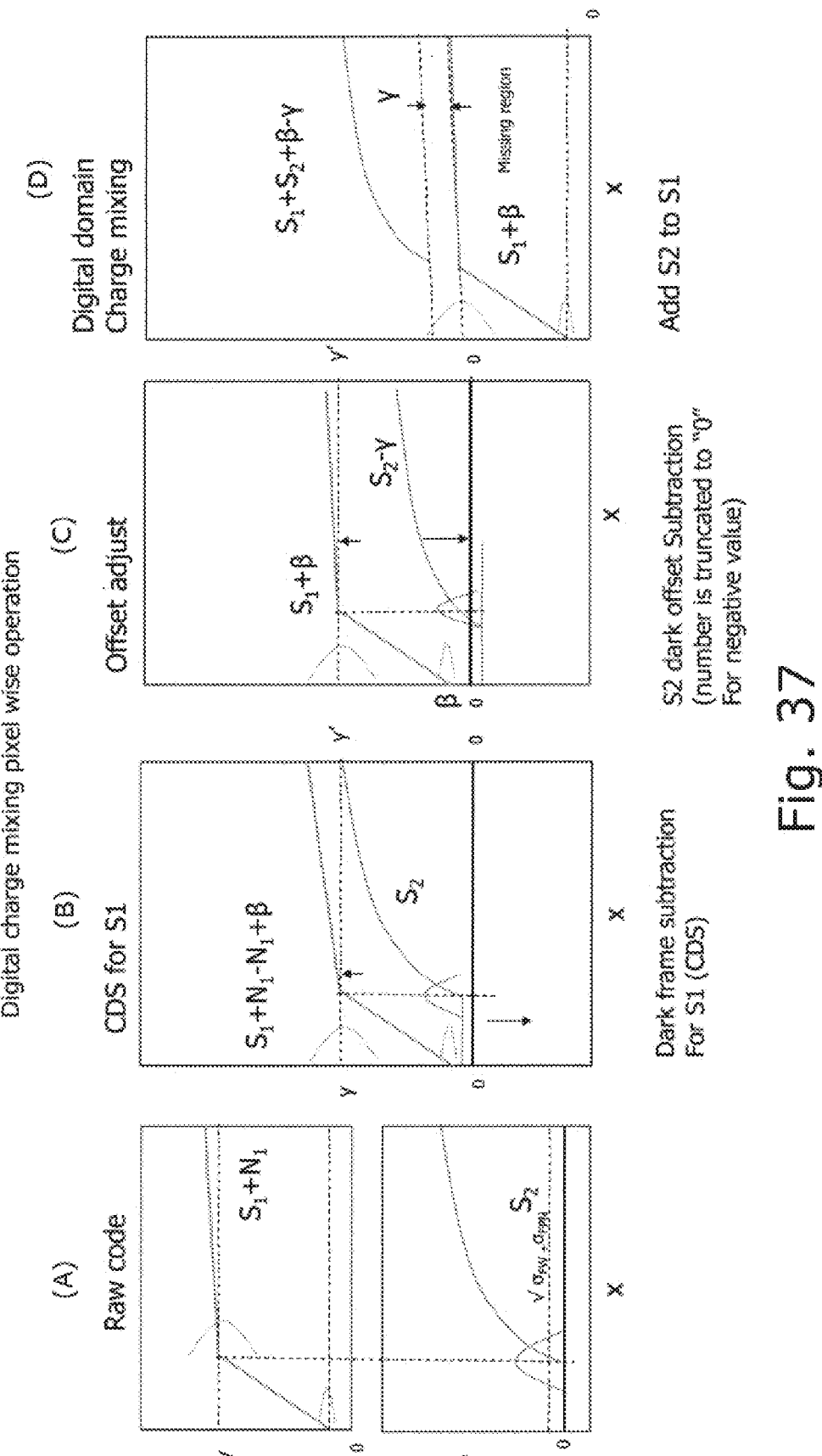
FIG. 37 shows in more detail the charge mixing scheme for the overflow (FD) charges and PD charges in the digital processing part relating to the fifth embodiment of the present disclosure.
Figure 38:
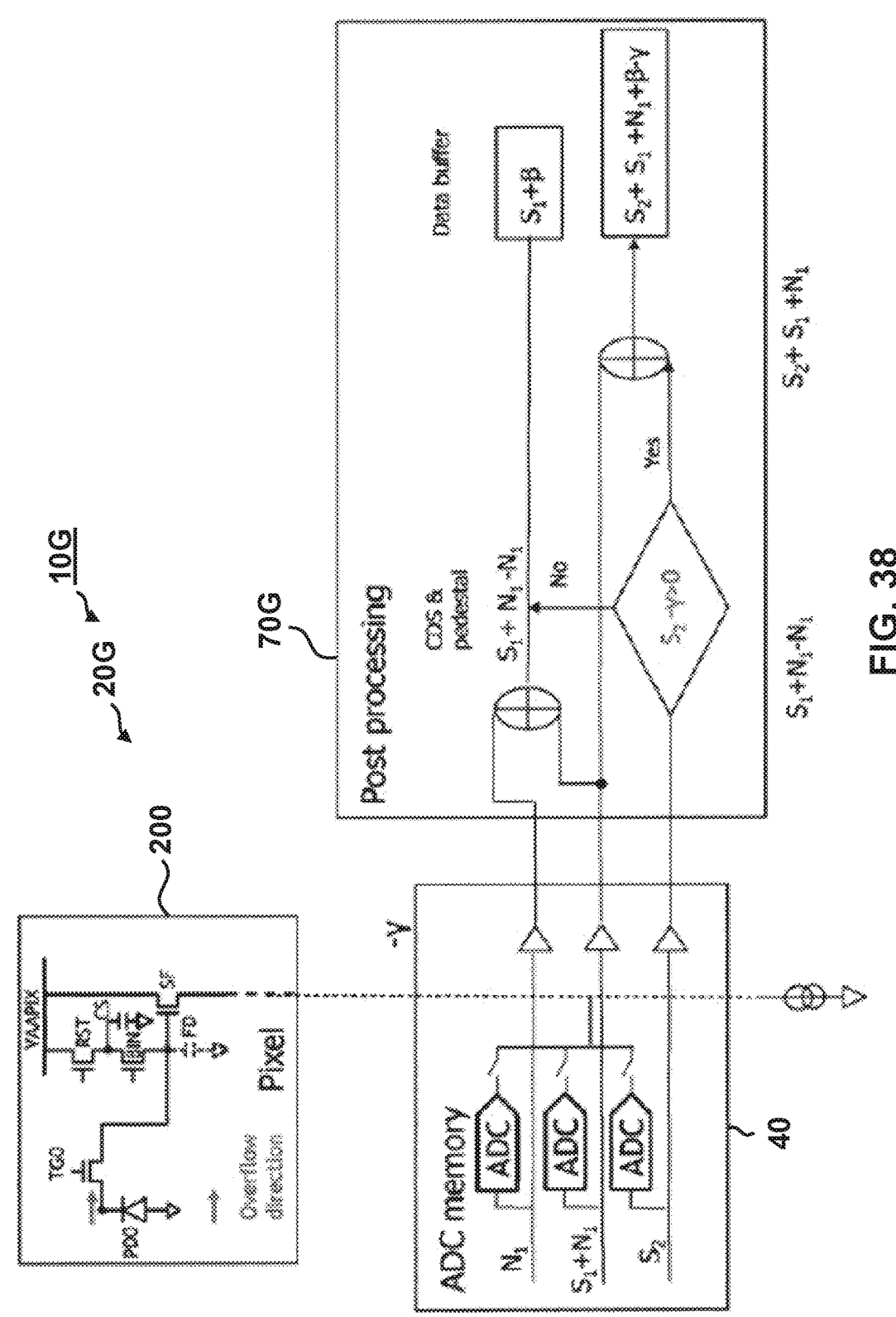
FIG. 38 is used to illustrate how the column reading circuit and digital processing part of the solid-state imaging device relating to the fifth embodiment handle the memories and perform charge mixing and linearization.

FIG. 35 includes views (A), (B) and (C) showing a first example of a reading method applicable to the pixel of the solid-state imaging device relating to the fifth embodiment of the present disclosure, showing a first example of the circuitry of the pixel, a timing chart and potential transition in relation with each other. FIG. 36 includes views (A) and (B) showing the photo response characteristics in the 2Q DPS signal gap at the junction point of the read-out signals and the ADC window in the first example of the reading method applicable to the pixel of the solid-state imaging device relating to the fifth embodiment of the present disclosure. FIG. 37 includes views (A) to (D) showing in more detail the charge mixing scheme for the overflow (FD) charges and PD charges in the digital processing part relating to the fifth embodiment. FIG. 38 is used to illustrate how the column reading circuit 400 and digital processing part 70 of the solid-state imaging device 10G relating to the fifth embodiment handle the memories and perform charge mixing and linearization.

FIG. 37 includes views (A) to (D) showing how to perform operations on the digital signals, where S1 and N1 show the photoelectric conversion characteristics of the digitized reset and signal levels of the PD signal, and S2 shows the photoelectric conversion characteristics of the digitized signal level of the overflow charge signal. Referring to FIGS. 37 and 38, the digital processing part 70F performs operations including gain correction and offset correction on the digitized PD stored charge signal S1, reset signal N1, overflow charge stored signal S2. In principle, in each pixel, correction is performed in the digital domain to compensate for the offset variation (saturation signal variation and circuit offset variation) that results from the digital processing.

According to the present example, the AD converting part 410F and memory part 420 of the reading circuit 40F are formed within the pixel 200F. The memory part 420 includes three in-pixel memories, namely, a first memory 421, a second memory 422, and a third memory 423, and a memory controller 424 controls accesses to them. The memory controller 424 controls the respective memories such that the first memory 421 may store the overflow charge code S2, the second memory 422 may store the ADC code of the charges from the PD0, and the third memory 423 may store the decoder and offset level of the ADC noise.

In the views (A) and (B) of FIG. 36, "S1" indicates the linear ADC conversion code of the photo charges in the photodiode PD via the FD node, "N1" indicates the dark noise of the ADC, and "S2" indicates the time domain overflow charge detect time to flip the code corresponding to the illuminance. The start point of the ADC code corresponds to the overflow point of the photodiode PD. The label "Ss" represents the individual saturation signals correlated to the starting point of saturation.

The following now describes how to process data relating to a dd reading method in a first example of a case where three memories are employed in the pixel of the solid-state imaging device shown in FIG. 38 relating to the fifth embodiment.

According to the present example, three sets of in-pixel memories are provided in each pixel. The first memory 421 holds the time required to flip the code (S2) for the overflow charges of the corresponding FD node. The second memory 422 holds the ADC code (S1) containing the corresponding N1 component of the photo charges stored in the storage node of the photodiode PD. This may include the data code of the noise of the in-pixel ADC (N1) and the individual saturation signals Ss correlated to the starting point of saturation. The third memory 423 holds only the data code of the noise of the in-pixel ADC (N1).

Due to the presence of the first and second memories 421 and 422, the variation in signal S2 between the pixels can be eliminated by performing an offset subtraction per pixel cell based on the unique PD full well, from which the S2 offset variation is originated. The third memory 423 holds only the data code of the noise of the in-pixel ADC (N1). As the data in the second memory 422 is subjected to the CDS processing, the variation (Δss) in the overflow charge detect time corresponding to the variation in the saturation characteristics can be eliminated from the signal S1.

Figure 39:
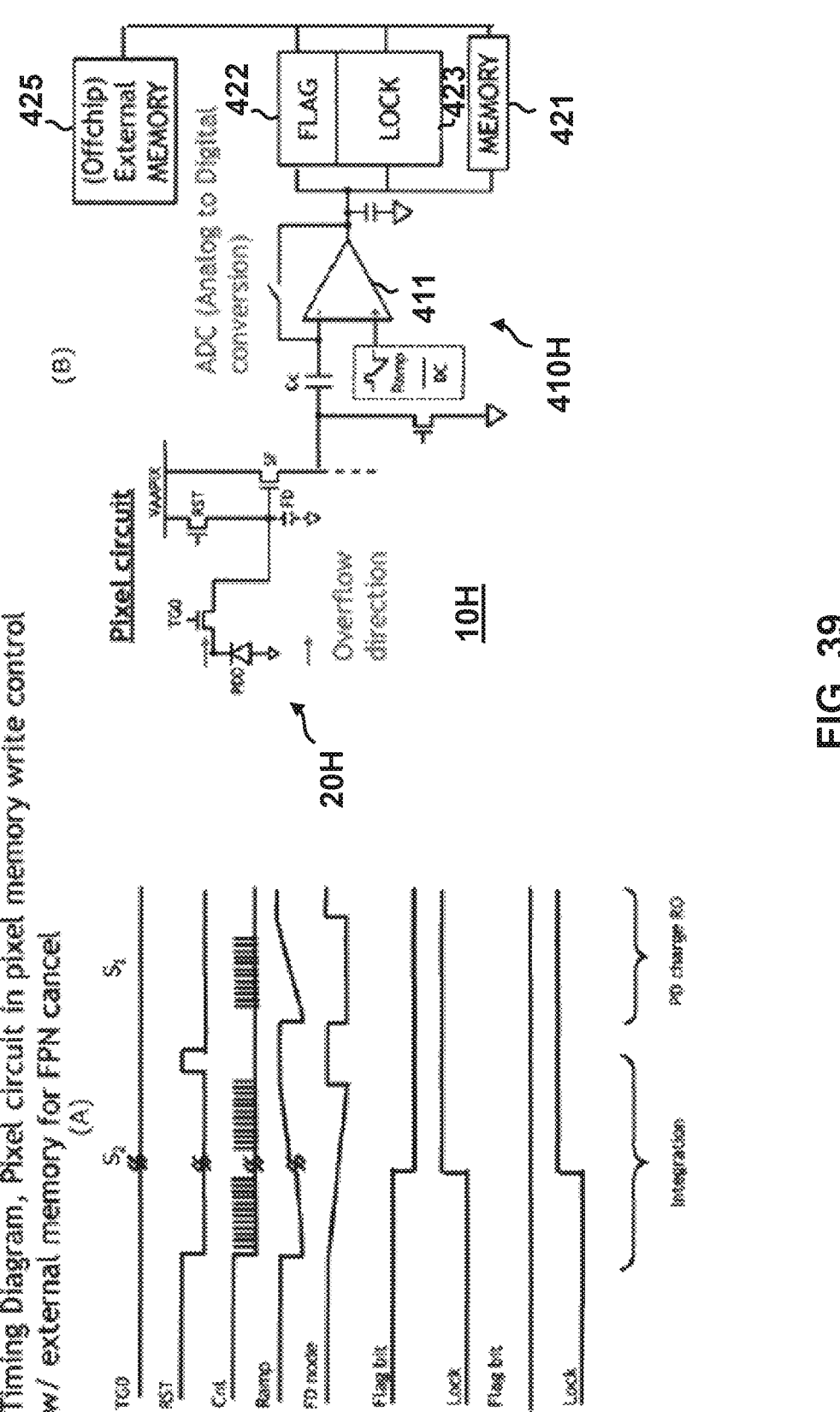
FIG. 39 shows a second example of the reading method applicable to the pixel of the solid-state imaging device relating to the fifth embodiment of the present disclosure, showing a second example of the circuitry of the pixel and a timing chart in relation with each other.
Figure 40:
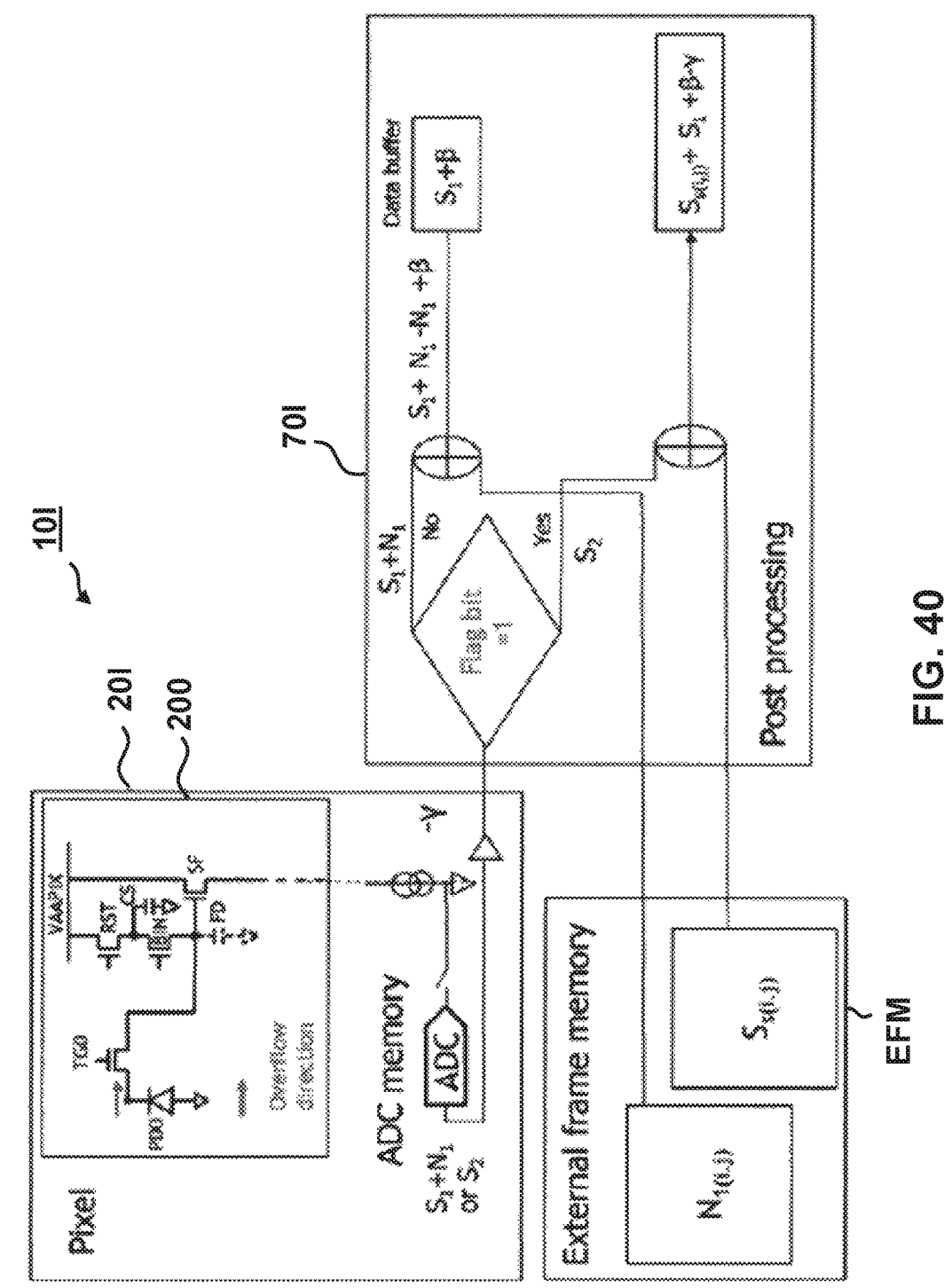
FIG. 40 is used to illustrate a second example of how the column reading circuit and digital processing part of the solid-state imaging device relating to the fifth embodiment handle the memories and perform charge mixing and linearization.

The following now describes how to process data relating to a reading method (a second example) employed when a memory for canceling the FPN is provided in the pixel of the solid-state-imaging device shown in FIGS. 39 and 40 relating to the fifth embodiment.

FIG. 39 includes views (A) and (B) showing a second example of the reading method applicable to the pixel of the solid-state imaging device relating to the fifth embodiment of the present disclosure, showing a second example of the circuitry of the pixel and a timing chart in relation with each other. FIG. 40 is used to illustrate a second example of how the column reading circuit 400 and digital processing part 701 of the solid-state imaging device 101 relating to the fifth embodiment handle the memories and perform the charge mixing and linearization.

FIG. 39 shows a pixel circuit in the pixel memory write control using an external memory 425 for canceling the FPN. In the present example, data is written to the first memory 421. A flag bit is formed in the second memory 422. A lock bit is formed in the third memory 423.

The following now describes how to process data relating to a reading method (a second example) when the external memory 425 is provided in the pixel of the solid-state-imaging device shown in FIG. 40 relating to the fifth embodiment.

According to the present example, a single set of in-pixel memories and a single set of flag memories FLG are provided in each pixel. The in-pixel memories 421 to 423 hold the time required to flip the ADC code (S1) corresponding to the given saturated stored charges or the code (S2) of the photo charges stored in the storage node (PD node) of the photodiode PD that may include the data code of the noise of the in-pixel ADC (N1). The flag memory FLG indicates the memory state (S1+N1) or 1-bit memory code (S2).

The two sets of external frame memories 425 are utilized to reduce noise. The first and second memories 421 and 423 respectively hold the N1 and Ss values. The variation in the signal S2 between the pixels can be eliminated by performing an offset subtraction per pixel based on the unique PD full well, from which the S2 offset variation is originated.

Figure 41:
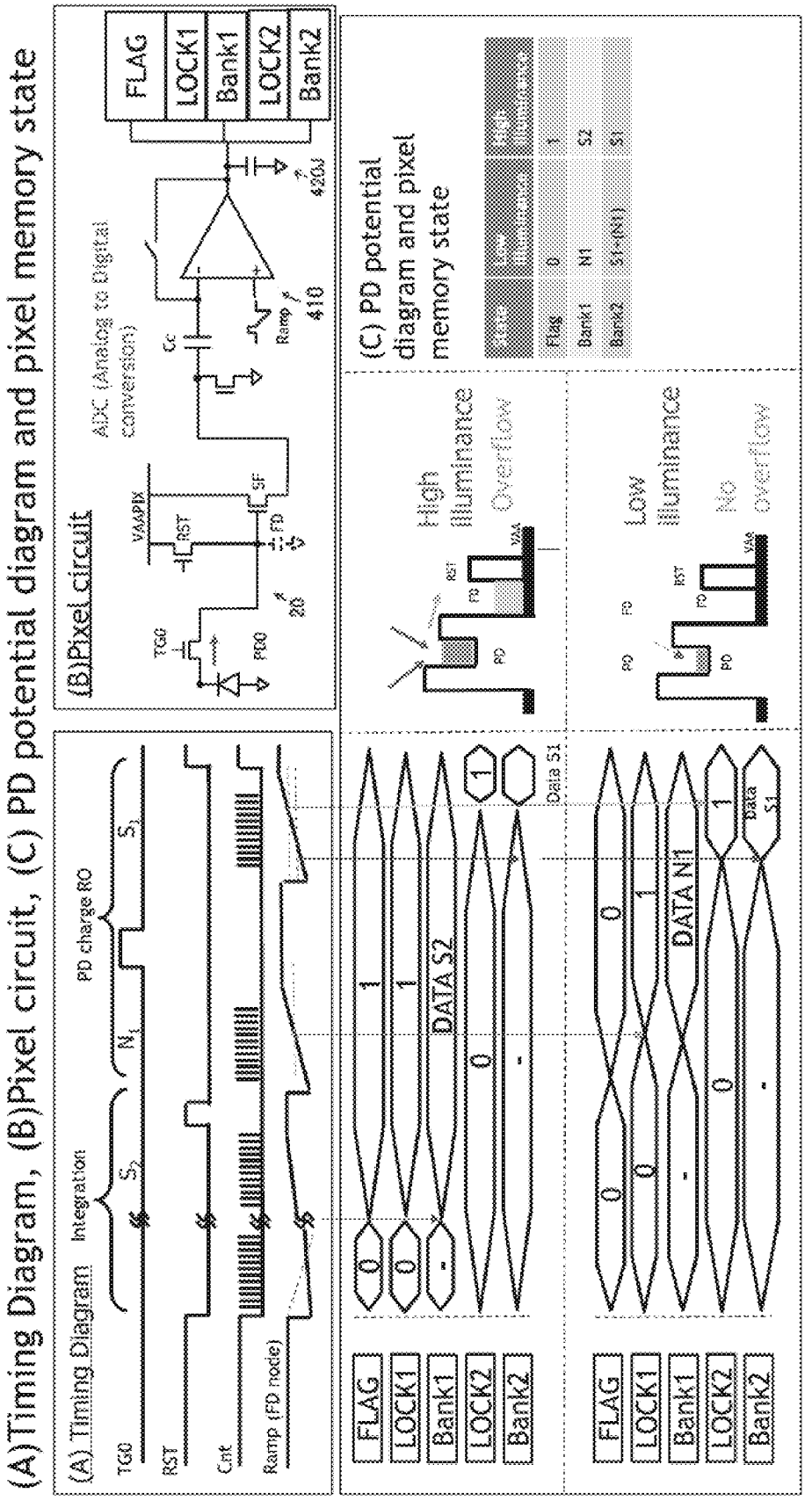
FIG. 41 shows a third example of the reading method applicable to the pixel of the solid-state imaging device relating to the fifth embodiment of the present disclosure, showing a third example of a circuitry of the pixel, a timing chart and potential transition in relation to each other.

FIG. 41 includes views (A), (B) and (C) showing a third example of a reading method applicable to the pixel of the solid-state imaging device relating to the fifth embodiment of the present disclosure, showing a third example of a timing chart, the circuitry of the pixel and potential transition with memory state diagram in relation with each other.

According to the present example, the memory part 420J includes one flag memory (FLG) 422, and two sets of a lock memory (423-1 and 423-3) and a bank memory (421-1 and 421-2).

Figure 42:
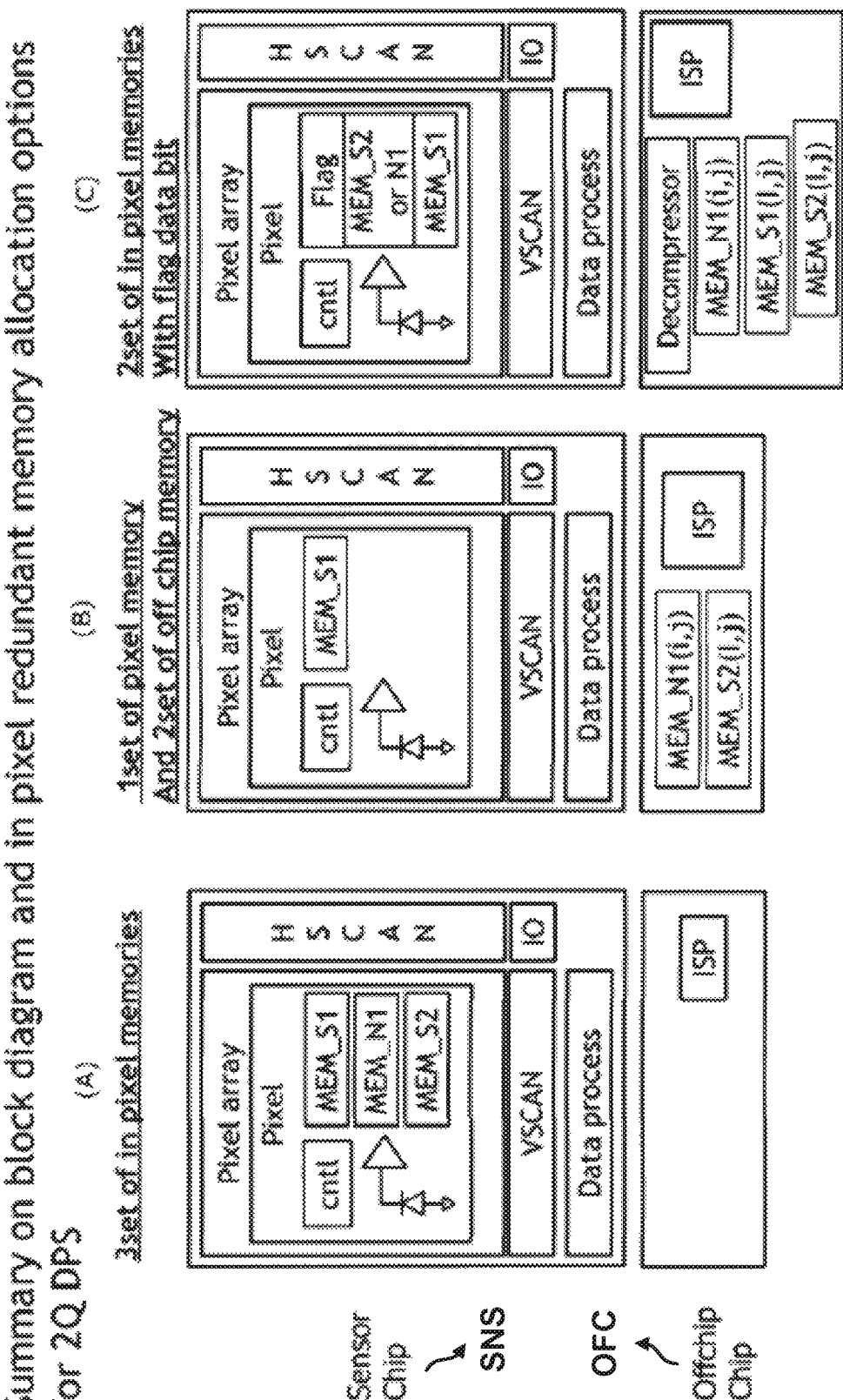
FIG. 42 briefly shows options for redundant memory allocation to the pixels of a digital pixel sensor (DPS) relating to the solid-state imaging device relating to the fifth embodiment of the present disclosure.

FIG. 42 includes views (A), (B) and (C) and briefly shows options for redundant memory allocation to the pixels of a digital pixel sensor (DPS) relating to the solid-state imaging device relating to the fifth embodiment of the present disclosure.

Referring to the example shown in the view (A) of FIG. 42, three sets of in-pixel memories are provided in each pixel of the sensor chip SNC. Referring to the example shown in the view (B) in FIG. 42, a single set of in-pixel memories is provided in each pixel of the sensor chip SNC, and two sets of external memories are provided in the off-chip OFC. Referring to the example shown in the view (C) in FIG. 42, two sets of in-pixel memories with a flag bit are provided in each pixel of the sensor chip SNC.

The pixels 200F to 200J relating to the fifth embodiment are described above. According to the fifth embodiment, each pixel has an ADC and a plurality of, for example, three sets of in-pixel memories. In each pixel, the redundant memories are used to individually perform operations on the digital versions of the stored charges, overflow charges and dark offset noise of each pixel. Compared to conventional DPS operation, the fifth embodiment can reduce a drop in SNR caused by variation in stored charges among the pixels.

The solid-state imaging devices 10, 10A to 10J described above can be applied, as imaging devices, to electronic apparatuses such as digital cameras, video cameras, mobile terminals, surveillance cameras, and medical endoscope cameras.

Figure 43:
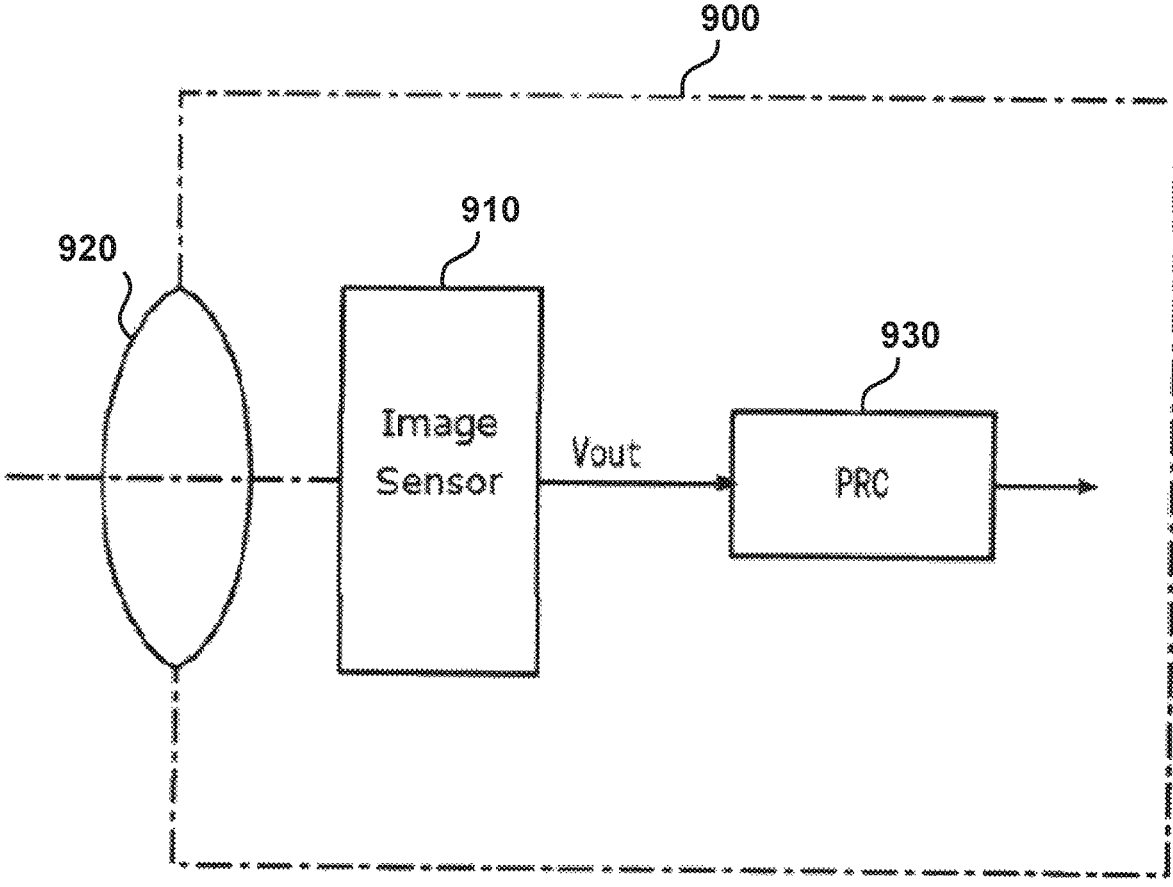
FIG. 43 shows an example configuration of an electronic apparatus to which the solid-state imaging devices relating to the embodiments of the present disclosure can be applied.

FIG. 43 shows an example of the configuration of an electronic apparatus including a camera system to which the solid-state imaging devices relating to the embodiments of the present disclosure are applied.

As shown in FIG. 43, the electronic apparatus 900 includes a CMOS image sensor 910 that can be constituted by the solid-state imaging devices 10, 10A to 10J relating to the embodiments of the present disclosure. The electronic apparatus 900 further includes an optical system (such as a lens) 920 for redirecting the incident light to the pixel region of the CMOS image sensor 910 (to form a subject image). The electronic apparatus 900 includes a signal processing circuit (PRC) 930 for processing the output signals from the CMOS image sensor 910.

The signal processing circuit 930 performs predetermined signal processing on the output signals from the CMOS image sensor 910. The image signals resulting from the processing in the signal processing circuit 930 can be handled in various manners. For example, the image signals can be displayed as a video image on a monitor having a liquid crystal display, printed by a printer, or recorded directly on a storage medium such as a memory card.

As described above, if the above-described solid-state imaging devices 10, 10A to 10J are mounted as the CMOS image sensor 910, the camera system can achieve high-performance, compactness, and low-cost. Accordingly, the embodiments of the present disclosure can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:

a pixel part having pixels arranged therein, each of the pixels being configured to perform photoelectric conversion to generate charges and store the charges that are to be read at least once with different conversion gains; and a reading part for reading a pixel signal from each of the pixels in the pixel part with a conversion gain, wherein each of the pixels at least includes:

a photoelectric conversion element having a first storage node for storing therein, in an integration period, the charges generated by the photoelectric conversion;

a transfer transistor for transferring, in a transfer period, the charges stored in the photoelectric conversion element;

an output node to which the charges stored in the photoelectric conversion element are transferred through the transfer transistor;

an output buffer part for converting the charges in the output node into a voltage signal at a level determined by an amount of the charges and outputting the voltage signal;

a connection element connected to the output node; and a storage capacitance element having a second storage node for storing the charges in the output node via the connection element, the storage capacitance element being configured to store overflow charges beyond a storage capacity of the photoelectric conversion element, wherein the reading part includes:

an analog-to-digital converting part (ADC) for performing analog-to-digital (AD) conversion on an analog overflow charge signal and an analog stored charge signal of the photoelectric conversion element into a digital overflow charge signal and a digital stored charge signal and outputting the digital overflow charge signal and the digital stored charge signal; and a digital processing part for performing linearization on the digital overflow charge signal and the digital stored charge signal output from the ADC, the digital overflow charge signal and the digital stored charge signal having different gains and offsets as stored in different nodes including the output node, the first storage node, and the second storage node, and wherein the reading part:

controls the output node, the first storage node, and the second storage node such that the output node, the first storage node, and the second storage node are coupled with each other to perform reading of the analog overflow charge signal; and controls the output node and the second storage node such that the output node and the second storage node are separated from each other to perform reading of the analog stored charge signal.

2. The solid-state imaging device of claim 1, wherein, in each of the pixels, after fully filling the first storage node, the charges are stored in the second storage node and the output node and read with a high conversion gain (HCG), and the overflow charges are independently and globally stored in the second storage node that is configured to be coupled with the output node and the first storage node, and read with a low conversion gain (LCG) lower than the high conversion gain.

3. The solid-state imaging device of claim 2, wherein the reading part performs a sequence of operations to read the pixel signal from each of the pixels such that the reading of the digital overflow charge signal takes place prior to the reading of the digital stored charge signal without charge mixing at the output node.

4. The solid-state imaging device of claim 3, wherein each of the pixels includes a reset element for resetting the output node to a reset potential, and wherein the reading part performs the sequence of operations to read the pixel signal from each of the pixels such that a low conversion gain signal reading operation, a low conversion gain reset reading operation, a high conversion gain reset reading operation, and a high conversion gain signal reading operation sequentially take place.

5. The solid-state imaging device of claim 2, wherein, in each of the pixels, the overflow charges are skimmed by a charge discharge path connected to the first storage node.

6. The solid-state imaging device of claim 2, wherein the ADC is configured to perform, on the voltage signal output from the output buffer part of each of the pixels, the AD conversion at least once with different gains in a single frame period.

7. The solid-state imaging device of claim 6, wherein each of the pixels or the reading part includes a redundant memory for temporarily storing the analog stored charge signal, so that offset correction is to be performed at least for each of the pixels.

8. The solid-state imaging device of claim 7, wherein the redundant memory for temporarily storing a result of analog-to-digital converting the analog stored charge signal is provided for each of the pixels, each column, or outside a chip.

9. The solid-state imaging device of claim 8, wherein a memory arranged in each of the pixels has a flag bit so that a signal to be captured is selected depending on an amount of the charges.

10. The solid-state imaging device of claim 7, wherein the digital processing part is configured to digitally perform saturation variation correction and gain correction for each of the pixels and process each of the digital stored charge signal and the digital overflow charge signal for linearity.

11. The solid-state imaging device of claim 10, wherein the digital processing part combines the digital stored charge signal and the digital overflow charge signal such that linear photo response is achieved without a loss in a signal region between the first and second storage nodes, and adds redundant digital memory data to a digital code of each of the pixels.

12. The solid-state imaging device of claim 11, wherein the AD conversion of the overflow charges stored in the second storage node includes analog-to-digital converting a time required to reach a predetermined voltage corresponding to an amount of the overflow charges.

13. The solid-state imaging device of claim 12, wherein the pixels are digital pixels, and an amount of the charges stored in the photoelectric conversion element is coded, and an amount of the overflow charges in the second storage node is coded with a time code of the overflow charges.

14. The solid-state imaging device of claim 1, wherein the digital overflow charge signal of the second storage node is read out independently at any timing.

15. The solid-state imaging device of claim 1, wherein each of the pixels is configured such that at least two storage nodes, including the first storage node and the second storage node, are coupled with the output node to share the output node and that the overflow charges from the photoelectric conversion element are stored in the second storage node.

16. A method for driving a solid-state imaging device, the solid-state imaging device including:

a pixel part having pixels arranged therein, each of the pixels being configured to perform photoelectric conversion to generate charges and store the charges that are to be read at least once with different conversion gains; and a reading part for reading a pixel signal from each of the pixels in the pixel part with a conversion gain, wherein each of the pixels at least includes:

a photoelectric conversion element having a first storage node for storing therein, in an integration period, the charges generated by the photoelectric conversion;

a transfer transistor for transferring, in a transfer period, the charges stored in the photoelectric conversion element;

an output node to which the charges stored in the photoelectric conversion element are transferred through the transfer transistor;

an output buffer part for converting the charges in the output node into a voltage signal at a level determined by an amount of the charges and outputting the voltage signal;

a connection element connected to the output node; and a storage capacitance element having a second storage node for storing the charges in the output node via the connection element, the storage capacitance element being configured to store overflow charges beyond a storage capacity of the photoelectric conversion element, wherein the reading part includes:

an analog-to-digital converting part (ADC) for analog-to-digital (AD) converting an analog overflow charge signal and an analog stored charge signal of the photoelectric conversion element into a digital overflow charge signal and a digital stored charge signal and outputting the digital overflow charge signal and the digital stored charge signal; and a digital processing part for performing linearization on the digital overflow charge signal and the digital stored charge signal output from the ADC, the digital overflow charge signal and the digital stored charge signal having different gains and offsets as stored in different nodes including the output node, the first storage node, and the second storage node, wherein the reading part:

controls the output node, the first storage node, and the second storage node such that the output node, the first storage node, and the second storage node are coupled with each other to perform reading of the analog overflow charge signal; and controls the output node and the second storage node such that the output node and the second storage node are separated from each other to perform reading of the analog stored charge signal, wherein a sequence of operations to read the pixel signal from each of the pixels is performed such that the reading of the analog overflow charge signal takes place prior to the reading of the analog stored charge signal without charge mixing at the output node.

17. An electronic apparatus comprising:

a solid-state imaging device; and an optical system for forming a subject image on the solid-state imaging device, wherein the solid-state imaging device includes:

a pixel part having pixels arranged therein, each of the pixels being configured to perform photoelectric conversion to generate charges and store the charges that are to be read at least once with different conversion gains; and a reading part for reading a pixel signal from each of the pixels in the pixel part with a conversion gain, wherein each of the pixels at least includes:

a photoelectric conversion element having a first storage node for storing therein, in an integration period, the charges generated by the photoelectric conversion;

a transfer transistor for transferring, in a transfer period, the charges stored in the photoelectric conversion element;

an output node to which the charges stored in the photoelectric conversion element are transferred through the transfer transistor;

an output buffer part for converting the charges in the output node into a voltage signal at a level determined by an amount of the charges and outputting the voltage signal;

a connection element connected to the output node; and a storage capacitance element having a second storage node for storing the charges in the output node via the connection element, the storage capacitance element being configured to store overflow charges beyond a storage capacity of the photoelectric conversion element, wherein the reading part includes:

an analog-to-digital converting part (ADC) for analog-to-digital (AD) converting an analog overflow charge signal and an analog stored charge signal of the photoelectric conversion element into a digital overflow charge signal and a digital stored charge signal and outputting the digital overflow charge signal and the digital stored charge signal; and a digital processing part for performing linearization on the digital overflow charge signal and the digital stored charge signal output from the ADC, the digital overflow charge signal and the digital stored charge signal having different gains and offsets as stored in different nodes including the output node, the first storage node, and the second storage node, and wherein the reading part:

controls the output node, the first storage node, and the second storage node such that the output node, the first storage node, and the second storage node are coupled with each other to perform reading of the analog overflow charge signal; and controls the output node and the second storage node such that the output node and the second storage node are separated from each other to perform reading of the analog stored charge signal.

* * * * *